United States Patent
Buchanan et al.

(10) Patent No.: US 7,386,511 B2
(45) Date of Patent: Jun. 10, 2008

(54) METHODS AND SYSTEMS FOR PROCESSING FINANCIAL INSTRUMENT DEPOSITS

(75) Inventors: Danne L. Buchanan, Sandy, UT (US); William Ronald Titus, Fruit Heights, UT (US)

(73) Assignee: Netdeposit Inc., Salt Lake City, UT (US)

( * ) Notice: Subject to any disclaimer, the term of this patent is extended or adjusted under 35 U.S.C. 154(b) by 1007 days.

(21) Appl. No.: 10/622,832

(22) Filed: Jul. 21, 2003

(65) Prior Publication Data
US 2004/0133516 A1 Jul. 8, 2004

Related U.S. Application Data

(63) Continuation-in-part of application No. 09/560,779, filed on Apr. 28, 2000, and a continuation-in-part of application No. 09/676,956, filed on Apr. 28, 2000, which is a continuation-in-part of application No. 09/560,779, filed on Apr. 28, 2000.

(60) Provisional application No. 60/397,897, filed on Jul. 22, 2002.

(51) Int. Cl.
*G06Q 40/00* (2006.01)

(52) U.S. Cl. .............................. 705/45; 705/40; 705/41; 705/42; 705/43; 705/44; 705/16; 705/17; 705/18; 235/379; 235/380; 235/381

(58) Field of Classification Search .................. 705/39, 705/40, 42, 43, 44, 45, 41, 16, 17, 18; 235/379, 235/380, 381
See application file for complete search history.

(56) References Cited

U.S. PATENT DOCUMENTS 4,027,142 A 5/1977 Paup et al.

(Continued)

FOREIGN PATENT DOCUMENTS

CA 2131667 A1 9/1994

(Continued)

OTHER PUBLICATIONS

"Preliminary Invalidity Contentions of Defendants", *United States District Court for the Eastern District of Texas Texarkana Division, Civil Action No. 5:02cv124*, Dec. 3, 2002, pp. 1-20.

(Continued)

*Primary Examiner*—Nga Nguyen
(74) *Attorney, Agent, or Firm*—Foley & Lardner LLP

(57) ABSTRACT

The present invention comprises a program product, system and method for deposit processing using check images. In one embodiment of the present invention, the program product comprises machine-readable program code for causing, when executed, a machine to perform the following steps: at least one check processor receiving deposit information for a plurality of different deposit transactions, with the deposit information including original check image data and endorsed and voided check image data for at least one check to be deposited; selecting a print processor that has access to at least one printer based on at least one criterion; sending the electronic check data and check image data to the selected print processor; identifying a clearing end point; generating cash letter data for a maker bank; the print processor or the check processor transmitting the check image data and the cash letter data directly or indirectly to the selected end point and/or to at least one printer.

69 Claims, 27 Drawing Sheets

U.S. PATENT DOCUMENTS

| | | | |
|---|---|---|---|
| 4,126,779 A | 11/1978 | Jowers et al. | |
| 4,201,978 A | 5/1980 | Nally | |
| 4,264,808 A | 4/1981 | Owens et al. | |
| 4,321,672 A | 3/1982 | Braun et al. | |
| 4,326,258 A | 4/1982 | De La Guardia | |
| 4,358,671 A | 11/1982 | Case | |
| 4,417,136 A | 11/1983 | Rushby et al. | |
| 4,454,575 A | 6/1984 | Bushaw et al. | |
| 4,457,015 A | 6/1984 | Nally et al. | |
| RE31,692 E | 10/1984 | Tyburski et al. | |
| 4,500,750 A | 2/1985 | Elander et al. | |
| 4,523,330 A | 6/1985 | Cain | |
| 4,555,617 A | 11/1985 | Brooks et al. | |
| 4,578,530 A | 3/1986 | Zeidler | |
| 4,602,936 A | 7/1986 | Topfl et al. | |
| 4,650,978 A | 3/1987 | Hudson et al. | |
| 4,680,803 A | 7/1987 | Dilella | |
| 4,694,147 A | 9/1987 | Amemiya et al. | |
| 4,730,767 A | 3/1988 | Gendron | |
| 4,731,524 A | 3/1988 | Brooks | |
| 4,750,201 A | 6/1988 | Hodgson et al. | |
| 4,843,220 A | 6/1989 | Haun | |
| 4,858,121 A | 8/1989 | Barber et al. | |
| 4,888,812 A | 12/1989 | Dinan et al. | |
| 4,912,762 A | 3/1990 | Lee et al. | |
| 4,926,325 A | 5/1990 | Benton et al. | |
| 4,948,174 A | 8/1990 | Thomson et al. | |
| 4,960,981 A | 10/1990 | Benton et al. | |
| 4,974,878 A | 12/1990 | Josephson | |
| 5,053,607 A | 10/1991 | Carlson et al. | |
| 5,054,096 A | 10/1991 | Beizer | |
| 5,091,968 A | 2/1992 | Higgins et al. | |
| 5,121,945 A | 6/1992 | Thomson et al. | |
| 5,122,950 A | 6/1992 | Benton et al. | |
| 5,144,115 A | 9/1992 | Yoshida | |
| 5,159,548 A | 10/1992 | Caslavka | |
| 5,168,444 A | 12/1992 | Cukor et al. | |
| 5,175,682 A | 12/1992 | Higashiyama et al. | |
| 5,200,993 A | 4/1993 | Wheeler et al. | |
| 5,229,764 A | 7/1993 | Matchett et al. | |
| 5,237,158 A | 8/1993 | Kern et al. | |
| 5,237,159 A | 8/1993 | Stephens et al. | |
| 5,265,007 A | 11/1993 | Barnhard, Jr. et al. | |
| 5,274,567 A | 12/1993 | Kallin et al. | |
| 5,321,816 A | 6/1994 | Rogan et al. | |
| 5,324,922 A | 6/1994 | Roberts | |
| 5,326,959 A | 7/1994 | Perazza | |
| 5,373,550 A * | 12/1994 | Campbell et al. | 379/100.11 |
| 5,384,835 A | 1/1995 | Wheeler et al. | |
| 5,412,190 A | 5/1995 | Josephson et al. | |
| 5,425,080 A | 6/1995 | Abbie | |
| 5,438,184 A | 8/1995 | Roberts et al. | |
| 5,444,779 A | 8/1995 | Daniele | |
| 5,444,794 A | 8/1995 | Uhland, Sr. | |
| 5,453,601 A | 9/1995 | Rosen | |
| 5,473,143 A | 12/1995 | Vak et al. | |
| 5,484,988 A | 1/1996 | Hills et al. | |
| 5,488,671 A | 1/1996 | Kern | |
| 5,504,822 A | 4/1996 | Holt | |
| 5,506,691 A | 4/1996 | Bednar et al. | |
| 5,528,705 A | 6/1996 | Reasoner, Jr. et al. | |
| 5,528,765 A | 6/1996 | Milligan | |
| 5,532,464 A | 7/1996 | Josephson et al. | |
| 5,544,255 A | 8/1996 | Smithies et al. | |
| 5,546,471 A | 8/1996 | Merjanian | |
| 5,583,759 A | 12/1996 | Geer | |
| 5,613,012 A | 3/1997 | Hoffman et al. | |
| 5,615,277 A | 3/1997 | Hoffman | |
| 5,619,524 A | 4/1997 | Ling et al. | |
| 5,664,111 A | 9/1997 | Nahan et al. | |
| 5,668,897 A | 9/1997 | Stolfo | |
| 5,673,333 A | 9/1997 | Johnston | |
| 5,677,955 A | 10/1997 | Doggett et al. | |
| 5,678,046 A | 10/1997 | Cahill et al. | |
| 5,679,938 A | 10/1997 | Templeton et al. | |
| 5,684,965 A | 11/1997 | Pickering | |
| 5,689,579 A | 11/1997 | Josephson | |
| 5,691,524 A | 11/1997 | Josephson | |
| 5,708,810 A | 1/1998 | Kern et al. | |
| 5,717,868 A | 2/1998 | James | |
| 5,760,916 A | 6/1998 | Dellert et al. | |
| 5,783,808 A | 7/1998 | Josephson | |
| 5,784,610 A | 7/1998 | Copeland, III et al. | |
| 5,787,403 A | 7/1998 | Randle | |
| 5,787,405 A | 7/1998 | Gregory | |
| 5,793,302 A | 8/1998 | Stambler | |
| 5,802,498 A | 9/1998 | Comesanas | |
| 5,819,236 A | 10/1998 | Josephson | |
| 5,832,463 A | 11/1998 | Funk | |
| 5,832,464 A | 11/1998 | Houvener et al. | |
| 5,864,871 A | 1/1999 | Kitain et al. | |
| 5,870,725 A | 2/1999 | Bellinger et al. | |
| 5,889,863 A | 3/1999 | Weber | |
| 5,890,141 A | 3/1999 | Carney et al. | |
| 5,893,078 A | 4/1999 | Paulson | |
| 5,895,453 A | 4/1999 | Cook | |
| 5,895,455 A | 4/1999 | Bellinger et al. | |
| 5,897,625 A | 4/1999 | Gustin et al. | |
| 5,904,844 A | 5/1999 | Stone | |
| 5,910,988 A | 6/1999 | Ballard | |
| 5,917,965 A | 6/1999 | Cahill et al. | |
| 5,930,778 A * | 7/1999 | Geer | 705/45 |
| 5,936,541 A | 8/1999 | Stambler | |
| 5,940,813 A | 8/1999 | Hutchings | |
| 5,940,844 A | 8/1999 | Cahill et al. | |
| 5,953,702 A | 9/1999 | Ohlemacher et al. | |
| 5,963,647 A | 10/1999 | Downing et al. | |
| 5,963,659 A | 10/1999 | Cahill et al. | |
| 5,974,148 A | 10/1999 | Stambler | |
| 5,978,840 A | 11/1999 | Nguyen et al. | |
| 5,999,624 A | 12/1999 | Hopkins | |
| 6,019,282 A | 2/2000 | Thompson et al. | |
| 6,021,202 A | 2/2000 | Anderson et al. | |
| 6,029,172 A | 2/2000 | Jorna et al. | |
| 6,032,137 A | 2/2000 | Ballard | |
| 6,036,344 A | 3/2000 | Goldenberg | |
| 6,038,553 A | 3/2000 | Hyde, Jr. | |
| 6,045,039 A | 4/2000 | Stinson et al. | |
| 6,105,011 A | 8/2000 | Morrison, Jr. | |
| 6,108,104 A | 8/2000 | Tesavis | |
| 6,112,902 A | 9/2000 | Hayduchok et al. | |
| 6,115,509 A | 9/2000 | Yeskel | |
| 6,138,107 A | 10/2000 | Elgamal | |
| 6,164,528 A | 12/2000 | Hills et al. | |
| 6,178,409 B1 | 1/2001 | Weber et al. | |
| 6,181,837 B1 | 1/2001 | Cahill et al. | |
| 6,189,785 B1 * | 2/2001 | Lowery | 235/379 |
| 6,202,055 B1 | 3/2001 | Houvener et al. | |
| 6,257,783 B1 * | 7/2001 | Hanaoka et al. | 400/578 |
| 6,289,322 B1 * | 9/2001 | Kitchen et al. | 705/40 |
| 6,301,379 B1 | 10/2001 | Thompson et al. | |
| 6,363,164 B1 | 3/2002 | Jones et al. | |
| 7,181,430 B1 * | 2/2007 | Buchanan et al. | 705/45 |
| 2002/0001393 A1 | 1/2002 | Jones et al. | |
| 2002/0152170 A1 | 10/2002 | Dutta et al. | |
| 2003/0009420 A1 | 1/2003 | Jones | |
| 2003/0023557 A1 | 1/2003 | Moore | |
| 2003/0033252 A1 | 2/2003 | Buttridge et al. | |
| 2003/0050889 A1 | 3/2003 | Burke | |

FOREIGN PATENT DOCUMENTS

| | | |
|---|---|---|
| EP | 0 320 713 B1 | 6/1989 |
| EP | 0 320 756 | 6/1989 |

| | | |
|---|---|---|
| EP | 0 593 209 | 4/1994 |
| EP | 0 661 654 A2 | 11/1994 |
| EP | 0 661 654 A2 | 7/1995 |
| EP | 0 671 696 | 9/1995 |
| EP | 0 678 829 | 10/1995 |
| FR | 2 624 932 A1 | 6/1989 |
| GB | 2 297 414 A | 7/1996 |
| JP | 10187861 | 7/1998 |
| JP | 11272763 A | 10/1999 |
| WO | WO 91/06052 | 5/1991 |
| WO | WO 91/06058 | 5/1991 |
| WO | WO 97/22060 A1 | 12/1996 |
| WO | WO 97/07468 | 2/1997 |
| WO | WO 97/36254 | 10/1997 |
| WO | WO 98/47100 | 10/1998 |

OTHER PUBLICATIONS

Jeanne Bahnke et al., "NSSDC's Mass Storage System Evolves", Mar. 1995, pp. 1 and 2, vol. 11, No. 1., Dec. 2, 2002, http://nssdc.gsfc.nasa.gov/nssdc_news/march95/09_i_behnke_0395.html.
"Program Product", *Electronic Payment Systems Support/check Processing Control System: Program Reference and Operational Manual*, 8th ed., Jun. 1986, International Business Machines Corporation.
"IBM 3898 Image Processor", *US Marketing & Services*, Mar. 13, 1990.
Lucent Technologies, "Cisco partners with AT&T CMS on network switch manufacturing", Sep. 26, 1995, Dec. 2, 2002, http://www.lucent.com/ress/0995/950926.mma.html.
"At Your Service", *A Newsletter from the Federal Reserve Bank of Kansas City*, Special Ed., Summer 1995. Kansas City.
American Bankers Association, *American National Standard For Financial Image Interchange: Architecture, Overview and System Design Specificiation*, 1994, American National Standards Institute, Inc.
Robert J. Brown, ANSI X9.46 Data Structure Reference; Jul. 31, 1995, pp. 4-16.
"Add Value by Reinventing Accounts Receivable Processing," *Corporate Cashflow*, vol. 15, No. 2, Feb. 1994, pp. 2, 17-18, and 27.
"Document Management—Imaging System Achieves Payback in One Year," *Managing Office Technology*, Aug. 1997, p. 31.
"Electronic check presentment on the move," *ABA Banking Journal*, Aug. 1995, pp. 53-56.
"Image Archive Yields Faster Retrieval," News Briefs, *Bank Systems Technology*, May 1996, p. 16.
"Image processing could cut clearing costs," *Banking World*, Apr. 1993, vol. 11, No. 3, pp. 40-41.
"Image system communications," IBM Systems Journal, 1990, pp. 370-383.
"Image technology brings lockbox breakthroughs," *Corporate Cashflow*, vol. 16, No. 9, Sep. 1995, pp. 16-18 and 20.
"Operational image systems: A new opportunity," IBM Systems Journal, 1990, pp. 304-313.
"Six Hardware Devices in One," *Wall Street & Technology*, Mar. 1993, "Product Watch".
"Unisys check imaging delivers the competitive magic of tomorrow. Today.," 1992, Unisys Corporation.
250 U.S. banks to use NCR, Cincinnati Bell financial systems, AT&T News Release [On-line], May 4, 1993 [Retrieved Nov. 15, 2002]. Retrieved from the Internet: <URL:http://www.att.com/news/0593/930504.ncd.html.
A. Cortese, Image yields interest at banks, DialogNews Document [On-line], Mar. 19, 1990 [Retrieved Nov. 25, 2002], p. 6, Computerworld. Retrieved from the Internet: <URL:http://www.dialogselect.com/news/cgi.
*ABA Banking Journal*, vol. LXXXVII, Issue No. 8, Aug. 1995, p. 2.
Allfirst Financial To Use Vector:Capture for Prime Pass To Enable Image Archive-Sterling Commerce helps Allfirst Financial protect existing hardware investment while implementing image strategy, DialogNews Document [On-line], Dec. 8, 2000, 10:31 EST [Retrieved Feb. 10, 2003], Business Wire. Retrieved from the Internet: <URL:http://www.dialogselect.com/news/cgi.

Amato-McCoy, Deena, "State Dept. Credit Union Improves Check Retrieval," *Bank Systems Technology*, Apr. 1997, p. 28.
American National Standard For Financial Image Interchange: Architecture, Overview and System Design Specification (ANSI/ABA X9.xx-1994 Draft version 0.7), American National Standards Institute, Inc., Approved 1994, p. 1-202.
Archive Storage and Retrieval Component Decomposition, FSTC Check Image Interchange Project, May 25, 1995, p. 1-20 with attachments.
Arend, Mark, "Check imaging: Banks are getting the picture," *ABA Banking Journal*, May 1992, pp. 44, 47, 49, 51, 53.
Arnette, Denise A., "Cash management: Banks turn imaging into speedy new delivery products," *Corporate Cashflow*, vol. 15, No. 1, Jan. 1994, pp. 1 and 12-13.
Articles, IBM Systems Journal, vol. 29, Issue 3, pp. 1-2, 1990.
As Banks Cling To The Conventional, Check-Imaging Struts Its Stuff, DialogNews Document [On-line], Mar. 1994 [Retrieved Nov. 20, 2002], p. 1, Bank Technology News. Retrieved from the Internet: <URL:http://www.dialogselect.com/news/cgi.
AT&T Global offers one-step imaging, DialogNews Document [On-line], Feb. 28, 1994 [Retrieved Nov. 15, 2002], vol. 159, No. 39, p. 14A(1), American Banker. Retrieved from the Internet: <URL:http://www.dialogselect.com/news/cgi.
AT&T SIIPS Proof-of-Deposit Operations Guide, AT&T Confidential, D1-4619-A, Issue 1, Mar. 1995.
AT&T SIIPS Proof-of-Deposit Operations Guide, General Information.
AT&T SIIPS Proof-of-Deposit System Administration Guide.
"At Your Service", A Newsletter from the Federal Reserve Bank of Kansas City, Special Ed., Summer 1995. Kansas City.
B. Depompa, IBM adds image-based check processing, DialogNews Document [On-line], Mar. 19, 1990 [Retrieved Nov. 25, 2002], vol. 11, No. 12, p. 12(1), MIS Week. Retrieved from the Internet: <URL:http://www.dialogselect.com/news/cgi.
B. Tracey, IBM unveils first stage of image-check system, DialogNews Document [On-line], Apr. 1990 [Retrieved Nov. 25, 2002], vol. 7, No. 4, p. 12(3), Computers in Banking. Retrieved from the Internet: <URL:http://www.dialogselect.com/news/cgi.
Bahnke, Jeanne, et al., "NSSDC's Mass Storage System Evolves", Mar. 1995, pp. 1 and 2, vol. 11, No. 1., Dec. 2, 2002, http://nssdc.gsfc.nasa.gov/nssdc_news/march95/09_j_behnke_0395.html.
BancorpSouth Inc. Decentralizes Check Capture and Image with BISYS®' Document Solutions [On-line].
Banctec announces new image archiving product and initial sale to major U.S. bank, Business Wire, Nov. 10, 1994, Business Wire, Inc.
BancTec Inc. has received another order for its image statement processing product, DialogNews Document [On-line], Nov. 13, 1991 [Retrieved Nov. 15, 2002], vol. 8, No. 22, p. 5(2), Financial Services Report. Retrieved from the Internet: <URL:http://www.dialogselect.com/news/cgi.
Banctec to Take Over Recognition International, Item Processing Report, May 25, 1995, p. 1-10, vol. 6, No. 10, Phillips Business Information, Inc., Washington, DC, USA.
Banctec/Recognition Merger No Longer A Sure Thing, Item Processing Report, Aug. 31, 1995, p. 1-10, vol. 6, No. 17, Phillips Business Information, Inc., Washington, DC, USA.
Bank Manages Remote Sites With Check-Imaging System, Factiva [On-line], Sep. 12, 1996 [Retrieved Jun. 25, 2003], vol. 7, Issue: 18, Phillips Business Information, Inc. Retrieved from the Internet: <URL:http://global.factiva.com/en/arch/print_results.asp.
Banking's Role In Tomorrow's Payments System, Payments System Overview, A Study Prepared For The Banking Research Fund On Behalf Of The Payments Systems Committee Of The Bankers Roundtable, Furash & Company, Chapter I, vol. II, Jun. 1994.
Banks Eliminate Teller Traffic With 'Smart' ATMs, Factive [On-line], Feb. 3, 1994 [Retrieved Jun. 20, 2003], vol. 5, No. 2, ISSN: 1048-5120, Phillips Business Information, Inc. Retrieved from the Internet: <URL:http://global.factvia.com/en/arch/print_results.asp.
Banks Increase Fees With Image-Cash Management, Factiva [On-line], Nov. 9, 1995 [Retrieved Jun. 25, 2003], vol. 6, Issues: 22, Phillips Business Information, Inc. Retrieved from the Internet: <URL:http://global.factiva.com/en/arch/print_results.asp.

Banks To Check Out Imaging (Solutions), DialogNews Document [On-line], Oct. 19, 1992 [Retrieved Oct. 24, 2002], No. 093, p. 46, CommunicationsWeek International. Retrieved from the Internet: <URL:http://www.dialogselect.com/news/cgi.

Banks To Check Out Imaging, DialogNews Document [On-line], Oct. 19, 1992 [Retrieved Feb. 10, 2003], p. 46, CommunicationsWeek International. Retrieved from the Internet: <URL:http://www.dialogselect.com/news/cgi.

Banks to Test Imaging for Clearing Checks, DialogNews Document [On-line], Sep. 14, 1992 [Retrieved Nov. 20, 2002], p. 35, CommunicationsWeek. Retrieved from the Internet: <URL:http://www.dialogselect.com/news/cgi.

Bantec, Factiva [On-line], Oct. 29, 1992 [Retrieved Jun. 20, 2003], vol. 3, No. 21, ISSN: 1048-5120, Phillips Business Information, Inc. Retrieved from the Internet: <URL:http://global.factiva.com/en/arch/print_results.asp.

Barclays Revs Up IBM Check Imaging System, Technology/Operations, American Banker, pp. 14, Mar. 29, 1994.

Barnett Moving to Image-Based Check Sorting, Technology/Operations, American Banker, pp. 31, Mar. 25, 1994.

Behnke et al., NSSDC's Mass Storage System Evolves [On-line], Mar. 1995 [Retrieved Dec. 2, 2002], vol. 11, No. 1. Retrieved from the Internet: <URL:http://nssdc.gsfc.nasa.gov/nssdc_news/march95/09_i_behnke_0395.html.

Benmohamed, Lotfi, et al., "Architecture and Performance Analysis of a Large Scale Archival and Retrieval System," *Proceedings SPIE—The International Society for Optical Engineering*, vol. 2606, Oct. 25-26, 1995, Philadelphia, Pennsylvania, pp. 36-47.

Bensen, Paul, "Digital imaging solves county's records boom," *Jun. '96 INFORM*, pp. 3 and 28-30.

Bernard, Document Image Processing, 1991: The Imaging Edge (The Association for Information and Image Management's 1991 Conference and Exposition held in Washington, D.C., on Apr. 29-May 2), Seybold Report on Publishing Systems, vol. 20, No. 19, p. 22(8), Jun. 24, 1991.

Beware of Check Image Archival Scheme, Factiva [On-line], Oct. 10, 1996 [Retrieved ???], vol. 7, Issue: 20, Phillips Business Information, Inc. Retrieved from the Internet: <URL:http://.

Bill Processing: U S West Re-engineers with $7.2 Million Unisys Image-based Remittance Processing Solution, DialogNews Document [On-line], Oct. 23, 1995 [Retrieved Nov. 20, 2002], vol. 10, No. 378, p. N/A, Edge, on & about AT&T. Retrieved from the Internet: <URL:http://www.dialogselect.com/news/cgi.

Branch data delivered on CD, DialogNews Document [On-line], Dec. 1990 [Retrieved Feb. 10, 2003], vol. 82, No. 12, p. 60(1), ABA Banking Journal. Retrieved from the Internet: <URL:http://www.dialogselect.com/news/cgi.

Brickell, Cryptology on Smart Cards (Presentation), Sandia National Laboratories, 33 pages.

Brisco, DNS Support for Load Balancing, Apr. 1995, p. 1-7, Trade & Industry; Magazine.

Broadway & Seymour Announces Client/Server Product For Item And Image Processing, DialogNews Document [On-line], Mar. 20, 1995 [Retrieved Nov. 20, 2002], p. 03201186, Business Wire. Retrieved from the Internet: <URL:http://www.dialogselect.com/news/cgi.

Broadway & Seymour announces new VisualImpact release, DialogNews Document [On-line], Mar. 29, 1996 [Retrieved Nov. 20, 2002], p. 3291274, Business Wire. Retrieved from the Internet: <URL:http://www.dialogselect.com/news/cgi.

Broadway & Seymour to Invest in Two Strategic Initiatives, DialogNews Document [On-line], Mar. 15, 1995 [Retrieved Nov. 20, 2002], p. 03151248, Business Wire. Retrieved from the Internet: <URL:http://www.dialogselect.com/news/cgi.

Brouillette, BofA Is Doubtful on No-Check Plan, The American Banker, Apr. 10, 1979, Section: p. 2, American Banker, Inc.

Brubaker, et al., Electronic Check Presentment Is Ready For the Challenge for Same-Day Settlement, American Banker, The Daily Financial Services Newspaper, vol. CLVIII, No. 228, Dec. 1993.

Bussert, The Paper Predicament, A Hunter Publication, vol. 18, No. 7, pp. 72, 74, Jul. 1990.

Capture and Processing Overview, 5 pages.

Carreker, Strides in Electronic Checking Transforming Payment System (Includes Related Articles) (Cover Story), Bank Administration Institute, vol. 68, No. 3, pp. 1-14, Mar. 1, 1992.

Chase's New Image, DialogNews Document [On-line], Mar. 6, 1995 [Retrieved Nov. 15, 2002], No. 517, p. 14, Information Week. Retrieved from the Internet: <URL:http://www.dialogselect.com/news/cgi.

Check Image Exchange Project, FSTC: Projects [On-line][Retrieved Oct. 30, 2002] Retrieved from the Internet: <URL:http://www.fstc.org/projects/imaging/participants.cfm.

Check Image System Opens Doors for Developer, Service Company, Factiva [On-line], Jun. 10, 1993 [Retrieved Jun. 20, 2003], vol. 4, No. 11, ISSN: 1048-5120, Phillips Business Information, Inc. Retrieved from the Internet: <URL:http://global.factiva.com/en/arch/print_results.asp.

Check Processing Conference, Reference Guide, Mar. 22-25, 1994, Bank Administration Institute, New Orleans, Louisiana, USA.

Check Recapture Processing Software Gets U.S. Patent, Factiva [On-line], Apr. 10, 1997 [Retrieved Jun. 26, 2003], vol. 8, Issue: 7, Phillips Business Information, Inc. Retrieved from the Internet: <URL:http://global.factiva.com/en/arch/print_results.asp.

Check-Image Interchange Inches Closer, DialogNews Document [On-line], Jan. 1997 [Retrieved Oct. 24, 2002], vol. 10, No. 1, p. 19, Bank Technology News. Retrieved from the Internet: <URL:http://www.dialogselect.com/news/cgi.

Checks & Checking: Check Imaging At The Teller Station, DialogNews Document [On-line], Oct. 1996 [Retrieved Nov. 21, 2002], vol. 9, No. 10, p. 37, Bank Technology News. Retrieved from the Internet: <URL:http://www.dialogselect.com/news/cgi.

Chemical Chooses IBM Check Imaging, DialogNews Document [On-line], Sep. 1995 [Retrieved Nov. 20, 2002], vol. 8, No. 9, p. 11, Bank Technology News. Retrieved from the Internet: <URL:http://www.dialogselect.com/news/cgi.

Cincinnati Bell Information Systems (Integrators Briefs), DialogNews Document [On-line], Jul. 12, 1993 [Retrieved Nov. 15, 2002], No. 534, p. 129, Computer Reseller News. Retrieved from the Internet: <URL:http://www.dialogselect.com/news/cgi.

Cincinnati Bell: CBIS & Unisys in Major Imaging Agreement, DialogNews Document [On-line], Oct. 29, 1990 [Retrieved Nov. 20, 2002], vol. 5, No. 118, p. N/A, Edge, on & about AT&T. Retrieved from the Internet: <URL:http://www.dialogselect.com/news/cgi.

Cisco partners with AT&T CMS on network switch manufacturing, Lucent Technologies [On-line], Sep. 26, 1995 [Retrieved Dec. 2, 2002]. Retrieved from the Internet: <URL:http://www.lucent.com/press/0995/950926.mma.html.

Computerm Announces Remote Check Imaging Support for VMC 8200 High-Speed Channel Extension System, DialogNews Document [On-line], Apr. 8, 1996 [Retrieved Nov. 25, 2002], p. 408LAM012, PR Newswire. Retrieved from the Internet: <URL:http://www.dialogselect.com/news/cgi.

Computerm eases remote imaging, DialogNews Document [On-line], Aug. 16, 1993 [Retrieved Nov. 25, 2002], vol. 158, No. 156, p. 13A(1), American Banker. Retrieved from the Internet: <URL:http://www.dialogselect.com/news/cgi.

Computerm Enables Boatmen's Bancshares to Execute Remote Check Imaging, DialogNews Document [On-line], Apr. 8, 1996 [Retrieved Nov. 25, 2002], p. 408LAM013, PR Newswire. Retrieved from the Internet: <URL:http://www.dialogselect.com/news/cgi.

Cooney, Frame Relay Comes to Computerm Extenders, Network World, pp. 14, Jun. 28, 1993.

Coyle, et al. Beyond the Hype—Character Recognition and Check Image Processing, You're not Ready to Make a Business Judgment About Image Check Processing, Unless you Understand the Trade-Offs in Acceptance and Substitution rates, Bank Management, vol. LXVII, No. 5, pp. 30-36, May 1991.

CPCS Mass Data Set, 1-92 CPCS Programming and Diagnostic Guide.

Crockett, Imaging System: Fed Seeks Proposals For Check Image System, The American Banker, Apr. 6, 1994, Section: Technology Report, p. 1, American Banker, Inc.

Crowe et al., Concurrent Case Studies IV Check Image Business Solutions (Presentation), Oct. 20, 1995.

Crowe, Marianne, "Imaging: Getting Clear Benefits," *Bank Systems—Technology*, pp. 42, 43, and 1-3.

Current Check Flow (Gheck(1).ppt), p. 1-4.

Davies et al., Security for Computer Networks, An Introduction to Data Security in Teleprocessing and Electronic Funds Transfer, 1989, Second Edition, John Wiley & Sons.

Desmond, DataTrade lets traders gather data across nets, Network World, vol. 7, No. 12, Mar. 19, 1990.

Development of an Image-Enhanced Truncation Check Processing System -Request for Proposals-, Federal Reserve Bank of Boston, Feb. 7, 1992.

Development of an Image-Enhanced Truncation Check Processing System -Request for Proposals-, Federal Reserve Bank of Boston, Feb. 1992.

DFA compacts big features, DialogNews Document [On-line], Dec. 1991 [Retrieved Feb. 10, 2003], vol. 39, No. 12, p. 40(1), Appliance Manufacturer. Retrieved from the Internet: <URL:http://www.dialogselect.com/news/cgi.

DFA compacts big features, DialogNews Document [On-line], May 1992 [Retrieved Feb. 10, 2003], vol. 40, No. 5, p. 20(1), Appliance Manufacturer. Retrieved from the Internet: <URL:http://www.dialogselect.com/news/cgi.

Dinan, R.F. et al., "ImagePlus High Performance Transaction System," *IBM Systems Journal*, vol. 29, No. 3, 1990, pp. 421-434.

DNS Support for Load Balancing, Rutgers University, pp. 1-7, Apr. 1995.

DSI Scores Record Check Image Deal, Factiva [On-line], Dec. 5, 1996 [Retrieved Jun. 26, 2003], vol. 7, Issue: 24, Phillips Business Information, Inc. Retrieved from the Internet: <URL:http://global.factiva.com/en/arch/print_results.asp.

EDS Becomes IBM's First Remote Image Distribution Customer, Factiva [On-line], Mar. 30, 1995 [Retrieved Jun. 24, 2003], vol. 6, Issue: 6. Retrieved from the Internet: <URL:http://global.factiva.com/en/arch/print_results.asp.

Error Messages, NCR 7731 Personal Image Processor (D1-2453-C), 1992, NCR Corporation, USA.

Federal Reserve Spurring Image Technology Use Through Its Own Initiatives, Factiva [On-line], Mar. 19, 1992 [Retrieved Jun. 20, 2003], vol. 3, No. 6, ISSN: 1048-5120, Phillips Publishing, Inc. Retrieved from the Internet: <URL:http://global.factiva.com/en/arch/print_results.asp.

Ferring, Image Processing Seen as Hottest Banking Tool by 1994, The American Banker, Feb. 26, 1990, Section: Technology News, p. 3, American Banker, Inc.

Ferris, Fed Backs Off Plan to Increase Clearing Fees for Remote Banks, The American Banker, Apr. 1, 1985, Section: p. 1, American Banker, Inc.

Few Banks Buying Check-Image Systems, Technology/Operations, American Banker, pp. 16-38, Apr. 5, 1994.

Financial Services Technology Consortium (Ansi6v4(1).ppt), p. 1-27.

Financial Services Technology Consortium Interbank Check Imaging Project Meeting, Lawrence Livermore National Laboratory, Apr. 25-26, 1994, p. JPMC 000964-001010.

Financial Services Technology Consortium Interbank Check Imaging Project, Financial Services Technology Consortium, New York, NY, May 25, 1994.

Financial Services Technology Consortium Interbank Check Imaging Project, ABA Corporate Operations Committee, pp. 1-6, Apr. 28, 1995.

Financial Services Technology Consortium Interbank Check Imaging Project, Financial Services Technology Consortium, New York, NY, May 25, 1994.

Financial Services Technology Consortium Interbank Check Imaging Project White Paper, Jun. 20, 1994, p. 1-30.

Financial Services Technology Consortium, FSTC Presentation to ANSI, Sep. 30-Oct. 1, 1996.

Financial Services Technology Consortium, Interbank Check Imaging Project (Presentation), May 25, 1994.

Financial Services Technology Consortium, PACES Paperless Automated Check Exchange & Settlement Project Proposal, Apr. 23, 1998, p. 1-25.

Fisher, IBM, Customers Continue Work on Document Image Processor, Datamation, vol. 34, No. 19, p. 23(2), pp. 1-3, Oct. 1, 1988.

Fitch, Thomas P., "Check image capture speeds up positive pay reconcilement," *Corporate Cashflow*, vol. 16, No. 2, Feb. 1995, pp. 1, 7 and 11.

Fleming, Trent, "The road to imaging for community banks," *ABA Banking Journal*, Dec. 1993, pp. 60, 62, 65.

Foreward, Parts I-II with Appendices, p. i-50.

Forms Processing Takes Imaging Beyond the Image Text Retrieval Important to Insurance, Banking, Factiva [On-line], Dec. 21, 1995 [Retrieved Jun. 25, 2003], vol. 6, Issue: 25, Phillips Business Information, Inc. Retrieved from the Internet: <URL:http://global.factiva.com/en/arch/print_results.asp.

Forms Processing Takes Imaging Beyond the Image, Reference File Item Processing Report, Dec. 21, 1995, p. 1-2, Phillips Business Information, Inc.

Franca, V., "A Station for Capture, Processing and Storing of Documents," *IEEE, 1991, Proceedings*, vol. II, 6$^{th}$ Mediterranean Electrotechnical Conference, May 22-24, 1991, Ljubljana, Slovenia, Yugoslavia, pp. i-xxviii, and 1264-1267.

From Check Research to Fraud Control, Financial Professionals are turning to: Image-Based Cash Management, EC World, Retrieved from the Internet: ,URL:http://www.ecomworld.com, Apr. 1997.

Frost National Bank selects NCR over old mainframe environment, AT&T News Release [On-line], Apr. 28, 1993 [Retrieved Nov. 15, 2002]. Retrieved from the Internet: <URL:http://www.att.com/news/0493/930428.nca.html.

FSIC Check Image Exchange Project—Proposed Pilot Cash Letter Flow, Mar. 9, 1995, 5 Figures.

FSTC Demonstrates Interbank Check Image Pilot; Multi-Vendor Systems Speeds Check Clearing, Cuts Fraud; FSTC Pilot Lays Foundation for Paper Check Truncation, PR Newswire, Dec. 12, 1995, Section: Financial News, PR Newswire Association, Inc.

FSTC Interbank Check Image Project (no1016v4(1).ppt), p. 1-18.

FSTC Interbank Check Imaging Project, Summary Report, p. 1-11.

FSTC Projects, Check Image Exchange Project, FSTC: Projects [On-line] [Retrieved Oct. 30, 2002]. Retrieved from the Internet: <URL:http://www.fstc.org/project/imaging/public/information.cfm.

Gellerman, California Bank Cashes In On Cash Imaging System, Imaging World, vol. 3, Issue 10, Oct. 18, 1994.

General Information, NCR 7731 Personal Image Processor (D1-2301-D), 1993, NCR Corporation.

Gibbs, Mark, "Networks up close and in depth," *January Inform*, pp. 17-22.

Gopisetty, S., et al., "Automated forms—processing software and services," *IBM Journal of Research and Development*, vol. 40, No. 2, Mar. 1996, pp. 211-230.

Grigsby, Mason, "Document Management—Integrated Document Solutions: The Next Generation," *Managing Office Technology*, Dec. 1996, vol. 41, No. 12, pp. 28-29.

Grimes, IBM Study Finds a Potential Savings Of 12% from Internal Check Nonreturn, The American Banker, May 21, 1980, Section: Bank Automation Annual; p. 14, American Banker, Inc.

Groenfeldt, Tom, "CheckScan gives images to customers," *Bank Systems—Technology*, Dec. 1995, pp. 20, 22.

Group Unveils Paperless Check-Clearing System, Item Processing Report, Dec. 21, 1995, p. 1-8, vol. 6, No. 25, Phillips Business Information, Inc., Washington, DC, USA.

Gullo, NCR Corp.'s Image System May Be Ahead of Its Time, The American Banker, Nov. 16, 1990, Section: Technology News, p. 3, American Banker, Inc.

Gullo, NCR Plans Imaging System To Run on Microprocessor, The American Banker, May 24, 1990, Section: Technology News, p. 3, American Banker, Inc.

Hellauer, Check processors deal with image at conference; Bank Administration Institute's 12th annual check processing conference, Computers in Banking, Jun. 1989, vol. 6, No. 6, p. 14, ISSN: 0742-6496, Information Access Company.

Helm, Banks Check Into Image Processing, Image will Revolutionize Check Processing Even More Than MICR did some 30 Years Ago. Some Bankers Are Eager To Jump In, Even Though It's an Expensive Technology and It's Expected To Do a Lot of Things That It Can't—Yet, Computers in Banking, vol. 7, No. 3, Mar. 1990.

Helm, Sylvia, "Who's doing what in image processing," *ABA Banking Journal*, Jan. 1991, vol. LXXXIII, No. 1, pp. 31-33.

Home Loan Bank to offer check-image statements to members' customers, DialogNews Document [On-line], Dec. 29, 1994 [Retrieved Nov. 15, 2002], vol. 159, No. 248, p. 14(1), American Banker. Retrieved from the Internet: <URL:http://www.dialogselect.com/news/cgi.

Howe, et al., Government Plans for Data Security Spill Over To Civilian Networks, Data Communications, Mar. 1987.

Huntington Bancshares in the Forefront of Technology with Purchase of Unisys Check Imaging System, DialogNews Document [On-line], Oct. 11, 1989 [Retrieved Nov. 20, 2002], p. 1, PR Newswire. Retrieved from the Internet: <URL:http://www.dialogselect.com/news/cgi.

IA Corp. Uses StorageTek Robotic Library for First Client/Server Check Image Archive at Union Bank of California; New client/server CheckVision Archive Application Stores Millions of Checks Per Day Using StorageTek Technology for Quicker Image Retrieval and On-line Client Viewing, Business Wire, Oct. 7, 1996, Business Wire, Inc.

IBM 3898 Image Processor, Product Announcement, IBM, US Marketing & Services, Mar. 13, 1990.

IBM 3898 Image Processor, Product Announcement, Mar. 13, 1990, p. 1-3 w/summary, IBM.

IBM 3995 Optical Library Dataserver Products, IBM Corp., Customized Summary, pp. 1-5, Feb. 20, 1992.

IBM Announces Two Applications, Factiva [On-line], Oct. 12, 1995 [Retrieved Jun. 25, 2003], vol. 6, Issue: 20. Retrieved from the Internet: <URL:http://global.factiva.com/en/arch/print_results.asp.

IBM HPTS General Information Manual, Glossary, Numerics, Bibliography, and Index, 1990, pp. X1 to X15.

IBM ImagePlus High Performance Transactions System Overview, IBM, US Marketing & Services, pp. 1-7, Mar. 13, 1990.

IBM ImagePlus High Performance Transaction System, General Information Manual, 1990, pp. i-x, and 1-1 to 5-10 and A1 to A5.

IBM ImagePlus High Performance Transaction System, General Information Manual, 1990, pp. i-x, and 1-1 to 5-10 and A1 to A6 and X1-X15.

IBM Online Library: Installing and Using the Online Library, IBM Corp., GC31-8311-07, Eighth Edition, Sep. 1998.

IBM Sees Growth Ahead in Image Delivery, Archive, Item Processing Report, Oct. 26, 1995, p. 1-10, vol. 6, No. 21, Phillips Business Information, Inc., Washington, DC, USA.

Iida, Electronic Presentment Due for N.Y. Test, American Banker, vol. CLVII, No. 142, Jul. 27, 1992.

Image Archival System RFP, Federal Reserve Bank of Boston, Version 1.c, Revised Jun. 7, 1994.

Image Archive Forum, Payments System Task Force, 5 pages.

Image Archive Forum, Payments System Task Force, Flow No. 1-13.

Image Interchange Committee Continues to Hone Formal Draft of Standard, Factiva [On-line], Apr. 1, 1993 [Retrieved Jun. 20, 2003], vol. 4, No. 6, ISSN: 1048-5120, Phillips Business Information, Inc. Retrieved from the Internet: <URL:http://global.factiva.com/en/arch/print_results.asp.

Image Processing Package, Factiva [On-line], Aug. 3, 1995 [Retrieved Jun. 25, 2003], vol. 6, Issue: 15. Retrieved from the Internet: <URL:http://global.factiva.com/en/arch/print_results.asp.

Image Quality Functional Requirements, Jul. 26, 1995, p. 1-19.

Image systems gamer NOAC spotlight, DialogNews Document [On-line], Jul. 1989 [Retrieved Oct. 29, 2002], vol. 6, No. 7, p. 8(4), Computers in Banking. Retrieved from the Internet: <URL:http://www.dialogselect.com/news/cgi.

Image Technology in Banking Conference, Octrober 18-20, 1995, Nashville, Tennessee, #P15976.

Image Technology in Banking Conference, Reference Guide, Oct. 18-20, 1995, Bank Administration Institute, Nashville, TN, USA.

Image-Based Check Archival System, Factiva [On-line], Apr. 15, 1993 [Retrieved Jun. 20, 2003], vol. 4, No. 7, ISSN: 1048-5120, Phillips Business Information, Inc. Retrieved from the Internet: <URL:http://global.factiva.com/en/arch/print_results.asp.

ImagePlus High Performance Transaction System (HPTS), IBM Corp., 1990.

Images Shown as Checks Record, The American Banker, May 22, 1979, Section: p. 6, American Banker, Inc.

Imaging is Bridge to Virtual Banking, Factiva [On-line], Nov. 21, 1996 [Retrieved Jun. 26, 2003], vol. 7, Issue: 23, Phillips Business Information, Inc. Retrieved from the Internet: <URL:http://global.factiva.com/en/arch/print_results.asp.

Imaging products, DialogNews Document [On-line], Aug. 1990 [Retrieved Nov. 15, 2002], vol. 100, No. 8, p. 23(3), United States Banker. Retrieved from the Internet: <URL:http://www.dialogselect.com/news/cgi.

Imaging, DialogNews Document [On-line], Nov. 5, 1990 [Retrieved Feb. 10, 2003], p. 8, InformationWeek. Retrieved from the Internet: <URL:http://www.dialogselect.com/news/cgi.

Impact of Imaging, DialogNews Document [On-line], Nov. 1991 [Retrieved Nov. 20, 2002], vol. 67, No. 11, p. 56, Bank Management. Retrieved from the Internet: <URL:http://www.dialogselect.com/news/cgi.

Interbank Check Imaging Networking Requirements & Costs (Presentation), 9 pages.

Interested in Using Image Technology Within Five Years? You Better Start Now, Factiva [On-line], Dec. 26, 1991 [Retrieved Jun. 20, 2003], vol. 2, No. 25, ISSN: 1048-5120, Phillips Publishing, Inc. Retrieved from the Internet: <URL:http://global.factiva.com/en/arch/print_results.asp.

Item processing leaps ahead with VisualImpact and Windows NT, DialogNews Document [On-line], Jun. 1995 [Retrieved Nov. 20, 2002], vol. 105, No. 6, p. S4(3), US Banker. Retrieved from the Internet: <URL:http://www.dialogselect.com/news/cgi.

J&B Introduces Image System, Factiva [On-line], Aug. 3, 1995 [Retrieved Jun. 25, 2003], vol. 6, Issue: 15. Retrieved from the Internet: <URL:http://global.factiva.com/en/arch/print_results.asp.

J. McGinn, IBM ImagePlus High Perforamnce Transaction System, DialogNews Document [On-line], Mar. 21, 1990 [Retrieved Nov. 25, 2002], No. 1389, p. CG103210008, Computergram International, Retrieved from the Internet: <URL:http://www.dialogselect.com/news/cgi.

Kniskern, Engineering a Visionary Solution, Datamation, vol. 36, No. 8, p90(2), pp. 1-3, Apr. 15, 1990.

Kulkosky, Victor, "Wall Street Wakes Up to Image Management," *Wall Street Computer Review*, pp. 39-42.

Kutler, Burroughs, Midland Study Image Processing, The American Banker, Apr. 10, 1979, Section: p. 2, American Banker, Inc.

Kutler, TRW Sells Image Processing System to Norwegian Clearing House, The American Banker, Nov. 16, 1988, Section: Technology Today, p. 9, American Banker, Inc.

Kutler, TRW Sells Image Processing System to Norwegian Clearing House, American Banker, The Daily Financial Services Newspaper, vol. CLIII, No. 224, Nov. 16, 1988.

Lipowicz, Banks Seek Way to Vie With Fed, MSW—Draft, pp. 211-212, Aug. 6, 2003.

Lomb, Reiner, et al., "Storage Management Solutions for Distributed Computing Environments," *Hewlett-Packard Journal*, Oct. 1996, vol. 47, pp. 81-89.

Lunt, Penny, "Image pioneer takes proofing to a higher level," *ABA Banking Journal*, Mar. 1995, vol. LXXXVII, No. 3, pp. 2, 60, 62, 64.

Lunt, Penny, "Microfilm begone—companies want check images," *ABA Banking Journal*, Aug. 1996, vol. LXXXVIII, No. 8, pp. 3, 57, 62.

Lunt, Penny, "Paper-shy brokerages," *ABA Banking Journal*, Oct. 1996, vol. LXXXVIII, No. 10, pp. 3, 73-75.

Lunt, Welcome to sfnb.com The paradigm just shifted, ABA Banking Journal, Dec. 1995, Section: Cover Story, p. 40, American Bankers Association.

M. Barthel, Unisys, Banctec offer PC-based imaging: high-tech check statements produced; community banks are marker, DialogNews Document [On-line], Oct. 8, 1992 [Retrieved Nov. 20, 2002], vol. 157, No. 195, p. 3(1), American Banker, Retrieved from the Internet: <URL:http://www.dialogselect.com/news/cgi.

M. Garvey, Check Processing Goes Digital—Chase Manhattan Bank to store checks electronically, saving time and money, DialogNews Document [On-line], Sep. 15, 1997 [Retrieved Oct. 24, 2002], No. 648, p. 20, InformationWeek. Retrieved from the Internet: <URL:http://www.dialogselect.com/news/cgi.

M. Garvey, Check Processing Goes Digital, InformationWeek Online News in Rev [On-line], [Retrieved Jul. 29, 2002], InformationWeek.com. Retrieved from the Internet: <URL:http://www.informationweek.com/648/48iuchk.htm.

Major Check Industry Changes No Longer A Pipe Dream, Financial Services Report Phillips Business Information, Inc., Factiva, vol. 9, No. 25 ISSN: 0894-7260, pp. 1-5, Dec. 23, 1992.

Major check industry changes on longer a pipe dream; innovations in check processing helps reduce check fraud and cut cost for banking services, Financial Services Report, Dec. 23, 1992, vol. 9, No. 25, p. 2, ISSN: 0894-7260, Information Access Company.

Marjanovic, Fed Buys Banctec Check-Image Storage System, The American Banker, Feb. 1, 1996, Section: Technology/Operations, p. 18, American Banker, Inc.

Marjanovic, Five More Big Regionals Join National Clearinghouse, American Banker, The Daily Financial Services Newspaper, vol. CLIX, No. 140, Jul. 22, 1994.

Marjanovic, Mich. National Streamlines Imaging With IBM System (check imaging), American Banker, vol. 160, No. 176, p14(1), pp. 1-2, Sep. 13, 1995.

Matthews, Markets Jolted by Fed Action, Fears of Frequent Rate Hikes, American Banker, The Daily Financial Services Newspaper, vol. CLIX No. 74, Apr. 19, 1994.

McDonald, Create a National Bank for Imaging Services, The American Banker, Sep. 9, 1991, Section: Comment, p. 4, American Banker, Inc.

Medeiros, Case Studies in Check Image Archive Applications at Large US Banks: Making the Business Case, The Tower Group, Jul. 1998, 016:05W, p. 1-10, The Tower Group, Newton, MA, USA.

Medeiros, Case Studies in Check Imaging Technology for Corporate Cash Management Applications, TowerGroup, Mar. 31, 1996, 007:016W, p. 1-14, TowerGroup, Wellesley, MA, USA.

Medeiros, Check Fraud Prevention Technologies, TowerGroup, Apr. 30, 1996, 008:004, p. 1-16, TowerGroup, Wellesley, MA, USA.

Medeiros, Check Image In Proof-of-Deposit: Update, TowerGroup, Mar. 31, 1996, 007:018, p. 1-11, TowerGroup, Wellesley, MA, USA.

Medeiros, Check Image Technology in Corporate Cash Management Applications, TowerGroup, Feb. 29, 1996, 007:008W, p. 1-8, Exhs. 1-11, TowerGroup, Wellesley, MA, USA.

Medeiros, Check Imaging In Proof-of-Deposit Operations, The Tower Group Research Note, Jul. 30, 1993, 001:006, p. 1-13, The Tower Group.

Medeiros, Check Imaging: The IBM Approach, The Tower Group Research Note, Aug. 10, 1993, 001:010, p. 1-9, The Tower Group.

Medeiros, Check Imaging: The Unisys Approach, The Tower Group Research Note, Aug. 10, 1993, 001:008, p. 1-10, The Tower Group 1993.

Medeiros, Check Processing: Image Technology and the Outsourcing Decision, TowerGroup, Jun. 30, 1995, 004:030, p. 1-7, TowerGroup, Wellesley, MA, USA.

Medeiros, David W., "Image Technology Applications in Check Processing," presented at the BAI Transactions Processing Conference, San Antonio, TX, Mar. 31, 1996, pp. 1-106.

Medeiros, David W., "Image Technology Applications in Check Processing," presented at the BAI Transactions Processing SuperConference, New Orleans, LA, Mar. 24, 1998.

Medeiros, David W., "Introduction to Check and Document Imaging," presented at the BAI Image Technology in Banking Conference, Orlando, FL, Oct. 27, 1996, pp. 1-100.

Medeiros, David W., "Introduction to Check and Document Imaging," presented at the BAI Image Technology in Banking Conference, Nashville, TN, Oct. 18, 1995, pp. 1-93.

Medeiros, David, "Case studies in check imaging technology for corporate cash management applications," The Tower Group, Category: Industry Case Study, check imaging, D100-100, edit history: Sep. 5, 1996.

Medeiros, David, "Check image in proof-of-deposit: update," The Tower Group, Category: Industry Case Study, check imaging, D100-300.

Medeiros, David, "Check image technology in corporate cash management application," The Tower Group, Category: check imaging, Industry Case Study, image lockbox, D100-200.

Medeiros, David, "Small-scale check imaging systems," The Tower Group, Category: Industry Case Study, check imaging, image lockbox, D100-000, edit history: Sep. 5, 1996.

Medeiros, David, "Statement with check images: update," The Tower Group, Category: Industry Case Study, check imaging, D100-400, edit history: Sep. 5, 1996.

Medeiros, Electronic Check Presentment, TowerGroup, Nov. 30, 1994, 003:020, p. 1-18, TowerGroup, Wellesley, MA, USA.

Medeiros, IBM's High Performance Transaction System (HPTS): A Status Report at the Five-Year Point, TowerGroup, Mar. 31, 1995, 004:011, p. 1-12, TowerGroup, Wellesley, MA, USA.

Medeiros, Lockbox Check Processing: Wholesale, Retail, Imaging, and Workflow Technology, TowerGroup, Mar. 31, 1995, 004:012, p. 1-13, TowerGroup, Wellesley, MA, USA.

Medeiros, New Developments in Large-Scale Check Imaging Technology from IBM and Unisys, TowerGroup, Jan. 1997, 011:07, p. 1-13, TowerGroup, Newton, MA, USA.

Medeiros, Small-Scale Check Imaging Systems, TowerGroup, Feb. 28, 1995, 004:007, p. 1-14, TowerGroup, Wellesley, MA, USA.

Medeiros, Statements with Check Images, The Tower Group Research Note, Sep. 30, 1993, 001:013, p. 1-14, The Tower Group.

Medeiros, Statements with Check Images: Update, TowerGroup, Mar. 31, 1996, 007:017R, p. 1-10, TowerGroup, Wellesley, MA, USA.

Medeiros, Update: Check Imaging from IBM and Unisys, TowerGroup, Oct. 31, 1994, 003:019, p. 1-7, TowerGroup, Wellesley, MA, USA.

Medeiros, Workflow Software in Banking, TowerGroup Research Note, Jan. 26, 1994, 002:003, p. 1-15, TowerGroup.

Medeiros, Workflow Software in Banking: Update, The Tower Group, Apr. 30, 1996, 008:006 (replaces 002:003 (Jan. 1994), p. 1-12, TowerGroup, Wellesley, MA, USA.

Memo, Requirements for Image Quality Capture Workstation Software, To: Susan West, Jo Sander, cc: Fred Strange, Larry Ng, From: Lyle Weaver, Jan. 23, 1995, p. JPMC 000853-000863.

Methodology and Value (Presentation), Image Archive Forum, Sep. 19, 1997, p. 1-20; Economic Framework, Jan. 27, 1998 cover page.

Michigan National: First to the IBM Image Statement Punch, Factiva [On-line], Feb. 20, 1992 [Retrieved Jun. 30, 2003], vol. 3, No. 4, ISSN: 1048-5120, Phillips Publishing, Inc. Retrieved from the Internet: <URL:http://global.factiva.com/en/arch/print_results.asp.

Morrall, Katherine, "The Democratization of Imaging," Bankers Monthly, Special Insert, May 1991, vol. CVIII, No. 5, 5 pages.

Multipurpose Image Processor With Compact Unit, DialogNews Document [On-line], Nov. 12, 1990 [Retrieved Feb. 10, 2003], Nov. 12, 1990, No. 728, p. 54, Electronic Buyer' News. Retrieved from the Internet: <URL:http://www.dialogselect.com/news/cgi.

Murphy, Electronic Check Clearing Alternatives Take Shape, ABA Banking Journal, pp. 62-66, May 1993.

Nacha's Electronic Check Council to Push for POS Check Truncation, Factiva [On-line], Mar. 16, 1995 [Retrieved Jun. 24, 2003], vol. 6, Issue: 5. Retrieved from the Internet: <URL:http://global.factiva.com/en/arch/print_results.asp.

Name of Attendees Offerors Conference, pp. 1-2, May 13, 1994.

National City Enhances Wholesale Lockbox Features, DialogNews Document [On-line], Feb. 29, 1996, 11:18 EST [Retrieved Feb. 10, 2003], PR Newswire. Retrieved from the Internet: <URL:http://www.dialogselect.com/news/cgi.

National City, NCR form strategic imaging partnership, AT&T News Release [On-line], Nov. 9, 1992 [Retrieved Nov. 15, 2002]. Retrieved from the Internet: <URL:http://www.att.com/news/1192/921109.nca.html.

NCR and Unisys exchange check images in a pivotal test, DialogNews Document [On-line], Apr. 8, 1993 [Retrieved Nov. 20, 2002], vol. 158, No. 67, p. 3(1), American Banker. Retrieved from the Internet: <URL:http://www.dialogselect.com/news/cgi.

NCR demonstrates full line of retail products at NRF conference, AT&T News Release [On-line], Jan. 18, 1993 [Retrieved Nov. 15, 2002]. Retrieved from the Internet: <URL:http://www.att.com/news/0193/930118.ncd.html.

NCR deposit processing technology speeds banking operations, AT&T News Release [On-line], Dec. 7, 1992 [Retrieved Nov. 15, 2002]. Retrieved from the Internet: <URL:http://www.att.com/news/1292/921207.ncc.html.

NCR Document Management System includes Kodak, Ricoh products, AT&T News Release [On-line], Apr. 6, 1993 [Retrieved Nov. 15, 2002]. Retrieved from the Internet: <URL:http://www.att.com/news/0493/930406.ncc.html.

NCR Helps to Speed Up Check Processing, DialogNews Document [On-line], May 2, 1997 [Retrieved Feb. 10, 2003], p. N/A, Newsbytes News Network. Retrieved from the Internet: <URL:http://www.dialogselect.com/news/cgi.

NCR Introduces Scalable Image Item Processing Solution, AT&T News Release [On-line], Jan. 19, 1996 [Retrieved Nov. 15, 2002]. Retrieved from the Internet: <URL:http://www.att.com/news/0196,960119.nca.html.

NCR Renames SIIPS, Plans New Sorters, DialogNews Document [On-line], Mar. 13, 1997 [Retrieved Feb. 10, 2003], vol. 8, No. 5, p. N/A, Item Processing Report. Retrieved from the Internet: <URL:http://www.dialogselect.com/news/cgi.

NCR signs DSI alliance for imaging statement processing, AT&T News Release [On-line], Jul. 20, 1992 [ Retrieved Nov. 15, 2002]. Retrieved from the Internet: <URL:http://www.att.com/news/0792/920720.nca.html.

NCR Unveils Client-Server Check Imaging, DialogNews Document [On-line], Mar. 1996 [Retrieved Oct. 24, 2002], vol. 9, No. 3, p. 23, Bank Technology News. Retrieved from the Internet: <URL:http://www.dialogselect.com/news/cgi.

NCR Unveils First Multipurpose PC-based Imaging Product, DialogNews Document [On-line], Oct. 29, 1990 [Retrieved Feb. 10, 2003], p. 1, News Release. Retrieved from the Internet: <URL:http://www.dialogselect.com/news/cgi.

NCR Unveils SIIPS New Product Features POD, Customer-Facing Applications, Factiva [On-line], Jan. 18, 1996 [Retrieved Jun. 25, 2003], vol. 7, Issue: 1, Phillips Business Information, Inc. Retrieved from the Internet: <URL:http://global.factiva.com/en/arch/print_results.asp.

NCR, CKI to market image-based credit card chargeback system, AT&T News Release [On-line], Jan. 6, 1993 [Retrieved Nov. 15, 2002]. Retrieved from the Internet: <URL:http://www.att.com/news/0193/930106.ncb.html.

NCR: NCR introduces 7780 item processing system; image-based systems scans and reads documents, DialogNews Document [On-line], Mar. 11, 1992, 06:00 PT [Retrieved on Feb. 10, 2003], Business Wire. Retrieved from the Internet: <URL:http://www.dialogselect.com/news/cgi.

NCR: NCR unveils first multipurpose PC-based imaging product, DialogNews Document [On-line], Oct. 29, 1990, 12:09 PT [Retrieved Feb. 10, 2003], Business Wire. Retrieved from the Internet: <URL:http://www.dialogselect.com/news/cgi.

NCR's ATM Captures Images at the Point of Deposit, Factiva [On-line], Dec. 24, 1992 [Retrieved Jun. 20, 2003], vol. 3, No. 25, ISSN: 1048-5120, Phillips Business Information, Inc. Retrieved from the Internet: <URL:http://global.factiva.com/en/arch/print_results.asp.

NCR's ATM captures images at the point of deposit. (NCR Corp.'s new automated teller machine) (Product Announcement), Dialog(R) File 148: Gale Group Trade & Industry DB, Jan. 20, 1993, 06397449/9, p. 1-4, The Gale Group.

New ATM from AT&T GIS features automated document processing, AT&T News Release [On-line], Nov. 29, 1994 [Retrieved Nov. 15, 2002]. Retrieved from the Internet: <URL:http://www.att.com/news/1194/941129.ncb.html.

New Guide Addresses Future of Payment Systems, Factiva [On-line], Apr. 29, 1993 [Retrieved Jun. 20, 2003], vol. 4, No. 8, ISSN: 1048-5120, Phillips Business Information, Inc. Retrieved from the Internet: <URL:http://global.factiva.com/en/arch/print_results.asp.

New image-based systems target low-volume shops, DialogNews Document [On-line], Apr. 10, 1996 [Retrieved Feb. 10, 2003], vol. 13, p. 7(1), Financial Services Report. Retrieved from the Internet: <URL:http://www.dialogselect.com/news/cgi.

New York Clearing House CHECCRS Project, New York Clearing House, Feb. 25, 1994.

Newman, et al., Cryptography in the Private Sector, IEEE Communications Magazine, vol. 24, No. 8, pp. 7-10, Aug. 1986.

News Briefs, Factiva [On-line], Nov. 6, 1997 [Retrieved Jun. 20, 2003], vol. 8, Issue: 22, Phillips Business Information, Inc. Retrieved from the Internet: <URL:http://global.factiva.com/en/arch/print_results.asp.

Nixdorf Computer Introduces DCPA Image—A Sophisticated Document Image Processing System With Unique Capabilities, PR Newswire, Aug. 15, 1989.

Norwest Bank selects NCR image-based processing systems, AT&T News Release [On-line], Aug. 2, 1993 [Retrieved Nov. 15, 2002]. Retrieved from the Internet: <URL:http://www.att.com/news/0893/930802.nca.html.

Norwest Bank selects NCR image-based processing systems, AT&T News Release [On-line], Aug. 2, 1993 [Retrieved Feb. 10, 2003], Retrieved from the Internet: <URL:http://www.att.com/news/0893/930802.nca.html.

NYCH Gears Up for ECP Pilot, Factiva [On-line], Aug. 6, 1992 [Retrieved Jun. 20, 2003], vol. 3, No. 15, ISSN: 1048-5120, Phillips Publishing, Inc. Retrieved from the Internet: <URL:http://global.factiva.com/en/arch/print_results.asp.

O'Donnell, Dorothy, "The Productive Alternative," *October Inform*, Banking: Financial, and Insurance Case Studies, pp. 3, 46-48, and 50.

O'Keefe, Michele, "Signet's View: Image is (Almost) Everything," *Bank Systems—Technology*, pp. 34+.

O'Sullivan, Orla, "Data warehousing-without the warehouse," *ABA Banking Journal*, Dec. 1996, vol. LXXXVIII, No. 12, pp. 3, 42-44.

On the imaging technology front, DialogNews Document [On-line], Apr. 10, 1996 [Retrieved Nov. 20, 2002], vol. CLXI, No. 68, p. 26, American Banker. Retrieved from the Internet: <URL:http://www.dialogselect.com/news/cgi.

Online Library, Payment Solutions Collections, IBM, Dec. 1998.

Open Scan Technologies and Aquracy.com Team to Speed Exception-Mail Handling, DialogNews Document [On-line], Mar. 7, 2000 [Retrieved Feb. 10, 2003], p. 0480, Business Wire. Retrieved from the Internet: <URL:http://www.dialogselect.com/news/cgi.

Optika, Factiva [On-line], Oct. 1, 1992 [Retrieved Jun. 20, 2003], vol. 3, No. 19, ISSN: 1048-5120, Phillips Business Information, Inc. Retrieved from the Internet: <URL:http://global.factiva.com/en/arch/print_results.asp.

Outlaw, Nowell, "Novell, Inc.," *January Inform*, pp. 36-37.

Payments, Clearance, and Settlement, A guide to the Systems, Risks, and Issues, United States General Accounting Office, Report to the Chairman Committee on Banking and Financial Services, House of Representatives, GAO/GGD-97-73, pp. 1-189, Jun. 1997.

Payments, Clearance, and Settlement; A Guide to the Systems, Risks, and Issues, Report to the Chairman Committee on Banking and Financial Services House of Representatives (001656), Jun. 1997, GAO/GGD97-73, United States General Accounting Office.

PC Image Remittance Systems Vendors Beef Up Features, Factiva [On-line], Mar. 5, 1992 [Retrieved Jun. 20, 2003], vol. 3, No. 5, ISSN: 1048-5120, Phillips Publishing, Inc. Retrieved from the Internet: <URL:http://global.factiva.com/en/arch/print_results.asp.

Pilot Overview—Options 1-3, Addendum and 3 Figures, Apr. 3, 1995, p. 1-5.

Planning and Installation Guide, NCR 7731 Personal Image Processor, (D1-2302-D), 1993, NCR Corporation.

Plesums, C.A., et al., "Large-scale image systems: USAA case study," *IBM Systems Journal*, vol. 29, No. 3, 1990, pp. 342-347.

POD Check Imaging Faces New Challenges, DialogNews Document [On-line], Mar. 1997 [retrieved Oct. 24, 2002], vol. 10, No. 3, p. 23, Bank Technology News. Retrieved from the Internet: <URL:http://www.dialogselect.com/news/cgi.

"Preliminary Invalidity Contentions of Defendants", *United States District Court for the Eastern District of Texas Texarkana Division*, Civil Action No. 5:02cv124, Dec. 3, 2002, pp. 1-20.

Product Description, 7731 Personal Image Processor [On-line] [Retrieved Feb. 10, 2003]. Retrieved from the Internet: <URL:http://www3.ncr.com/product/financial/fsgwat/7731.htm.

Product Overview, 7731 Low-Volume Image Item Processor, NCR—Hardware—7731 [On-line] [Retrieved Feb. 10, 2003], Retrieved from the Internet: <URL: wysiwyg://25/http://www.ncr.com/products/hardware/hw_7731_product.htm.

Program Product, Electronic Payment Systems Support/Check Processing Control System: Program Reference and Operations Manual, Program No. 5734-F11, IBM, Fax from Meinert Engineering, Aug. 8, 2002, 7 pages.

"Program Product", *Electronic Payment Systems Support/check Processing Control System: Program Reference and Operational Manual, 8th ed.*, Jun. 1986, International Business Machines Corporation.

R. Brown, ANSI X9.46 Data Structure Reference, IBM Corporation, Jul. 31, 1995, p. 1-16.

R. Brown, Preliminary Architecture and Project Plan, FSTC Image Interchange Project, Pilot Phase-1A, IBM Corporation, Jun. 30, 1995, p. 1-34.

Regions Bank Selects ImageSoft to Provide Imaging Solution, DialogNews Document [On-line], Sep. 16, 1997 [Retrieved Nov. 15, 2002], p. 9161220, Business Wire. Retrieved from the Internet: <URL:http://www.dialogselect.com/news/cgi.

Remittance Companies Eager to Embrace Uses for New Image Technology, Item Processing Report, Jul. 20, 1995, p. 1-10, vol. 6, No. 14, Phillips Business Information, Inc., Washington, DC, USA.

Remittance processing software released for community banks, DialogNews Document [On-line], Sep. 1, 1993 [Retrieved Feb. 10, 2003], vol. 10, No. 18, p. 6(1), Financial Services Report. Retrieved from the Internet: <URL:http://www.dialogselect.com/news/cgi.

Request for Proposal for Check Image Processing and Archival and Retrieval Systems for the Federal Reserve, Image Archival System RFP, FR-Internal, Version 1.0, Apr. 21, 1994.

Request for Proposal for Check Image Processing and Archival and Retrieval Systems for the Federal Reserve, Image Archival System RFP, Version 1.b, Revised May 26, 1994.

RFP Amendment, RFP Amendment, Offerors, Federal Reserve Bank of Boston RFP #0729, Apr. 12, 1995.

Roush, Crain's Detroit Business, MSW—Draft, pp. 306-308, Aug. 6, 2003.

S. Helm, Who's doing what in image processing, DialogNews Document [On-line], Jan. 1991 [Retrieved Nov. 15, 2002], vol. 83, No. 1, p. 31(3), ABA Banking Journal. Retrieved from the Internet: <URL:http://www.dialogselect.com/news/cgi.

S. Marjanovic, Mich. National streamlines imaging with IBM system, American Banker, Sep. 13, 1995, p. 1-2, vol. 160, No. 176.

Santa Fe Firm Offers Long-Life Data, Data Channels, Jan. 15, 1996, vol. 23, No. 2, ISSN: 0092-7290, Information Access Company.

Scanning goes vertical: a big future for specialized check scanning; check scanning technology, Advanced Imaging, Oct. 1997, p. 42-44.

Secure Remote Access to Financial Services for the Financial Services Industry, Working Draft, American National Standard X9, American Bankers Association, Aug. 10, 1996, United States.

Seeberg, Advanced Document Processing at the Union Bank of Norway, IMC Journal, pp. 23-25, 1983.

Shawmut Saves $200,000 a Year With Image Exception System Factiva [On-line], Dec. 9, 1993 [Retrieved Jun. 20, 2003], vol. 4, No. 24, ISSN: 1048-5120, Phillips Business Information, Inc. Retrieved from the Internet: <URL:http://global.factiva.com/en/arch/print_results.asp.

Signet Bank Processes Over 2,500 Documents/Hour in Unisys Check Imaging Tests, DialogNews Document [On-line], Apr. 9, 1991 [Retrieved Nov. 20, 2002], p. 0409P8428, PR Newswire. Retrieved from the Internet: <URL:http://www.dialogselect.com/news/cgi.

Softchec Licenses 'Envision' Image Solution to West Suburban Bank, DialogNews Document [On-line], Jan. 16, 1996 [Retrieved Nov. 15, 2002], p. 116SETU002, PR Newswire. Retrieved from the Internet: <URL:http://www.dialogselect.com/news/cgi.

Some Issues Related to Check Image Compression, p. JPMC 000920-000930.

Specifications for the Secure Hash Standard, Federal Information Processing Standards Publication 180, May 11, 1993, p. JPMC 000808-000852 (with attached memos).

Sterling Commerce Announces Vector:Capture for Prime Pass for NCR Transports, DialogNews Document [On-line], Feb. 28, 2000, 08:16 EST [Retrieved Feb. 10, 2003], Business Wire. Retrieved from the Internet: <URL:http://www.dialogselect.com/news/cgi.

Storage Technology and Data General Adopt DLT Tape Drives, Data Storage Report, May 1, 1996, Section: ISSN: 0267-5447, Information Access Company.

Sullivan, Deidre, "Bank Technology Trick or Treat?." *Beyond Computing for Financial Services*, Premier Edition, vol. CIX, No. 11, pp. 10-20.

Systematics to use deposited-check imaging; installation at firm's N.J. center would be the first by an outsourcer, DialogNews Document [On-line], May 19, 1993 [Retrieved Nov. 20, 2002], vol. 158, No. 95, p. 3(1), American Banker. Retrieved from the Internet: <URL:http://www.dialogselect.com/news/cgi.

Taubert, C., "Workflow System Rids Branches of Paper," *Bank Systems Technology*, Jun. 1996, p. 26.

Telecom Advances May Cause Overhaul of Checking Industry, Factiva [On-line], Feb. 6, 1992 Retrieved Jun. 20, 2003, vol. 3, No. 3, ISSN: 1048-5120, Phillips Publishing, Inc. Retrieved from the Internet: <URL:http://global.factiva.com/en/arch/print_results.asp.

Teller Hardware, Teller Hardware manufacturers [On-line], Mar. 28, 2001 [Retrieved Feb. 10, 2003]. Retrieved from the Internet: <URL:http://www.amarshall.com/resix/body_x_telh01.html.

The High-Quality Imaging Solution . . . for front or back office processing, 7731, 1999 NCR Corporation, Ohio, USA.

The Image and Check Processing; Truncation, Transmission Not Yet Here, But BancTec Takes A Major Step Forward, United States Banker, Feb. 1983, Section: p. 61, Faulkner & Gray.

The Image Forum, Feb. 28-29; Grand Hotel; Atlanta, GA, Global Concepts HomePage [On-line].

The Leading Edge; Image processing technology: the pieces are falling into place, ABA Banking Journal, Nov. 1985, Section: Computers & Operations, p. 30, American Bankers Association.

Toward a new era of customer service, Bank Systems & Technology, Oct. 1995, vol. 32, No. 10, p. S2-S10, ISSN: 1045-9472; Coden: BSEQD6, UMI, Inc.; ABI/Inform.

Tracey, IBM Unveils First Stage of Image/Check System, Computers in Banking, vol. 7, No. 4, Apr. 1990.

Trafficking Invoices Behind the Freight, Modern Railroads, vol. 44, No. 19, pp. 46-47, Oct. 1989.

Tramer, Giving a Boost to Smaller Banks: Fed's Paperless Check Processing System Helps Little Guys Compete, MSW—Draft, pp. 260-261, Aug. 6, 2003.

TWS Systems Snags Contract, Factiva [On-line], Oct. 24, 1996 [Retrieved ???], vol. 7, Issue: 21, Phillips Business Information, Inc. Retrieved from the Internet: <URL:http://.

Uhrich, The IBM ImagePlus High Performance Transaction System, Today, vol. 12, No. 7, May-Jun. 1992.

Unisys Enhances Check Imager, DialogNews Document [On-line], Oct. 24, 1994 [Retrieved Nov. 20, 2002], vol. CLIX, No. 205, p. 15A, American Banker. Retrieved from the Internet: <URL:http://www.dialogselect.com/news/cgi.

Unisys enters image processing market with two new products and major financial and industrial customers, DialogNews Document [On-line], Oct. 11, 1989 [Retrieved Nov. 20, 2002], p. 1011PH009, PR Newswire. Retrieved from the Internet: <URL:http://www.dialogselect.com/news/cgi.

Unlsys integrates retail/wholesale lockbox solution for remittance processors, DialogNews Document [On-line], Mar. 25, 1997 [Retrieved Nov. 20, 2002], p. 03251075, Business Wire. Retrieved from the Internet: <URL:http://www.dialogselect.com/news/cgi.

Unisys Plans Payment Systems Reorganization, Item Processing Report, Nov. 23, 1995, p. 1-10, vol. 6, No. 23, Phillips Business Information, Inc. Washington, DC, USA.

Unisys provides services to Bank of the West to support retail banking, DialogNews Document [On-line], Sep. 18, 1995

[Retrieved Nov. 20, 2002], p. 9180098, Business Wire. Retrieved from the Internet: <URL:http://www.dialogselect.com/news/cgi.

Unisys solution will support check processing at Vermont Federal, DialogNews Document [On-line], May 20, 1996 [Retrieved Nov. 20, 2002], p. 5201185, Business Wire. Retrieved from the Internet: <URL:http://www.dialogselect.com/news/cgi.

Unisys Upgrades Its InfoImage TTPS/TCPS, Factiva [On-line], Jun. 9, 1994 [Retrieved Jun. 24, 2003], vol. 5, Issue: 11. Retrieved from the Internet: <URL:http://global.factiva.com/en/arch/print_results.asp.

Unisys wins contract to supply imaging solution to Chase Manhattan/FISERV check processing alliance, DialogNews Document [On-line], Jun. 12, 1995 [Retrieved on Nov. 15, 2002], p. 6121175, Business Wire. Retrieved from the Internet: <URL:http://www.dialogselect.com/news/cgi.

Unix-based image statement software, DialogNews Document [On-line], Feb. 1993 [Retrieved Nov. 15, 2002], vol. 85, No. 2, p. 80(1), ABA Banking Journal. Retrieved from the Internet: <URL:http://www.dialogselect.com/news/cgi.

Use of High-Speed Image Remittance Systems Steadily Increases, Factiva [On-line], May 28, 1992 [Retrieved Jun. 20, 2003], vol. 3, No. 11, ISSN: 1048-5120, Phillips Publishing, Inc. Retrieved from the Internet: <URL:http://global.factiva.com/en/arch/print_results.asp.

Using the ImagPlus High Performance Transaction System (HPTS) with IBM System/390 Computers, IBM Corp., 1990.

Vendors plotting remittance strategies, DialogNews Document [On-line], Feb. 12, 1997 [Retrieved Feb. 10, 2003], vol. 14, p. 1(2), Financial Services Report. Retrieved from the Internet: <URL:http://www.dialogselect.com/news/cgi.

Vendors Roll Out Internet Modules, Factiva [On-line], Apr. 11, 1996 [Retrieved Jun. 27, 2003], vol. 7, Issue: 7, Phillips Business Information, Inc. Retrieved from the Internet: <URL:http://global.factiva.com/en/arch/print_results.asp.

Vendors Take Image Interchanges Into Their Own Hands, Factiva [On-line], Apr. 15, 1993 [Retrieved Jun. 20, 2003], vol. 4, No. 7, ISSN: 1048-5120, Phillips Business Information, Inc. Retrieved from the Internet: <URL:http://global.factiva.com/en/arch/print_results.asp.

Verifone software links PCs to the point of sale, DialogNews Document [On-line], Aug. 16, 1993 [Retrieved Nov. 25, 2002], vol. 158, No. 156, p. 13A(1), American Banker. Retrieved from the Internet: <URL:http://www.dialogselect.com/news/cgi.

VSoft Offers Check Imaging, Factiva [On-line], Oct. 10, 1996 [Retrieved ??], vol. 7, Issue: 20, Phillips Business Information, Inc. Retrieved from the Internet: <URL:http://.

Wagner, Sizing Up The Impact of Image Processing, Computers in Banking, vol. 6, No. 6, pp. 22, 68, Jun. 1989.

Wells, Bev, "Why digitations means dollars: The corporate stake in bank imaging," *Corporate Cashflow*, vol. 15, No. 9, Aug. 1994, p. 1 and pp. 30-32.

Western Bank purchases NCR's Document Managing System, AT&T News Release [On-line], Aug. 31, 1993 [Retrieved Nov. 15, 2002]. Retrieved from the Internet: <URL:http://www.att.com/news/0892/930831.nca.html.

When clients need to check, Continental's quick with a fax, DialogNews Document [On-line], Nov. 8, 1993 [Retrieved Feb. 10, 2003], vol. 158, No. 214, p. 8A(2), American Banker. Retrieved from the Internet: <URL:http://www.dialogselect.com/news/cgi.

Yes, Virginia, There is a Payback to Imaging, Factiva [On-line], Dec. 19, 1996 [Retrieved Jun. 26, 2003], vol. 7, Issue: 25, Phillips Business Information, Inc. Retrieved from the Internet: <URL:http://global.factiva.com/en/arch/print_results.asp.

Unknown, TBD-ACC-No.: NN9104328 published on Apr. 1, 1991, Integrated automatic coin banking system, IBM Technical Disclosure Bulletin, vol. 33, Issue 11, pp. 329.

Unknown, Transaction completion code based on digital signature, TDB-ACC-No. NN85081109, Aug. 1, 1985, vol. 28, Issue 3, pp. 1109-1122.

Josephson, "Electronic cheque processing method for bank—involves transmitting return notification relating to list of potentially returnable cheques from payer bank to presenting bank." Serwent-ACC-No.: 1998-427151, published on Jul. 21, 1998.

\* cited by examiner

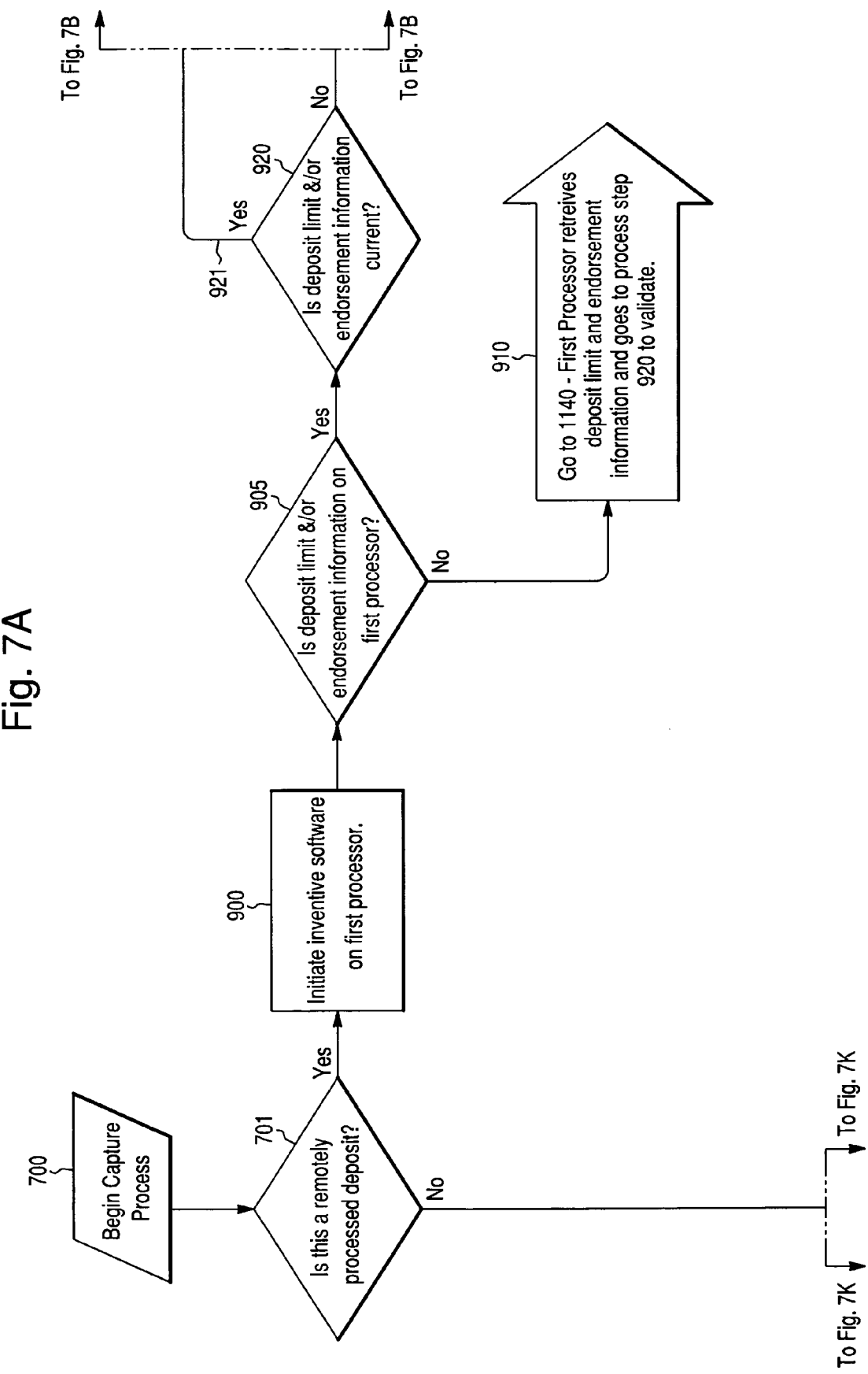

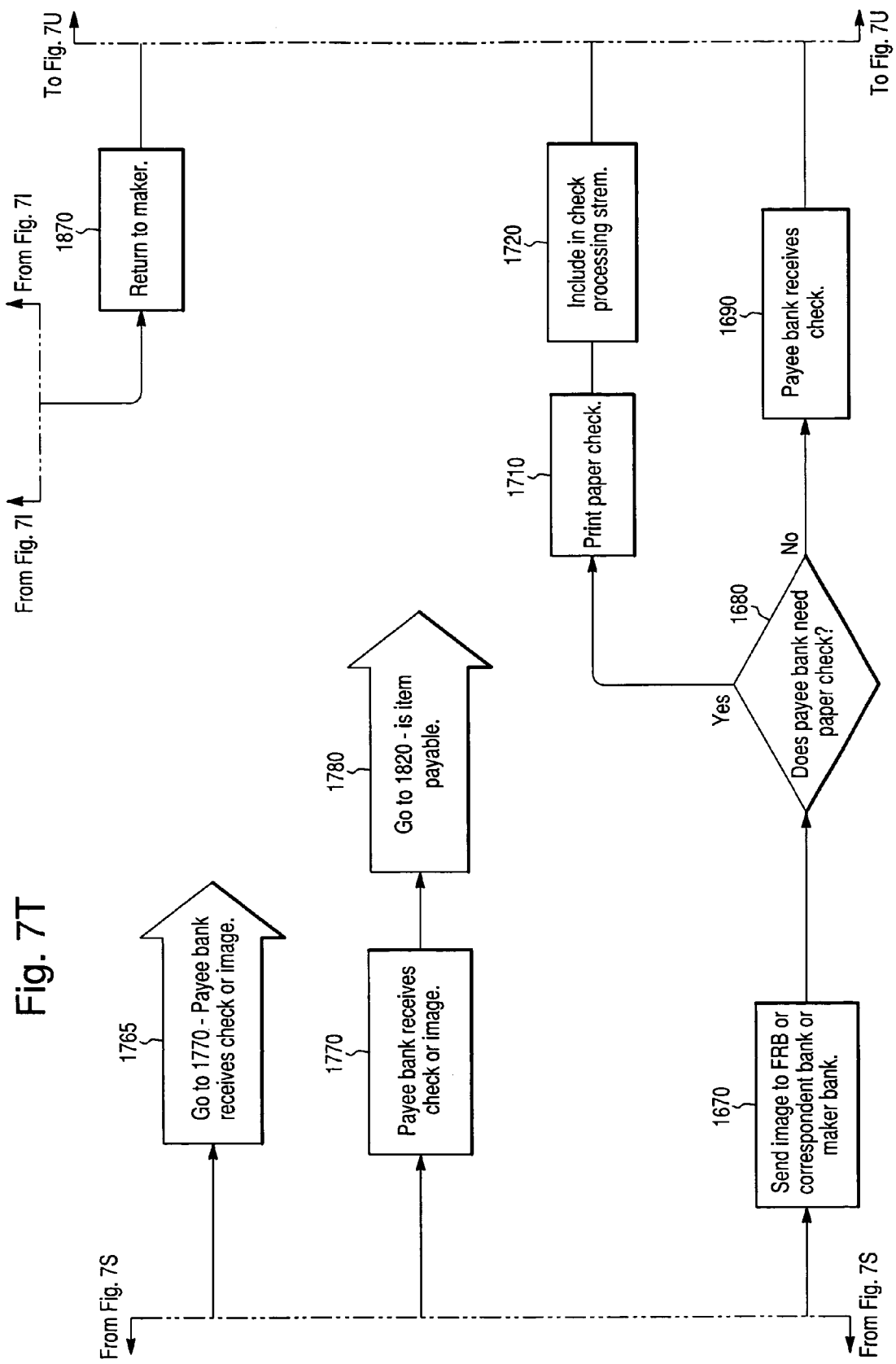

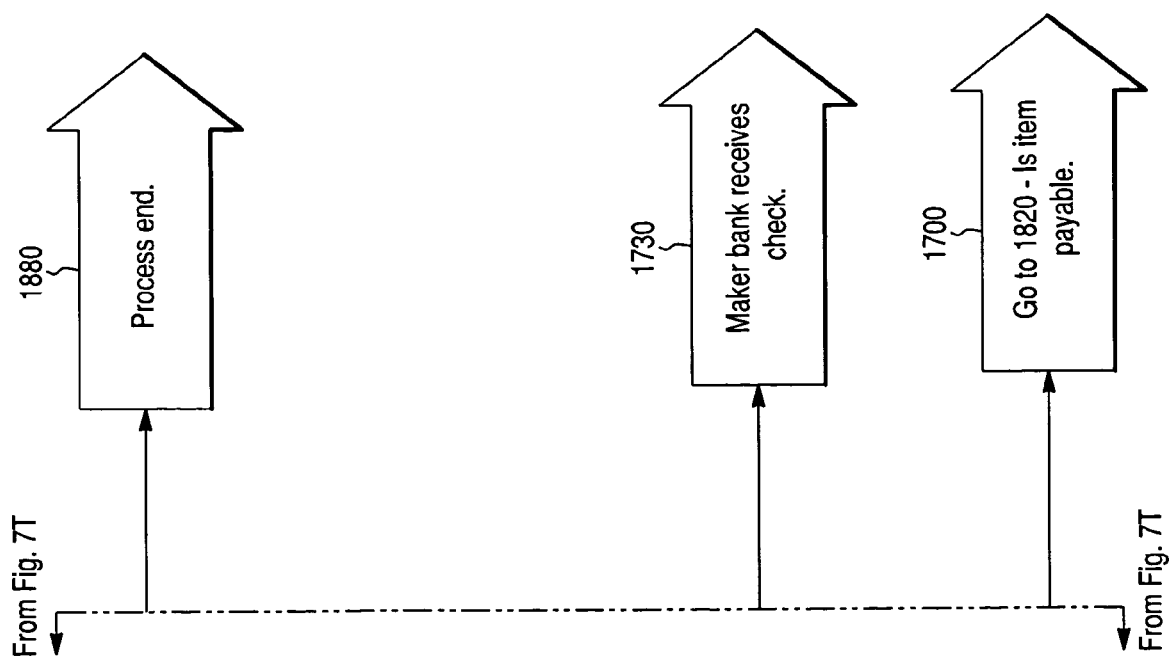

METHODS AND SYSTEMS FOR PROCESSING FINANCIAL INSTRUMENT DEPOSITS

CROSS-REFERENCE TO RELATED PATENT APPLICATIONS

This application is a Continuation in Part of U.S. application Ser. No. 09/560,779, filed Apr. 28, 2000. This application is a Continuation-in-Part of U.S. application Ser. No. 09/676,956, filed Apr. 28, 2000, which is a Continuation in part of U.S. application Ser. No. 09/560,779, filed Apr. 28, 2000. This application is an application claiming the benefit under 35 U.S.C. 119(e) of U.S. application Ser. No. 60/397,897, filed Jul. 22, 2002.

BACKGROUND OF THE INVENTION

1. The Field of the Invention

The present invention relates to physical financial instrument processing. More particularly, the present invention relates to a method and system for remotely processing checks through electronic interaction between the physical location of the instrument, a depository financial institution, and the check maker financial institution.

2. The Relevant Technology

The act of depositing or otherwise converting a financial instrument such as a check, draft, or other instrument has generally required the physical presentment of the instrument by the bearer to a financial institution such as a bank, credit union, or other institution authorized to accept and process monetary instruments. Indeed, the depositing and clearing of checks has heretofore involved individuals or organizations physically taking their deposit, such as in the form of a check, to financial institutions or trusted remote institutional branches, otherwise known as the bank of first deposit 101, where the deposit may be accepted, and credited to the bank customer's account, of course, subject to the check "clearing" with the maker financial institution. Depositing is the act of the payee (person to whom the check is payable and also known as the depositor) of a check, or other monetary instrument such as a postal money order, travelers check, etc., taking the monetary instrument to a bank where the payee has a deposit account (such as a checking account or savings account) and having the payee's bank credit the amount of the check into the payee's deposit account and forwarding the check to the bank of the check drawer (person who makes out a check and presents it to another person or company for payment of a debt, etc.) for the purpose of removing the amount of the check from the check drawer's checking account and forwarding that money to the payee's bank for crediting to the check payee's deposit account. All of the processes associated with the payee's bank accepting the check for deposit, crediting the check amount to the depositor's account, forwarding the check to the maker bank for clearing of funds back to the payee's bank can be referred to individually and collectively as post deposit processing. Maker bank, maker bank and drawer bank all are used to identify the bank on which the check is drawn and in which the account of the person responsible for making the check is located. Check maker, maker, payor are terms used to identify the person who wrote the check and who is responsible for paying the person who has been given the check in settlement of a financial obligation. Check Payee or payee are terms used to identify the person or other entity who the check was written in payment for some financial obligation.

Financial institutions have developed methods for reducing the amount of paper flow associated with checks within their organizations, however, their target has not been to reduce processing costs, improve the timeliness of the money collection from other financial institutions, and reduce costs associated with handling, storing and returning paper checks to the maker. Therefore, it would be an advancement to provide a new system centered on electronic information that does not require the transportation of an original paper item for deposit and presentment at the maker bank.

Therefore, it would be advantageous to provide an electronic processing system and method that could provide a bearer of a check the convenience to "deposit" a check at a facility, such as a home or office, that is not necessarily a traditional bank or bank branch facility.

It would also be advantageous to provide a method and system for allowing the remote depositing and processing of a check that does not require the physical routing of the actual check in order to accomplish the various post-deposit processing of a check. It would yet be a further advantage to provide a method and system for improving the collection time involved with the funds represented by the check (i.e., reduce credit "float"). Float on an item defines how long it takes a monetary item to go through the check collection process and have the funds represented by the amount of the check withdrawn from the check maker's checking account and credited to the check depositor's checking account.

It would be a benefit to provide a method and system for reducing expenses associated with the transportation costs involved in sending the checks from the bank of first deposit 101 to the maker financial institution. It would be a further benefit to provide a method and system to automate and expedite the settlement processes associated with clearing checks between financial institutions. Settlement processes are the processes involved in transferring the money associated with a monetary item from the check maker's account at the maker bank to the payee's deposit account at the bank of first deposit 101.

It would also be a benefit to provide a method and system for reducing the check storage expenses incurred by the bank of first deposit 101.

It would be a further benefit to enable the bank of first deposit 101 to reduce the staffing, facilities (i.e., physical buildings), and equipment required to accept and process physical checks.

It would be yet another benefit for the settlement process to be automated in a manner that enables all of the accounting entries required to settle the funds between the depositor's account and the check makers account to be done automatically thus reducing the manpower costs and time involved in the traditional check deposit settlement process.

BRIEF SUMMARY OF THE INVENTION

The present invention comprises in one embodiment, a program product is provided for deposit processing a plurality of original checks deposited at a first processor at a remote site with accompanying deposit information comprising machine-readable program code for causing, when executed, a machine to perform the following steps: receiving at a second processor deposit information including a deposit account designation and where a plurality of checks from different third parties are being deposited by a single depositor a deposit sum, and electronic check data and original check image data for a plurality of checks to be deposited; identifying at the second processor MICR errors and/or image data errors in the electronic data received; if MICR and/or image data errors are identified in the electronic data, then the second processor sending an instruction to the remote site to correct the errors; if no errors are identified, the second processor sending endorsement and/or voiding authorization to the first processor at the remote site; receiving at the second processor endorsed and voided check image data; associating at the second processor the endorsed and voided check image data with the original check image data; sending the associated endorsed check image data and the original check image data to a third processor remote from the second processor; the third processor providing the electronic deposit data to an accounting system for a bank of first deposit; the third processor sorting the associated received data; and the third processor transmitting electronic check data and the original check image data and/or the endorsed and voided check image data directly or indirectly to a maker bank or a print site associated therewith.

In a further embodiment of the present invention, a program product is provided for deposit processing of original checks, comprising machine-readable program code for causing, when executed, a machine to perform the following steps: at least one check processor receiving from at least one remote first processor in one or more transmissions deposit information for a plurality of different deposit transactions, with the deposit information including a deposit account designation for a bank of first deposit, electronic check data and original check image data and endorsed and voided check image data for at least one check to be deposited, the at least one check processor operating to detect MICR check errors and to perform sorting of the deposit information; transmitting at least a portion of the deposit information to an accounting system for the bank of first deposit; selecting a print processor that has access to at least one printer based on at least one criterion; sending the electronic check data and the original and/or endorsed and voided check image data to the selected print processor; identifying a clearing end point for receiving the electronic check data and the original and/or endorsed and voided check image data; generating cash letter data for a maker bank based at least in part on the electronic check data; the print processor transmitting the electronic check data and the original and/or the endorsed and voided check image data and the cash letter data directly or indirectly to the selected end point and/or to at least one printer.

In yet a further embodiment of the present invention, the at least one processor comprises a second processor performing a step of detecting MICR errors, and a transmitting the deposit information to a third processor, the third processor performing sorting of the deposit information.

In yet a further embodiment of the present invention, the clearing end point is a maker bank, or a Federal Reserve Bank associated with the maker bank, or a correspondent bank for the maker bank.

In yet a further embodiment of the present invention, the print processor transmits the electronic check data and the original and/or endorsed and voided check image data and the cash letter to the printer and the printer then prints the data and delivers the printed data to the selected clearing end point.

In yet a further embodiment of the present invention, a step is provided of electronically adding information about the identified clearing end point to the data to be transmitted directly or indirectly to the end point and/or the at least one printer.

In yet a further embodiment of the present invention, a step is provided of electronically adding information about an alternate clearing end point to the data to be transmitted directly or indirectly to the end point and/or the at least one printer.

In yet a further embodiment of the present invention, the selecting a print processor step comprises accessing at least one decision component and determining based on the criterion the print processor.

In yet a further embodiment of the present invention, the decision component is a table including maker bank identifiers and associated print processors, and wherein at least one criterion is proximity of a print processor to the identified end point.

In yet a further embodiment of the present invention, the maker bank identifier is a route and transit number.

In yet a further embodiment of the present invention, the table includes information for an accepted method for sending electronic check data and original and/or endorsed and voided check image data or a printed copy thereof to a maker bank identified by a maker bank identifier.

In yet a further embodiment of the present invention, the table further includes all printers associated with print processor and information about an attribute of a plurality of maker banks with respect to the printers.

In yet a further embodiment of the present invention, the identifying the clearing end point comprises accessing at least one decision component for determining the clearing end point for the maker bank.

In yet a further embodiment of the present invention, the table further comprises a listing of at least one alternate print processor or printer for each of a plurality of maker bank identifiers.

In yet a further embodiment of the present invention, a step is provided of determining a preference of a maker bank for receiving either check image data or a hard copy from the check image data.

In yet a further embodiment of the present invention, a step is provided of identifying a default clearing end point based on at least one criterion.

In yet a further embodiment of the present invention, the print processor performs the step of identifying the clearing end point.

In yet a further embodiment of the present invention, the identifying a clearing end point step comprises accessing at least one decision component and making a determination based on at least one end point criterion.

In yet a further embodiment of the present invention, the at least one end point criterion is a designation by the bank of first deposit of the clearing end point for the maker bank.

In yet a further embodiment of the present invention, the at least one decision component comprises a table that includes a plurality of maker banks and one or more associated clearing end points therefor as determined by the bank of first deposit.

In yet a further embodiment of the present invention, the selected print processor sends the original and/or endorsed check image data to an alternate print processor when at least one routing criterion is met.

In yet a further embodiment of the present invention, the routing criterion is that print processor or printer associated therewith or a telecommunications link is not operational.

In yet a further embodiment of the present invention, the sorting comprises sorting the received data by maker bank to obtain at least one bundle of sorted checks for the maker bank.

In yet a further embodiment of the present invention, the selected print processor receives image data for a bundle of sorted checks and sends the entire bundle to a same printer for printing if a sending criterion is met.

In yet a further embodiment of the present invention, the sending criterion is that the number of sorted checks in the bundle is less than a predetermined number.

In yet a further embodiment of the present invention, the sending step to the same printer is performed as a part of a load balancing function.

In yet a further embodiment of the present invention, the print processor generates total data for settlement between a bank of first deposit and a maker bank and transmits said total data to at least one of the bank of first deposit and the maker bank.

In yet a further embodiment of the present invention, the third processor generates total data for settlement between a bank of first deposit and a maker bank and transmits said total data to at least one of the bank of first deposit and the maker bank.

In yet a further embodiment of the present invention, the generating total data for settlement comprises accumulating over a predetermined period of time check amounts or cash letter amounts from a given bank of first deposit to a given maker bank to obtain the total data and sending the total data to a settlement process.

In yet a further embodiment of the present invention, the generating total data for settlement comprises accumulating over a predetermined period of time check amounts or cash letter amounts from a given bank of first deposit to a given maker bank to obtain the total data and sending the total data to a settlement process.

In yet a further embodiment of the present invention, the total data generating step is performed when a settlement criterion is met.

In yet a further embodiment of the present invention, the settlement criterion is that a predetermined time period has elapsed.

In yet a further embodiment of the present invention, the settlement criterion is that a predetermined number of items from checks or cash letters has been processed by the clearing end point.

In yet a further embodiment of the present invention, the settlement criterion is that a predetermined time period has elapsed.

In yet a further embodiment of the present invention, the settlement criterion is that a predetermined number of items from checks or cash letters has been processed by the clearing end point.

In yet a further embodiment of the present invention, the at least one check processor generates the cash letter data.

In yet a further embodiment of the present invention, the print processor generates the cash letter data.

In yet a further embodiment of the present invention, the cash letter data is generated based on at least one cash letter criterion.

In yet a further embodiment of the present invention, the cash letter criterion is accumulating a predetermined number of items of deposit information in a bundle or accumulating a predetermined number of bundles.

In yet a further embodiment of the present invention, the deposit information for a plurality of different deposit transactions for the maker bank from a plurality of different remote site first processors are combined to form cash letter data for a single cash letter for the maker bank.

In yet a further embodiment of the present invention, a step is provided of creating a system notification of successful delivery to the identified end point of the cash letter and any associated hard copy check or transmission of cash letter data and associated check image data.

In yet a further embodiment of the present invention, the print processor selects a plurality of printers and divides check image data associated with the cash letter into different divided portions and sends each different divided portion to a different one of the plurality of different printers.

In yet a further embodiment of the present invention, the at least one check processor receiving step comprises receiving in a separate transmission the endorsed and voided check image data and associating the endorsed and voided check image data as part of particular deposit information.

In yet a further embodiment of the present invention, a step is provided of receiving at the at least one check processor customer-added information about the deposit transaction or the check; and performing tracking of particular deposit transactions based on the customer added information.

In yet a further embodiment of the present invention, a step is provided of sending information derived from the tracking step to at least one of the bank of first deposit and the maker bank.

In yet a further embodiment of the present invention, a step is provided of marking the deposit information as pertaining to a real-time posting of the deposit information.

In yet a further embodiment of the present invention, the deposit information is received from a point of sale processor.

In yet a further embodiment of the present invention, steps are provided of receiving from the maker bank in advance of presentment of the at least one check associated with the deposit transaction from the point of sale processor a maker bank validation notice for the at least one check; and transmitting a validation notification to the point of sale location in real-time.

In yet a further embodiment of the present invention, a step is provided of sending information to the maker bank to place a hold on funds in an account indicated by the check at least equal to an amount of the check and reserve those held funds for payment.

In yet a further embodiment of the present invention, steps are provided of receiving from a merchant a request for electronic check data and/or check image data from a deposit transaction; and transmitting the requested electronic check data and/or the check image data to the merchant.

In yet a further embodiment of the present invention, program product is provided for deposit processing of original checks, comprising: at least one check processor receiving from at least one remote first processor in one or more transmissions deposit information for a plurality of different deposit transactions, the deposit information including a deposit account designation for a bank of first deposit, electronic check data and original check image data and endorsed and voided check image data for at least one check to be deposited, the at least one check processor operating to detect MICR check errors and to perform sorting of the deposit information; transmitting at least a portion of the deposit information to an accounting system for the bank of first deposit; identifying a clearing end point for receiving the electronic check data and the original and/or endorsed and voided check image data; sending the electronic check data and the original and/or endorsed and voided check image data directly or indirectly to the identified clearing end point; generating cash letter data for a maker bank based at least in part on the electronic check data; transmitting electronic check data and the original and/or the endorsed and voided check image data and the cash letter data directly or indirectly to the end point and/or to at least one printer; generating total data for settlement between the bank of first deposit and the maker bank; and transmitting the total data to a at least one of the bank of first deposit and the maker bank.

In yet a further embodiment of the present invention, the identifying the clearing end point comprises accessing at least one decision component for determining the clearing end point for the maker bank.

In yet a further embodiment of the present invention, the decision component is a table including maker bank identifiers and at least one associated clearing end point for each maker bank.

In yet a further embodiment of the present invention, the table includes information for an accepted method for sending electronic check data and original and/or endorsed and voided check image data or a printed copy thereof to a maker bank identified by a maker bank identifier.

In yet a further embodiment of the present invention, the table further includes at least one printer associated with the identified clearing end point.

In yet a further embodiment of the present invention, the table further comprises a listing of at least one alternate printer for each of a plurality of maker bank identifiers.

In yet a further embodiment of the present invention, a step is provided of the at least one check processor sending the original and/or endorsed check image data to a primary printer based on at least one criterion.

In yet a further embodiment of the present invention, the at least one check processor sends the original and/or endorsed check image data to an alternate printer when at least one routing criterion is met.

In yet a further embodiment of the present invention, the routing criterion is that the primary printer or a telecommunications link associated therewith is not operational.

In yet a further embodiment of the present invention, the at least one check processor sends image data for an entire bundle of sorted checks to a same printer for printing if a sending criterion is met.

In yet a further embodiment of the present invention, the at least one check processor selects a plurality of printers and divides check image data associated with the cash letter into different divided portions and sends each different divided portion to a different one of the plurality of different printers.

In yet a further embodiment of the present invention, a method is provided for deposit processing a plurality of original checks deposited at a first processor at a remote site with accompanying deposit information, comprising: receiving at a second processor deposit information including a deposit account designation and where a plurality of checks from different third parties are being deposited by a single depositor a deposit sum, and electronic check data and original check image data for a plurality of checks to be deposited; identifying at the second processor MICR errors and/or image data errors in the electronic data received; if MICR and/or image data errors are identified in the electronic data, then the second processor sending an instruction to the remote site to correct the errors; if no errors are identified, the second processor sending endorsement and/or voiding authorization to the first processor at the remote site; receiving at the second processor endorsed and voided check image data; associating at the second processor the endorsed and voided check image data with the original check image data; sending the associated endorsed check image data and the original check image data to a third processor remote from the second processor; the third processor providing the electronic deposit data to an accounting system for a bank of first deposit; the third processor sorting the associated received data; and the third processor transmitting electronic check data and the original check image data and/or the endorsed and voided check image data directly or indirectly to a maker bank or a print site associated therewith.

In yet a further embodiment of the present invention, a method is provided for deposit processing of original checks, comprising: at least one check processor receiving from at least one remote first processor in one or more transmissions deposit information for a plurality of different deposit transactions, with the deposit information including a deposit account designation for a bank of first deposit, electronic check data and original check image data and endorsed and voided check image data for at least one check to be deposited, the at least one check processor operating to detect MICR check errors and to perform sorting of the deposit information; transmitting at least a portion of the deposit information to an accounting system for the bank of first deposit; selecting a print processor that has access to at least one printer based on at least one criterion; sending the electronic check data and the original and/or endorsed and voided check image data to the selected print processor; identifying a clearing end point for receiving the electronic check data and the original and/or endorsed and voided check image data; generating cash letter data for a maker bank based at least in part on the electronic check data; the print processor transmitting the electronic check data and the original and/or the endorsed and voided check image data and the cash letter data directly or indirectly to the selected end point and/or to at least one printer.

In yet a further embodiment of the present invention, a system is provided for deposit processing a plurality of original checks deposited at a first processor at a remote site with accompanying deposit information, comprising: a receiver for receiving at a second processor deposit information including a deposit account designation and where a plurality of checks from different third parties are being deposited by a single depositor a deposit sum, and electronic check data and original check image data for a plurality of checks to be deposited; a component for identifying at the second processor MICR errors and/or image data errors in the electronic data received; a component for, if MICR and/or image data errors are identified in the electronic data, then the second processor sending an instruction to the remote site to correct the errors; a component for, if no errors are identified, the second processor sending endorsement and/or voiding authorization to the first processor at the remote site; a component for receiving at the second processor endorsed and voided check image data; a component for associating at the second processor the endorsed and voided check image data with the original check image data; a component for sending the associated endorsed check image data and the original check image data to a third processor remote from the second processor; wherein the third processor provides the electronic deposit data to an accounting system for a bank of first deposit and also sorts the associated received data, and transmits the electronic check data and the original check image data and/or the endorsed and voided check image data directly or indirectly to a maker bank or a print site associated therewith.

In yet a further embodiment of the present invention, a system is provided for deposit processing of original checks, comprising: at least one check processor for receiving from at least one remote first processor in one or more transmissions deposit information for a plurality of different deposit transactions, with the deposit information including a deposit account designation for a bank of first deposit, electronic check data and original check image data and endorsed and voided check image data for at least one check to be deposited, the at least one check processor operating to detect MICR check errors and to perform sorting of the deposit information; a transmitter for transmitting at least a portion of the deposit information to an accounting system for the bank of first deposit; a component for selecting a print processor that has access to at least one printer based on at least one criterion; a component for sending the electronic check data and the original and/or endorsed and voided check image data to the selected print processor; a component for identifying a clearing end point for receiving the electronic check data and the original and/or endorsed and voided check image data; a component for generating cash letter data for a maker bank based at least in part on the electronic check data; wherein the print processor transmits the electronic check data and the original and/or the endorsed and voided check image data and the cash letter data directly or indirectly to the selected end point and/or to at least one printer.

In yet a further embodiment of the present invention, a method is provided for deposit processing of original checks, comprising: at least one check processor receiving from at least one remote first processor in one or more transmissions deposit information for a plurality of different deposit transactions, the deposit information including a deposit account designation for a bank of first deposit, electronic check data and original check image data and endorsed and voided check image data for at least one check to be deposited, the at least one check processor operating to detect MICR check errors and to perform sorting of the deposit information; transmitting at least a portion of the deposit information to an accounting system for the bank of first deposit; identifying a clearing end point for receiving the electronic check data and the original and/or endorsed and voided check image data; sending the electronic check data and the original and/or endorsed and voided check image data directly or indirectly to the identified clearing end point; generating cash letter data for a maker bank based at least in part on the electronic check data; transmitting electronic check data and the original and/or the endorsed and voided check image data and the cash letter data directly or indirectly to the end point and/or to at least one printer; generating total data for settlement between the bank of first deposit and the maker bank; and transmitting the total data to a at least one of the bank of first deposit and the maker bank.

In yet a further embodiment of the present invention, a system is provided for deposit processing of original checks, comprising: at least one check processor for receiving from at least one remote first processor in one or more transmissions deposit information for a plurality of different deposit transactions, the deposit information including a deposit account designation for a bank of first deposit, electronic check data and original check image data and endorsed and voided check image data for at least one check to be deposited, the at least one check processor operating to detect MICR check errors and to perform sorting of the deposit information; a transmitter for transmitting at least a portion of the deposit information to an accounting system for the bank of first deposit; a component for identifying a clearing end point for receiving the electronic check data and the original and/or endorsed and voided check image data; a component for sending the electronic check data and the original and/or endorsed and voided check image data directly or indirectly to the identified clearing end point; a component for generating cash letter data for a maker bank based at least in part on the electronic check data; a component for transmitting electronic check data and the original and/or the endorsed and voided check image data and the cash letter data directly or indirectly to the end point and/or to at least one printer; a component for generating total data for settlement between the bank of first deposit and the maker bank; and a component for transmitting the total data to a at least one of the bank of first deposit and the maker bank.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
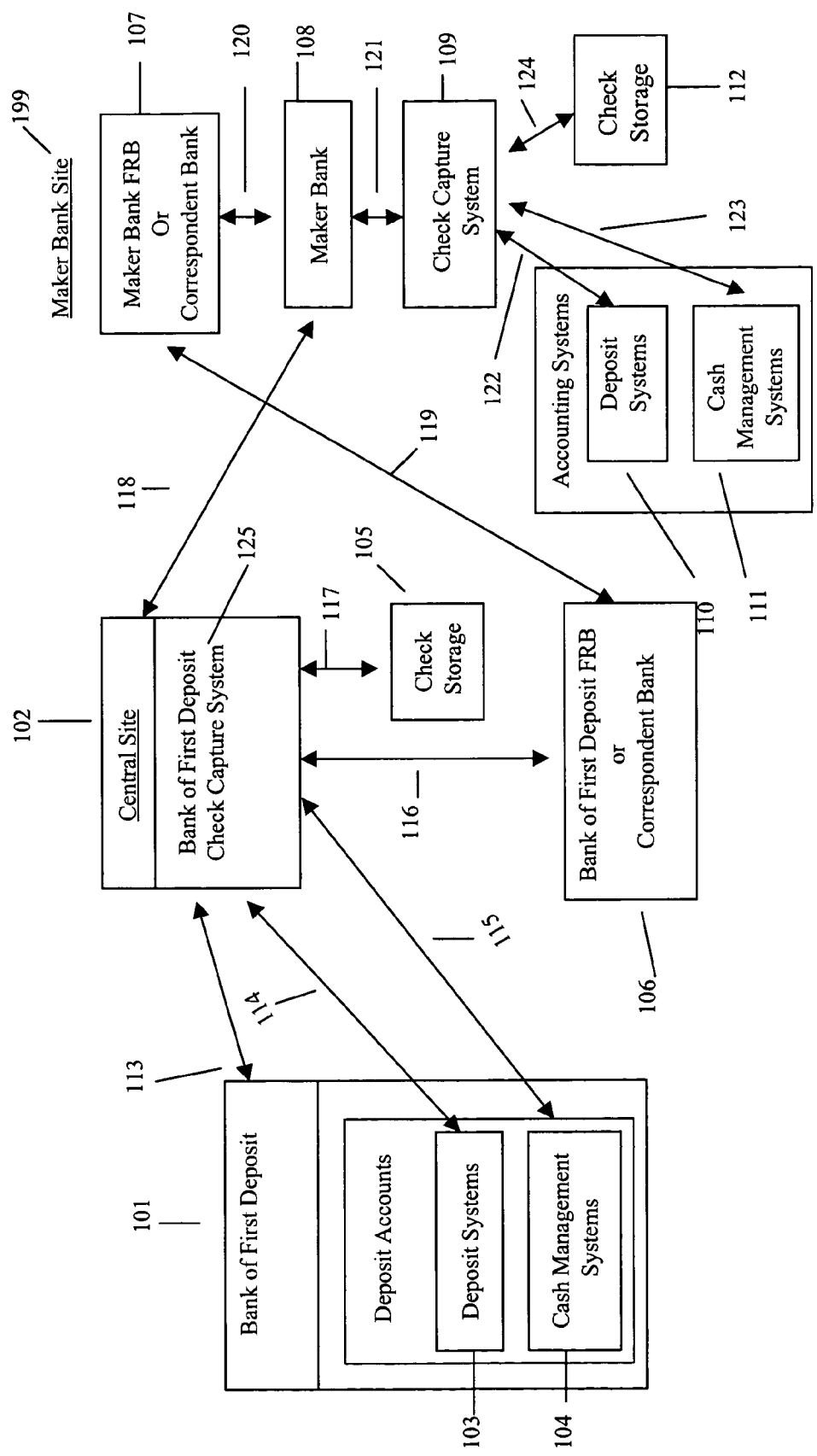
FIG. 1 illustrates an overview of a process of capturing and processing deposits from financial institutions and their branches that can be adapted to incorporate some of the features of the present invention.

The invention is described below with reference to drawings. These drawings illustrate certain details of specific embodiments that implement the systems and methods of the present invention. However, describing the invention with drawings should not be construed as imposing, on the invention, any limitations that may be present in the drawings. The present invention contemplates both methods and systems for remotely accepting an instrument, such as a check, for deposit and electronically processing the deposit without physically routing the physical paper copy of the instrument. The embodiments of the present invention may comprise a special purpose or general-purpose computer including various computer hardware, the execution unit portion of which may also be known herein as a "processor."

Embodiments within the scope of the present invention also include computer-readable media for carrying or having computer-executable instructions or data structures stored thereon and also known as software. Such computer-readable media can be any available media, which can be accessed by a general purpose or special purpose computer. By way of example, and not limitation, such computer-readable media can comprise RAM, ROM, EPROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Computer-executable instructions may also be properly termed "software" as known by those of skill in the art.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the portions of the invention includes a general purpose-computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Program code or software means comprising one or more program modules may be stored on the hard disk, magnetic disk, optical disk, ROM or RAM, including an operating system, one or more application or software programs, other program modules, and program data.

The computer may operate in a networked environment using logical connections to one or more computers having processors. Logical connections may include a local area network (LAN) and a wide area network (WAN) that are presented here by way of example and not limitation. Such networking environments are commonplace in office-wide or enterprise-wide computer networks, intranets (a network belonging to an organization, usually a corporation, accessible only by the organization's members, employees, or others with authorization. An intranet's Web sites look and act just like any other Web sites. Like the Internet itself, intranets are used to share information) and the Internet.

It should also be pointed out that while the term "check" may be generically used herein, it is contemplated by the inventors that other financial instruments are also contemplated within this meaning and therefore, the use of the term "check" is assumed to have the broader meaning, both in the specification and the claims. For instance, and not by limitation, the term check can refer to posted money orders, traveler's checks, merchant coupons, food coupons, line of credit checks, or any other instrument that represents payment for products or services. By way of further example, the invention can be used to capture and process the full range of products and banking documents as required by financial institutions which would include the ability to capture and process internal bank documents such as payments (which may include one or more payment coupons and one or more checks), as well as internal bank accounting documents (such as general ledger documents, teller documents of all types, etc.), and any and all other such documents required when processing deposits, payments, internal accounting documents, and the like, either at a banking location or a site (either financial or commercial) remote from a banking location.

Additionally, the term "bank of first deposit" means the financial institution where the sum of the monetary item(s) is presented to be deposited into the deposit account of the payee.

The present invention has been designed to reduce the issues associated with the physical handling of paper items by financial institutions and to improve the collections of and settlement for the associated funds by processing electronic images of checks as opposed to the slower method of sending paper checks through the traditional check clearing routes. An electronic image of a check is a digitized representation of the original physical item that can be displayed on a display terminal. The digitized image data is created by passing the original check through equipment that is designed to capture the data required to produce the check image on display terminals. The reproduced image is an accurate representation of both the front and back of the original physical check. Not withstanding the premise for the inventive processes to use electronic images of items to facilitate processing and clearing of items, it would also be desirable for the present invention to accommodate the current use of paper items and all other commonly accepted methods for clearing checks until such time as the use of electronic images becomes a common accepted practice for clearing checks.

This new process involves inventive computer-based software that can be used at financial institution locations and one or more locations remote from financial institution offices for capturing deposits (such as deposit slips and one or more instruments associated with the deposit slip(s)), together herein referred to as first processor locations. The first processor 200 capture system can be used by individuals and businesses (including the financial institution) to capture deposit information, such as information from the deposit slip(s) and/or monetary items and images of the monetary items, such as checks, required for depositing the checks into their deposit accounts at the financial institution.

Once this information is captured and validated at the first processor site, it is transferred to the financial institution over telecommunications lines (leased lines, switched lines, Internet, intranet, etc.) to a receiving computer at the financial institution.

The financial institution computer verifies the information received, stores the image of the items, and passes back to the first processor 200 information that is used by the first processor 200 to endorse, cancel, add an item number, and otherwise mark, void, and identify the check. Another image of the check is then created at the first processor location showing endorsement information (information that identifies where the check came from, which bank was the bank of first deposit 101, item numbering for tracking purposes, etc.), voiding information, cancel information, etc. This image is then sent to the Second processor 220 for storage and to be sent to the third processor 240 for further storage and processing and to be used for research and re-depositing (sending the check back through the clearing process should the check be returned to the bank of first deposit 101 for any reason) of the check if this becomes necessary. The depositor retains the deposit slip(s) and monetary item(s) at the first processor site. A deposit slip is a paper document that is placed by the depositor with the checks or other instruments that the depositor is depositing in the bank of first deposit 101. The deposit slip contains information (such as account number) used by the depositor's bank to correctly process the deposit (the combination of the deposit slip and the one or more checks or other instruments associated with the deposit slip) and ensure the funds in the deposit are correctly posted to the depositor's account. As an alternative to the interactive process of passing, voiding, endorsing, unique number information back and forth between the second processor 220 and the first processor 200, it is possible (based on parameters set in the inventive software) to do most of the decision-making on the first processor 200 at the remote site before transmitting the check information to the second processor 220. This can be done by pre-loading the endorsement, voiding, and item numbering information on the first processor 200 and/or updating on a regular basis. This allows for checks to be endorsed, voided and item numbered and the image(s) associated with a check deposit to be created and passed to the second processor 220 without the need for interactive validation of data between the first processor 200 and second processors 220.

In addition to deposit decisions based on first processor 200 information, the present invention also allows deposits of any number, combination, and dollar amounts of deposit, and checks based upon decisions made regarding the customer by information stored at the second processor 220. This information can be loaded onto the second and communicated to the first processor 200 as part of the interactive exchange of data during the process of validating the deposit. Additionally, this information, while being pre-loaded on the first processor 200, can also be updated on a regular basis.

Once complete deposit data is received by the second processor 220, it is passed to the third processor 240 which in turn passes such information to the bank of first deposit's check processing, deposit, and cash management, etc., systems for processing. As an alternative, if the invention is being used as a collection center for deposits from multiple banks of first deposit, the deposit information can be passed to the application processing systems for the particular bank of first deposit 101 for which the items and deposits were captured. Such application processing systems can include but may not be limited to check processing systems, deposit systems, cash management systems, etc. The image of the checks can be used to either print the customer statements (for items drawn on the bank of first deposit 101) or routed an images or as check data through the normal check clearing paths i.e. directly to the maker bank, a clearing or correspondent bank, or through the Federal Reserve Bank (FRB) electronic clearing process). Check clearing, clearing, clearing process, and clearing paths are all used to describe the common and accepted processes involved in sending the monetary items from the bank of first deposit 101 to the payee bank for payment by the check maker. The Federal Reserve Bank (FRB) is the central bank of the United States. The Federal Reserve's duties fall into four general areas: (1) conducting the nation's monetary policy; (2) supervising and regulating banking institutions and protecting the credit rights of consumers; (3) maintaining the stability of the financial system; and (4) providing certain financial services to the U.S. government, the public, financial institutions, and foreign official institutions.

If the maker or maker bank(s) require physical checks for their internal purposes, a duplicate check is printed by either the third processor, correspondent bank, maker bank, the maker banks FRB, by print centers, service provider, or by third parties, all of which may be set up for the purpose of printing the checks. Such printed item(s) is printed to banking industry standards governing the reprinting and presenting of such item(s) and such reprinted items are known herein as Image Replacement Documents (IRD's).

Once received by the maker bank, the check image, check image data, or duplicate printed check is processed by the maker bank through their computer systems and included as per their policies in their customer statements (statements mailed to customers containing among other things the customer's account balance and a listing of all of the monetary transactions taking place in the account since the last statement). Checks returned to the depositor for any reason will take the reverse path back to the depositor. Any re-depositing of items by the original depositor is done using either the printed duplicate paper item (if there is one) or the original endorsed image created and stored by the bank of first deposit 101.

Another aspect to one embodiment of the system is the automated settlement functionality. This component tracks and summarizes all of the information associated with transferring monetary items between financial institutions. At the appropriate times in the processing of checks, entries are created to ensure that all of the funds associated the monetary items being processed by the invention are debited and credited to the appropriate financial institution. This is done by creating electronic entries and routing them via transmission lines to the appropriate financial institution. All of the entries created are in accordance with accepted accounting practices governing settlement between banks. In addition, all of the entries created are stored in database(s) (a data base is a collection of information organized in such a way that a computer program can quickly select desired pieces of data, for later review and research purposes). All transmission of data, as practiced in all areas of the invention, preferably undergoes digital signature verification and certification and data encryption. In addition, for maximum security and data integrity, encryption is used preferably whenever the system transmits and stores data at any location and for any purpose.

Data encryption is the translation of data into a secret code. Encryption is the most effective way to achieve data security to ensure privacy and confidentiality of the data being transmitted. To read an encrypted file, you must have access to a secret key or password that enables you to decrypt it. Unencrypted data is called plain text; encrypted data is referred to as cipher text.

A digital signature is a digital code that can be attached to an electronically transmitted message that uniquely identifies the sender. Like a written signature, the purpose of a digital signature is to guarantee that the individual sending the message really is who he or she claims to be. Digital signatures are especially important for electronic commerce and are a key component of most authentication schemes.

In addition, the check images and check image data will be stored on a document storage database selectively at the first, second, and third processor sites and/or bank of first deposit 101 as well as Internet enabled and accessible database(s). The information on these database(s) will be available to the depositor, research personnel at the bank of first deposit 101, and other individuals needing access to the information under security control through remote access such as Internet access.

The system includes computer hardware, computer software, apparatus, and methodology that enables individuals, businesses, and all types of organizations (both for profit and non-profit) to capture and securely transmit check images and check data (including, but not limited to, personal checks, business checks, travelers checks, money orders, merchant coupons, food coupons, line of credit checks, etc.), deposit information, including deposit slip information and/or information regarding the instrument associated with the deposit slip(s), and other information from first processor locations (i.e., locations that could include the financial institution's first processor locations, other financial institution's locations, businesses, private residences, etc.), for the purpose of having those checks credited to the depositing individual's or organization's bank account(s) and having the check images (and/or physical checks) entered into the bank check clearing channels for ultimate delivery to the maker bank for payment out of the maker's account.

It should be appreciated that check images can be created by a variety of systems using various methods for capture and storage of images. Therefore, another embodiment of the invention provides for images being received from other systems, rather than captured by a dedicated first processor 200 imaging system, for the express purpose of using the inventive processes for expediting the clearing and collection of funds associated with those images. These alternative systems include lock box systems (designed to process payment coupons and capture the associated check(s) in payment for goods or services) and MICR image capture systems (as in a commercial bank capturing their physical deposits and using the inventive process to expedite collection of the checks based on processing the image instead of the physical check.). MICR stands for Magnetic Ink Character Recognition. MICR is a character recognition system that uses special ink and characters. Numbers and characters found on the bottom of checks (usually containing the check number, sort number, and account number) are printed using Magnetic Ink. When a document that contains this ink needs to be read, it passes through a machine, which magnetizes the ink and then translates the magnetic information into characters. MICR technology is used by banks and other financial institutions to accommodate the efficient and effective capture of checks and other bank documents.

In yet another embodiment of the invention, financial institutions wishing to use the invention for clearing of checks can send their physical checks to the institution using the invention. The institution using the herein-defined process may then capture the checks using conventional check capture and imaging system(s) and pass the image and MICR data to the inventive process for the purpose of clearing the checks. In the present embodiments where check images are re-used as input from existing systems such as lock box or MICR, the check images from these other image capture system(s) are transmitted over telecommunications lines (leased lines, switched lines, Internet, etc.), or if the capture system is local to the second or third processor, the image data is loaded directly to the second or third processor 240computer using either telecommunications lines or local wiring designated for this purpose, and then to a receiving computer at the receiving financial institution. The receiving financial institution computer verifies the information received and edits the check images for completeness, stores the image of the items, and passes back to the sending computer information verifying successful receipt of the image data. If the images are not complete or the transmission was not completed correctly, the receiving second or third processors notifies the sending computer and the data is corrected on the sending computer prior to re-transmission.

As an alternative to electronic notification, a representative at the receiving end can call a representative at the sending end and notify them of non-receipt or bad-receipt of data and arrange for data correction and/or retransmission. In these embodiments, all transmission of data preferably undergoes digital signature verification and certification and data encryption to ensure privacy and confidentiality of the data being transmitted. In addition, the check images will be stored on a document storage database at the first processor site or bank of first deposit 101 as well as Internet enabled and accessible database(s). The information on these database(s) will be available to the depositor and research personnel at the bank of first deposit 101, etc. under security control through remote access such as Internet access.

Referring to FIG. 1, a bank of first deposit 101 receives a check from the bearer to begin processing the instrument. Bank of first deposit 101 forwards, in step 113, the physical check(s) to a central site 102 for additional physical processing of the actual check. The physical check is processed at central site 102 using a reader/sorter (not separately shown but included in 102) to acquire information such as the information stored on the Magnetic Ink Character Recognition (MICR) line. This information includes the maker bank number, the account number, a check serial number, and other information or data commonly found in the MICR line. The information from the check is then sent to an in-house computer system (included in 102) for posting (via a posting file) in steps 114, 115 to the appropriate deposit account(s) 103, 104 in the bank of first deposit 101 and used by such other internal applications as may be required by the bank of first deposit 101. If the check is an "on us" item (i.e.

an item that is drawn on the bank that is processing it), the check is retained in a step 117 at storage 105 at bank of first deposit 101, otherwise the check is sent in steps 116, 119, and 120 or, alternatively in step 118 into a maker bank 108 for collection of funds. The check(s) are either sent physically in step 118 directly to maker bank 108 or routed in steps 116, 119 and 120 through the Federal Reserve Bank (FRB) 106, 107 or a correspondent bank 107 through step to a maker bank 108. The path taken by the check is determined by the working agreement that bank of first deposit 101 has with maker bank 108.

In the event that maker bank 108 is a member of the local clearing-house association (thereby being a clearing bank), the checks can be exchanged directly with maker bank 108 in step 118. If the maker bank 108 is a correspondent bank, a bank that has agreed to exchange checks directly with the bank of first deposit 101, the checks can be sent directly to maker bank 108 in step 118. All other checks are forwarded in steps 116 and 119 to the FRBS and correspondent 106 then through 107 for exchange with maker bank 108. Each of the maker bank, clearing bank, correspondent bank, or FRB used in context with where a check item is sent for the clearing process are known as a clearing end point. If a check is not paid by maker bank 108 for any reason (i.e. it is a forgery, there are not sufficient funds in the makers account to cover the amount of the check, etc.) the check is returned to the depositor using the reverse path of the above-described process. Once the check is received by maker bank 108, the check is processed in step 121 through the maker bank's check capture system 109. Information from the check is then sent in steps 122 and 123 to the maker bank's accounting systems 110 and 111 and the checks are either stored in step 124 at the maker bank's check storage 112, or sent directly to the maker with their check statement.

Figure 2:
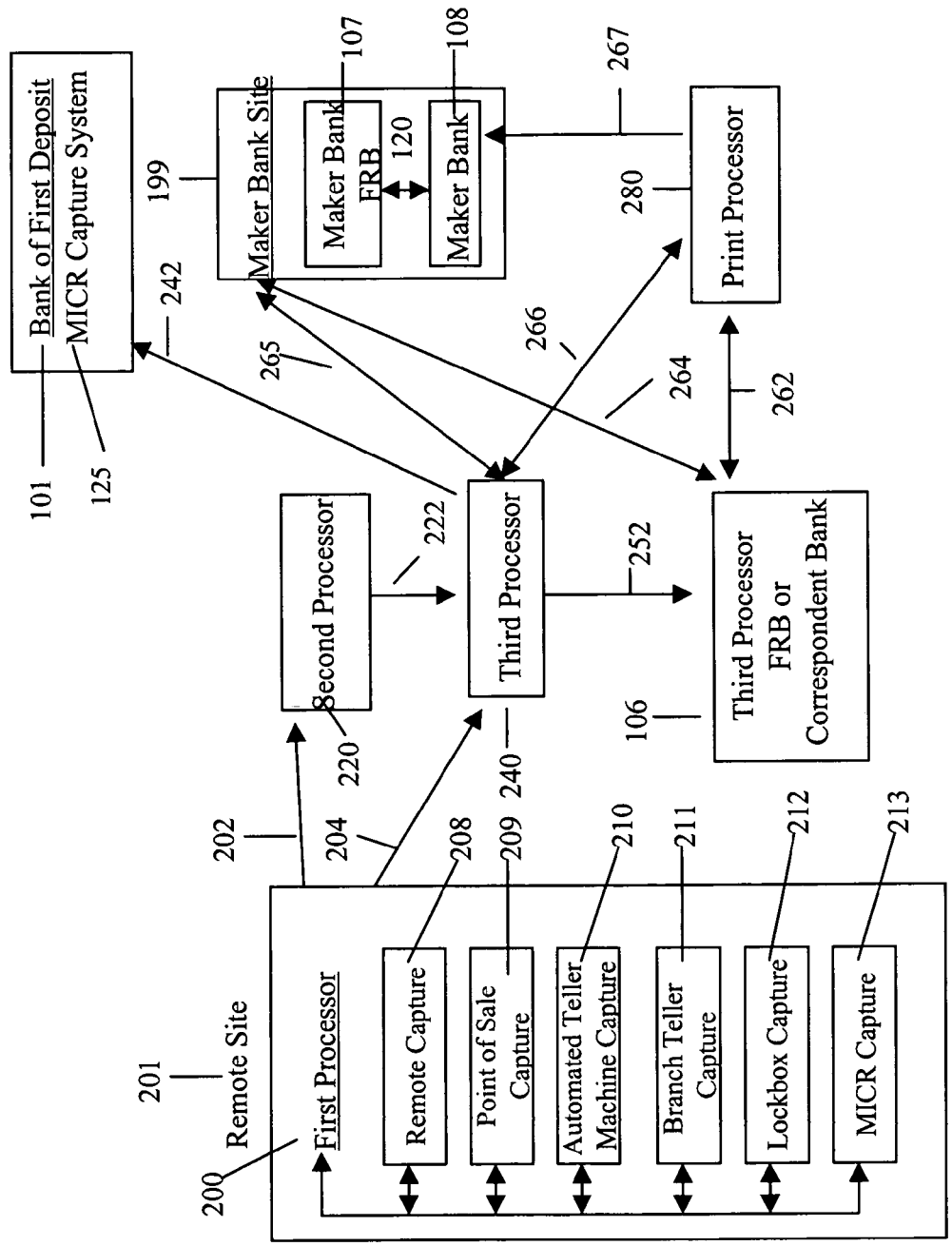
FIG. 2 illustrates an overview of remotely capturing and processing deposits remote from a financial branch or bank, in accordance with an embodiment of the present invention.

FIG. 2 depicts a high-level processing diagram of the various entities involved in the overall financial processing of the present invention, in accordance with the preferred embodiment. The present invention comprises four primary-processing entities: (i) a first processor 200, (ii) second processor 220, (iii) a third processor 240 and (v) a print processor 280. Each of these entities enlists specific processing techniques, which furthers the novel financial instrument processing technique of the present invention.

The physical placement for processors to make the most economical use of the functionality of the processors can be determined to provide for the most economical and expedient processing of data. The inventive software has been designed to take full advantage of this functionality by designing certain key functions such that they can be handled by either the second processor 220 or third processor 240. Without limiting the scope or functionality of the invention exemplary embodiments of such key functions include verifying completeness and accuracy of checks 303 and deposit slip data (such as Item Images and MICR line data) providing item voiding, endorsement, deposit limit, and endorsement information from second processor 220 to first processor 200. This functionality enables the placement of the second 220 processor at a site close to the first processor 200 such that large amounts of data do not have to be transmitted over great distances unless it is a certainty that the data is correct and will not have to be retransmitted. It can therefore be understood that such key functionality can be performed interchangeable on either the second 220 or third 240 processors without changing the functionality or outcome of the process. It follows that whenever discussing these key functionalities being performed on the third processor 240 in respect to an embodiment of the invention, it can be assumed the second processor 220 functionality (as described herein) can also be performed on a third processor 240 without changing the preferred embodiment of the invention.

In like manner the physical location of the print processor 280 and the printers attached thereto is subject to the economies of printing and presenting IRD's, cash letters, and the like. While one embodiment of the patent has the print processors 280 and printers located at print centers conveniently located to a number of clearing end points, in actuality other embodiments of the invention allow for such print processors 280 and printers to be located at an end point location such as a maker bank, clearing bank, correspondent bank, FRB, or any other location (such as the third processor location) that facilitates rapid and timely presentment of the checks, cash letters and other items printed on such printers. Yet another embodiment of the print process allows for the print processor functionality to be accomplished by the third processor, instead of the print processor, thus providing maximum flexibility to the location and functionality of the print processes.

In the present invention, a first processor 200 (further detailed in FIG. 3) either autonomously, or under operator/depositor control initially remotely "processes" a check 303 into electronic check data both in the form of image data and informational data which can be further processed and approved at subsequent portions of the overall process. Optionally, first processor 200 obtains deposit information, such as but not limited to, information gleaned from one or more deposit slips and/or the check 303 or other instruments associated with the deposit(s). In essence, the first processor 200 site provides a processing front-end that electronically interacts via interface 204 with third processor 240 through the transfer of electronic check data for review and processing at a third processor 240.

The remote site 201 and the first processor 200 associated therewith performs functions relating to the physical check 303 including scanning, reading, and printing on the check(s) and/or deposit slip(s). Remote site 201 and the first processor 200 associated therewith also exchanges image and/or authorization data with the other entities as further described below.

It is well understood by those of knowledge in the banking industry that while the invention is described in terms using deposit slips and check 303 items that deposit processing can include other documents of importance to financial institutions in deposit processing such as cash tickets, general ledger tickets, payment coupons, etc. While the preferred embodiments of the invention generally use checks 303 and deposit slips to describe the deposit processes, these processes (as described herein) also include the capture and processing of any and all documents generally used in deposit processing at financial institutions.

The inventive processes as described herein include the capability for capturing the item images and data at multiple first processors 200 capture sites 208, 209, 210, 211, 212, 213 using the first processor 200 and scanner capabilities and functionality. The data may then be transmitted to the third processor 240 for further processing. Print Processor 280 and third processor 240 of FIG. 2 interacts via interfaces and as further described herein with maker bank 108 and bank of first deposit 101 for completing the clearing process relating to the deposit slip, check 303, or related instrument. Third Processor 240 coordinates verification and account interaction. All inventive processors also provide both electronic storage of image and information data and third processor 240 provides an interface to maker bank site 199.

Print processor 280 and third processor 240 provides image conversion technology for converting check data from electronic form back to a hard copy check format for processing, printing, and archiving when required by more traditional banking processes. Print processor and third processor 240 can have similar technology to convert deposit information and/or data to a hard copy format.

Maker bank site 199 performs more traditional account processing of information received from print processor 280 and/or third processor 240 such as from third processor 240. Maker bank site 199 is further comprised of maker bank FRB/correspondent bank 107 and maker bank 108 and engages in account processing and statement generation.

The inventive process of transmitting all data collected to the third processor(s) 240 enables the invention to combine for a given maker bank such captured data from multiple first processors 200 which data could represent deposits for multiple companies and multiple banks of first deposit 101 captured on different first processors 200 or data from the same companies and same banks of first deposit 101 captured on multiple different first processors 200. The invention is designed such that it tracks which companies, banks of first deposit 101, and first processors 200 the data comes from and is able to report such. In addition, the invention can then send to each bank of first deposit 101 a deposit file 242 containing data and images representing all items captured by first processors 200 by and for such bank of first deposit 101. This ensures that all deposits are correctly credited to the correct account of the entity (company or financial institution) responsible for capturing the deposits at the first processor 200. It also ensures that the correct information is sent to the correct bank of first deposit 101 (specifically in the particular file format required by each individual bank of first deposit 101 for processing by the bank of first deposit 101 in their various application processing systems (such as Deposit Systems 103 and Cash Management Systems 104) as required by each individual bank of first deposit 101.

Further functionality of the invention sending images and item data to the third processor 240 enables combining checks 303, from various different first processors 200 captured by different companies and financial institutions (for and in behalf of different banks of first deposit 101), to be combined by the third processor 240 into bundle(s) and cash letter(s) by maker bank routing and transit numbers for delivery in either paper or electronic (image or electronic data record) format for presentation to the maker bank 108 for payment by maker and maker bank 108 and settlement back to the individual banks of first deposit 101 based on which bank of first deposit 101 and depositor the items were captured. The bundling, cash lettering, and presenting determination of whether to deliver a check 303 for presentment to the maker bank 108 in either check image format, electronic data format or IRD format can be made by either the third processor 240 or the print processor 280 and is dependant on the ability and desire of the maker bank 108 to received a specific format as listed, for example, in the bank of first deposit table. Such determination is made by or in behalf of the maker bank 108 based on said desire or ability and is further entered into a file or storage area within the inventive system expressly designed for keeping such information. An alternate embodiment of the invention allows item data and images to not be combined by the print processor 280 or third processor 240, but to be selectively presented for payment to the maker bank 108 isolated in cash letters containing item images and data from a single first processor 200, or item images and data from a single customer, or item images and date from a single bank of first deposit 101 or any combination of these elements. Whenever printing item images the invention is designed such that such printed items may selectively be separated by separators designating the ending of one print section, for example, such as images for a given bundle, or images for a single customer, or images for a specific clearing end point, etc. (clearing end point is terminology for the bank(s) involved in clearing checks through the accepted clearing processes to the maker bank for payment. Clearing end points are those banks that the particular check will be sent to next and can include FRB's, banks of first deposit, clearing houses and banks, correspondent banks the maker bank, and any other such entity involved in the check clearing processes).

Without limiting the scope or functionality of the invention or the print processor 280 feature functionality as described herein, further embodiments of the print features and delivery of check data and data images include the same functionality that may reside on either the print processor 280 or the third processor 240 to facilitate the efficient throughput and printing of IRD's or presentment of check data or data records by the invention.

An embodiment of the present invention for the routing of images through the system from the first processor 200 to the bank of first deposit 101 and eventually to the maker bank 108 uses two optional methods to determine the destination of the image for delivery as an image, data record, or printing an IRD.

The first method uses the inventive decision table functionality built into the invention. In this method of the invention, when the check data is processed by the first processor 200 it is qualified as further described herein. As a portion of that qualification process each item image, and the data thereof, is tested to determine from the MICR line information containing the route and transit number which bank is the maker bank 108 for the particular item being qualified. Based on the route and transit number and a decision table accessible through the administrative function of the invention as well as by all processors in the invention, a determination is made as to which print location and which print processor 280 therein that the item image should be sent for printing an IRD for delivery to the maker bank 108. Decision tables are further set up to determine if the maker bank 108 is capable and desirous of receiving check images, check data or IRD's for the checks 303 captured by the invention (representing the bank of first deposit 101) and delivered by the maker bank 108 or alternatively to a correspondent bank or FRB 107 that is authorized to present the images, data or IRD's to the maker bank 108. Thus, decision tables are configurable such that each bank of first deposit 101 can have one or more decision tables for routing check data to the maker bank 108 based not only on agreements with the maker bank 108, maker bank FRB 107 or correspondent bank 107 as to which check data (i.e. images, IRD's, data records, etc.) to receive and send to such maker bank 108, but also based on time of day, dollar amount of checks to be presented, customer for whom the bank of first deposit 101 is processing and clearing check data, and other like decision criteria. Although the primary function of the print processor 280 is printing of IRD's and cash letters, it should be understood that the print processor 280, like the third processor 240, is also capable of identifying (using the decision table of the invention) which clearing end point(s) are capable of receiving item images or electronic data formats and can forward such data formats through the clearing process to the maker bank.

In an alternate embodiment of the invention, the print processor ID is associated with the check image that is forwarded to a print processor for printing by the print processor on a specific printer as determined by the print processor or alternatively determined by the invention using such information as entered into a decision table.

In another embodiment the print processor information associated with a check image, can include information as to which print processor to use as an alternate print processor should the initial print processor not be available for printing.

In yet another embodiment of the invention, the decision table contains information as to which printer(s) is closely associated with which the clearing end point. The invention can then associate such printer information with each check image to be printed as an IRD such that each check image to be printed can be sent to the print processor and in fact to the printer located in closest proximity to the clearing point determined by the bank of first deposit for presenting the specific check image.

The decision table information within the invention can be created and maintained either by batch entry from data created and stored on non-inventive processors or by on-line entry of data by an authorized system operator using the inventive administrative functionality. Updating of decision tables is done either by Banks of First Deposit to control capturing and processing functionalities associated with processing and presenting (either in image, data or IRD format) or by other individuals or entities responsible for ensuring completion of those and other functionalities. Examples of Decision Table updates done by Banks of First Deposit would include which clearing end point to send each of their imaged items, endorsement or item numbering information to be used as item images are captured, notification information for communicating (such as to fax or email notifications) successful completion of transmissions and the like. Other entities, such as the processor responsible for maintaining and running the inventive processor, would update the decision table(s) for information used in deciding which printers to print IRD's, where to send reprints of IRD and cash letters and other such functionalities.

The second method of determining the destination for check information as an image, data record, or printing an IRD for delivery to a maker bank, is the inventive process of sending the check data from any one of the inventive processors (as further described herein) to a standard check capture and routing system processor 125 wherein a routine and transit table is maintained as a normal function of such MICR capture system 125. Data can be sent by such decision table either singly or in a batch mode or on an automatic, time determined or manually initiated basis from the inventive processors using the administrative functionality of the invention. This routine and transit table functionality in such a MICR Capture System 125 can determine the same information for item delivery format, content, clearing end point, print processor and data format (by decision number) to be used in routing check data to the maker bank 108 as the directed by the decision table in the invention. Once the routing information determination or determination of the clearing end point, is made by the MICR system it is added to the item data sent to the MICR system from the invention and the data record is then sent back to the inventive system for further processing as described herein. The inventive process continues as this point using the routing and data format information provided by the MICR Capture System 125.

In an exemplary embodiment the MICR system identifies the print processor and/or printer most closely associated with the clearing end point and associates such print processor and/or printer information, as well as alternate print processor and printer information, with the check image item data prior to such item data being sent to the inventive system for further processing.

It is well understood by one skilled in the presentment of check data using the data formats that there are specific rules controlling the format and content of data records to be presented. The invention is such that it can format and deliver such formats which among others include the nationally accepted Automated Clearing House format commonly known as ACH format. In an embodiment of the invention there is an inventive parser functionality which parser functionality is designed to ensure that the format and content of each individual data field within an ACH data record as well as the control records within the ACH file created by the invention adhere to industry standards.

A further embodiment of the invention processes allow for determining clearing end points and passing check data through the system either singly on a real-time basis or time delayed basis through all components of the system to avoid bottlenecks or batching the check data at any of the first processor 200, second processor 230, or third processor 240 prior to determining clearing points and then passing (on a real time or delayed basis) such batched check data through the processors of the invention for image presentment, data record presentment, or printing by print processor 280 (all as determined by the decision table).

As an exemplary description and of the print processes of the invention, once check data are received at the print processor 280, the print processor 280 makes the decision as to which printer to print the particular item on. The process of printing items to a clearing end point for presentment and settlement is referred in the banking industry as bundling and printing a listing of such items and such bundles is referred to as cash lettering. The print processor 280 is designed such that it will print all items for a particular end point on the same printer such that all of those items can be bundled together to form a cash letter bundle and then printing the cash letter to go with the bundle. Alternatively, items for a given end point can be printed on different printers in such a manner that the inventive print process keeps track of bundling and cash lettering information in such a manner to ensure item, bundle, and cash letter integrity for all items printed for each end point. In bundling items, the banking industry has a limit of the number of items that can be included in a bundle. The invention maintains a counter for such bundling activity which counter can be modified by a print processor operator through the administrative function of the invention such that it can be changed s needed to adhere to industry standards. The print processor 280 can store items as they are forwarded to the print processor 280 such that it can accumulate enough items to make a bundle prior to actually printing the IRD's in the bundle or it can alternatively print the items as they come from the third processor 240 keeping in mind the need to group items for a given clearing end point in the same bundle(s). Additionally, the invention can store items to be printed and an administrative print command issued by an operator can print items, item bundles, item bundle listings, and cash letters on a time basis determined by a print operator by accessing the printed functionality from a terminal having access to the print functionality which terminal can either be at or remote from a print processor 280 location. Another example of print functionality is that check data items and associated cash letters can be printed automatically by the invention based on a print criteria table such as accumulating enough items for a full bundle of items, printing items to meet a specific clearing end point presentment deadline, and such other criteria as determined by for example, a print administrator and entered into the print administration functionality of the invention. Alternatively, the third processor 240 has the same bundling and print capabilities as the print processor 280 in that the third processor 240 can accumulate check data and cash letter information for a given clearing end point into a full bundle prior to sending such items to the appropriate print processor 280 or send items to the print processor 280 on a per item basis.

It is understood by those skilled in the art that printers have different rated print speeds. Based on the print speed of particular printers used in a given print center is may be necessary to have multiple printers configured to be able to meet the print deadlines required for presentment of the printed IRD's. It can also be generally understood that a combination of different printers and different print processors 280 can be configured in any given print center to further enable that print center to print the IRD's in a timely enough manner to meet item presentment deadlines at the maker bank 108 or the maker bank FRB 107 or the maker bank correspondent bank 107. Without limiting the scope of the invention, those skilled in computer configuration also understand that such a configuration may include multiple printers attached to a single print processor 280 or multiple print processors 280 attached a single printer or any other combination thereof. Each print processor 280 and printer has an identification number address that is used by the invention to print an IRD bearing a particular route and transit number through a specific print processor 280 onto a specific printer using the inventive decision table process to determine on which printer to print each IRD. Also, based on the computer/printer addressing scheme, any number of third processors 240 can access any and all print processors 280, thus enabling third processors 240 from many location to print IRD's for example, with a specific route and transit number on a particular printer through a particular print processor 280. It also follows that any print processor 280 at any given print location can access and print onto any printer in such location as well as onto any other printer at any other print location using the inventive processes as described herein. In this process of cross accessing processors the internal inventive processes maintain the integrity of the data, including which items should be printed on which printers, which items are associated with each other for the purposes of bundling all items for a given end point together, which cash letters should be printed for which bundles and on which printer (and through which print processor) each of these printed items should be printed. The maintaining of integrity of data also includes ensuring that all item images and IRD's are sent to the appropriate clearing end point(s) as well as ensuring the integrity of all of the settlement information is maintained.

The internal address of each print processor 280 and printer is maintained on the decision table previously described. Such table contains every possible route and transit number with the preferred and alternate address(es) of print processors 280 and printers associated with each described route and transit number. The decision table is maintained by an operator having security access to the decision table, such maintaining being done using the administrative capability of the invention as further described herein. The table is built in such a way as to print IRD's at a print location that is closest to where it is to be presented next for settlement, based on the route and transit number.

Rerouting of printing of IRD's can be done by the third processor 240 or by the print processor. Rerouting of images for reprinting of IRD's is initiated for a number of reasons such as the print processor 240 or printer initially identified to be used for printing the particular IRD is not operational, or the telecommunications line connecting such a print processor or printer is not operational, or any other such event. The decision as to where to reroute an image for printing can be made by the third processor 240 based on accessing the decision table available to the third processor 240 or this decision may be made by the third processor 240 by accessing the alternate print location added to the item image by the third processor 240 after the third processor 240 obtains such alternate print routing information from the decision table available to the third processor 240. The alternate routing of images for printing can also be done by the print processor 280 using the alternate routing information previously associated with each item image by the third processor 240 or as an alternative print processor 240 can use a decision table on the print processor 280 that is similar in format and content to the decision table accessible by the third processor 240. As an inventive process the maintenance of the decision table at the print site may be done selectively by a print operator who has security access to the print processor 240 decision table through the inventive on-line administration function or the decision table information may be downloaded from third processor(s) 240 and loaded into a decision table accessible by the print processor 280. To ensure that no item image is stranded by not matching an entry in a decision table, the invention is designed such that a default route and transit table or default decision table is set up and maintained at all times at all locations (such as third processor 240 and print processor 280) that maintains a decision table. Such maintenance of the default decision table is done by a system administrator that has authority and access to the default decision table through the administrative functionality of the invention. As yet another embodiment of the reprinting function the print processor 280 can access the decision table maintained and accessible by the third processor 240 thus eliminating the need for a separate decision table maintained by the print processor 280.

The reprint process provides a security feature (as further described herein) that requires authorization from an appropriate pre-authorized person through the administrative functionality of the invention to allow reprints of monetary items. It also provides for authorized reprint at item level, bundle level and cash letter level.

Another inventive functionality is the common industry practice of load balancing. The inventive processors are capable of on-line real time load balancing by the various processor operators or automated load balancing by the processors themselves is done for timing and processing efficiency. However, an additional inventive feature in the inventive processors is that such load balancing is done in such a manner that the integrity of balanced cash letters, sending items to the appropriate clearing end point nearest to the print site, maintaining an accurate settlement process and the like are maintained. Load balancing can be done as an automated feature of the inventive system as well as by on an on-line real-time function of an administrative person authorized to do such load balancing.

In a further embodiment of the print processor 280 functionality, the print processor 280 is responsible for settlement activities on behalf of the depository and processing banks after the items have been printed, bundled, and cash lettered for presentment to the various maker banks 108, FRB's or Correspondent banks. Those items that are presented in electronic format (such as images, ACH, etc.) are also tracked by the system and settlement activities for these items are included in the functionality of the system. This settlement activity can be controlled by the print processor 280 or by any other processor within the system as determined by system parameters determined and set by the system administrator through the inventive administration facility. An exemplary embodiment of the settlement process is that the print processor 280 accumulates information for each clearing end point for a given time period (usually a business day). Such accumulating of settlement information, whether done by the third processor or print processor is done such that information for items from each given bank of first deposit to each clearing end point is summed together such that the bank of first deposit and clearing end point are presented with correct total or totals of summed items presented by the bank of first deposit to the clearing end point. Once settlement information is accumulated it is sent to at least one of and preferably each of the clearing end point and the bank of first deposit in either electronic data format or printed format, as determined by the bank of first deposit and clearing end point, and as maintained in an inventive decision table. This information can then either be printed on paper documents to be sent to each of the bank of first deposit 101 and the maker bank 108 (and every other bank involved in the settlement process) such that those banks can transfer funds in the amount of the settlement advice to the appropriate other bank. A further embodiment is such that the settlement data can be configured into electronic data records that are sent electronically to each of the financial institutions involved in the item clearing and settlement processes. The invention is designed such that all settlement information is retained and sent in electronic format to a storage/archive system for future reference and research. Further, the settlement data sent in electronic format adheres to all existing industry print and file standards and is designed so that it can be changed as those standards change.

The settlement process as described herein is fully automated and is designed such that all of the entries required to move the funds associated with deposits, sending transit items to the maker banks 108, return items, etc. are created from data that is captured and contained in the inventive process and sent in either electronic or printed format (at the option of the bank receiving the settlement notice) to the appropriate banking entity. This feature is designed such that it can feed settlement data to any bank or commercial company accounting system. The settlement processing is done in an on-line real-time basis to ensure no processing bottlenecks or alternately in a batch mode at the end of a processing day or at any other time required by the receiving institution. Settlement reporting can be done as batches complete or at end-of-day processing and all settlement information and reporting is maintained by the invention as well as forwarded to a storage archive system, both such storage practices providing for secure on-line review and research purposes.

The on-line administrative functionality enables the system administrators to provide a system in the invention of successful print as well as delivery of the cash letter and printed IRD's, or alternatively successful delivery to the correct clearing end point of electronic check image data and associated electronic cash letters or also delivery to the correct end point of check data records and associated electronic cash letters, to the various Clearing End Points. This information is important in ensuring successful completion of each days entire processes as well as ensuring that the settlement information developed by the various processors is complete and accurate. In respect to printing and actual presentment of cash letters and the items associated therewith, the inventive process is designed such that it ensures that all of the items electronically associated with a given cash letter are printed or sent to the appropriate clearing end point electronically such that the items and the total thereof are the same for the cash letter and all of the items associated with that cash letter. In connection with this on-line tracking activity the print processor(s) 280 is designed to create information for settlement that needs to be routed to the depository bank and clearing end point for each clearing end point. The third processor(s) 240 receives all such information and routes it to the appropriate depository bank either as they are created or at end of processing day. The entries can be printed and presented to the appropriate depository bank or, as an alternative; the general ledger offset entries can be sent in electronic format to the depository. The critical component in this process is that the depository bank knows on a daily basis the amounts of each of the cash letters presented to each of the clearing end points on behalf of the depository bank 101. As such, the creation and presentment of the general ledger entries is best done by the third processor 240 for purposes of accumulating and sending all such entries for each depository bank. As an alternative, each print processor is capable of routing such entries (either in print or electronic format) to the depository bank 101 for items printed or otherwise presented through such processor. This can be done automatically by inventive program instructions based on receipt of data, time of day and other such criteria, or on operator command using the administrative function of the invention. The invention is designed such that all settlement information is retained and sent in electronic format to a storage/archive system for future reference and research.

Figure 3:
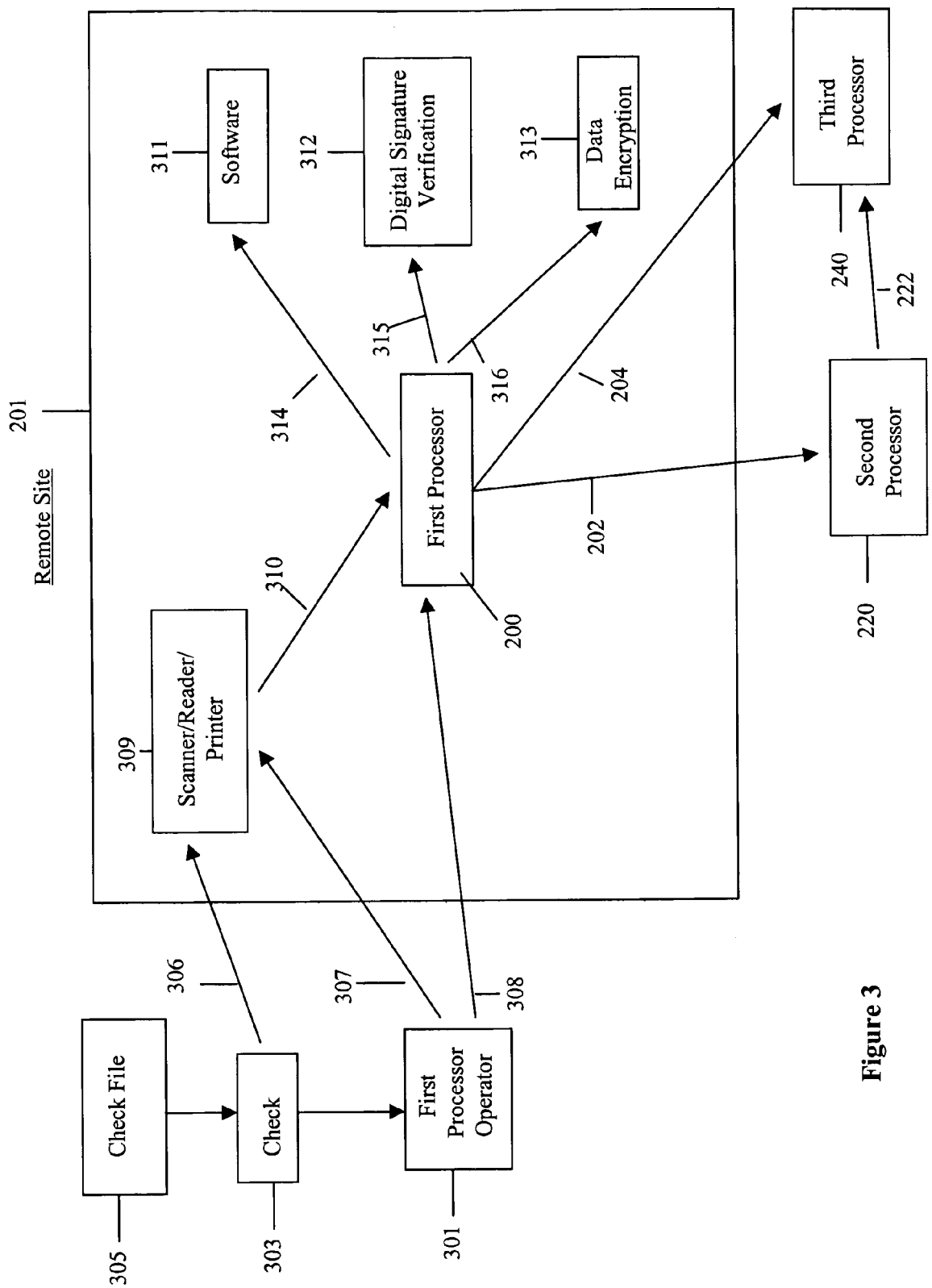
FIG. 3 is a more detailed block diagram showing the capturing and processing at the first processor site or point of check presentment, in accordance with an embodiment of the present invention.

FIG. 3 depicts the remote site 201 where the first processor 200 resides as well as the interaction by a depositor or operator 301, in accordance with one embodiment. The present invention commences with the presentation of a physical instrument such as a check 303 by a bearer to first processor site 201. A scanner/reader/printer 309 provides the interface to the bearer for presentment of the check 303. Scanner/reader/printer 309, in the preferred embodiment, is a multifunction device capable of independently performing each of the functions of scanning, reading, and printing upon the check 303 or physical financial instrument. It is also contemplated that individual devices for performing each of these functions, scanning-reading-printing, may be integrated, whether automatically or manually, to perform the combination of functions upon the check 303.

Scanner/reader/printer 309 is connected via an interface 310 to a first processor 200. The first processor 200, like each of the other processor elements in the present invention, may include devices capable of performing functions based upon executable instructions, such as a personal computer, network computer, a general purpose computer, or a specific purpose computer. A first processor 200 is further coupled to either a second processor 220 and/or a third processor 240 via an interface transmission or network media 202 and 204 respectively, and a second processor 220 and third processor 240 are connected via an interface transmission or network 222 all of which interfaces may take the form of one or more of wired or wireless link such as public switched lines, Internet or wide-area network connection, microwave, satellite, digital phone, private leased lines, or any other current or future acceptable communications facility and may further employ encryption over the interface.

Further embodiments of the first processor 200 capturing and qualifying items can be described by using the specific additional features and functionality of Automated Teller Machines (ATM's) 210 (and other such self serve machines located within a financial institution or a branch thereof, stand alone or within a kiosk, etc.), Branch Teller terminals 211, and Point of Sale Terminals (POS) 209 in concert with first processor 200 functionality as described in detail in FIG. 3 and elsewhere herein.

As an example of one such embodiment, the present invention enables customers and banks to use hardware and the inventive software integrated into ATM's 210 and the Electronic Funds Transfer (EFT) network to capture check images and check data, deposit slip images, internal documents and other monetary items. An exemplary demonstration of this functionality enables the capture of check(s) 303 images and check(s) data by anyone wishing to have the ability to make deposits to their account at their depository bank from any image capture enabled ATM 210.

In another embodiment of the ATM 210 process the checks imaged by the ATM 210 using the inventive processes and software are voided, cancelled and endorsed (as further described herein).

In yet another embodiment of the invention using an ATM 210, the invention allows any financial institution to capture any internal monetary (i.e. loan payments, etc.) or accounting entries (i.e. G/L entries) for forwarding and processing in their application processing systems. Another embodiment of the present invention using ATMs 210 to create and capture check images makes it so that the customer can retain imaged check(s). The check images and check image data are then processed using the first processor 200 capture functionality of the invention. Alternatively, the invention has a function that enables the ATM 210 to retain the physical items for storage and research purposes by the financial institution that owns the ATM 210.

Another embodiment of the present invention using ATM's 210 for capturing deposits allows the customer to enter a description on the ATM for each imaged check 303 item as it entered. This description may be forwarded with the check 303 image and check 303 data to the third processor 240. Once received by the third processor 240 this description may be stored in a data base and/or forwarded to a bank of first deposit 101, which bank of first deposit 101 may store the information and at its discretion, print such information on the checking statement of the customer making the deposit at the ATM 210. Such additional information may also be forwarded either directly or indirectly to the maker bank 108 using the process to print check images (known as Image Replacement Documents "IRD") or using other image presentment processes described herein. The print process generally follows that the check 303 image and check 303 image data from a check 303 is forwarded from a third processor 240 via communications lines 266 to the inventive print processor 280 to be printed. Thereafter the printed IRD is forwarded either directly or indirectly to the maker bank 108. If the check 303 image and check 303 data is used for presentment to the maker bank 108, they also are forwarded either directly or indirectly to the maker bank 108 for payment. Once received by the maker bank 108 such previously discussed customer entered information may be printed on the statement of the check maker whose check 303 was captured in the ATM 210 by the above referenced customer. At either the third processor 240 site, bank of first deposit 101 or maker bank 108 location (or at any clearing bank location in the presentment process such as the FRB, a clearing bank, or a correspondent bank) such customer-entered information may be used for reporting and tracking as determined by the entity using the information.

Another embodiment of the present invention using ATM's 210 for capturing check 303 data and check 303 images is that the check data created from imaging physical checks 303 through the ATM 210 feature of the invention can be interfaced into the ATM 210 settlement systems for processing of settlement information associated with the deposit captured at an ATM 210.

Yet another embodiment of the present invention using ATM's 210 for capturing check 303 images and check 303 data is that the secure features and functionality of the customers ATM card (including but not limited to pin number, biometric authentication, etc.) can be used to ensure a secure and private capture of deposit and check 303 images and data As an embodiment of a first processor 200 capture of check 303 images and check 303 item data using a branch teller 211 solution, the invention is tightly coupled with any one of a number of existing branch teller systems (including both branch teller software and equipment). In this embodiment the branch teller system security features are used to ensure only authorized persons have access to both the branch teller function and the inventive first processor 200 capture functionality as further described herein. This solution allows full deposit preparation and balancing at the teller window as well as enabling the deposit information to be posted to the banking systems in a real time mode. This embodiment assures that the normal teller functions including accepting deposits remain in place with the added functionality of actually validating the deposits and the items associated therewith on a real-time basis. The deposit information can then be sent to the financial institutions (bank of first deposit 101) associated with the teller station on a real time basis such that the depositor can get immediate posting to their deposit account of the information associated with the deposit using the invention at the teller station. In this embodiment, the deposit is marked as having been posted on a real time basis such that when further processing of the deposit at the third processor 240 takes place, and the third processor 240 sends a posting file to the bank of first deposit 101, as further described herein, that such posting file notes to the banking systems that the deposit was posted real-time at the same financial institution, thus precluding double posting of the deposit information. Under this embodiment the items associated with the deposit may be retained by the teller for storage or research purposes or returned to the customer making the deposit at the teller station.

An exemplary embodiment of the first processor 200 capability of present invention would enable retailers, who have point of Sale 209 (POS) terminals that either have check 303 image and check 303 data capture capability or that have a hardware image capture device adjacent and attached to their POS 209 terminal(s)/cash registers, to use such hardware and the inventive software integrated into the POS 209 terminals to capture check 303 images and data and deposit slip images. The invention allows this new functionality at the POS 209 terminal while maintaining the POS 209 terminal functionality of charging the check 303 being deposited to the account of the check maker at the maker bank 108. The images captured in this embodiment can be kept by the retailer for research purposes as well as being forwarded to the maker bank through the invention for presentment as further described herein.

Another example of the first processor 200 functionality of the present invention can enable a retailer to process check(s) 303 from the retailer's customer(s) (in payment for goods or services) through the POS 209 image capture devices, while at the same time depositing the check 303 being used as payment into the retailers account at the retailers bank of first deposit 101.

An embodiment of the POS 209 functionality of the present invention can enable the retailer's customers to put a description on each check 303 after it is captured and prior to it being processed for deposit in retailer's account at the bank of first deposit 101. This description may be forwarded with the check 303 image and check 303 data to the third processor 240. Once received by the third processor 240 this description may be stored in a database and/or forwarded to the bank of first deposit 101 which bank of first deposit 101 may store the information and at its discretion print such information on the checking statement of the customer making the deposit at the POS 209. Such additional information may also be forwarded to the maker bank 108 using the IRD or image presentment processes described herein. Once received by the maker bank 108 such customer entered information may be printed on the statement of the check maker whose check 303 was capture in the POS 209 by the above referenced customer. At either the third processor 240 site, bank of first deposit 101 or maker bank 108 location (or at any clearing bank location in the presentment process such as the FRB, a clearing bank, or a correspondent bank) such customer-entered information may be used for reporting and tracking as determined by the entity using the information A further feature of the POS 209 embodiment of the present invention is such that once captured at the retail location the checks 303 can either be retained by the retailer for research purposes or given back to the retailer's customer (preferably after voiding) for storage or destruction. In addition, this embodiment the present invention can accumulate check 303 images on the first 200 or second 220 processors until such time as the retailer determines to submit the images to the third processor 240 for, storage, post capture review, scrutiny, return or adjustments purposes.

An alternate embodiment of POS 209 embodiment in the present invention is that the POS 209 item information can be presented through the POS 209 processes for depositing to the retailer's account. This embodiment assures that the normal POS 209 functions including accepting check 303 items in payment for a retail transaction remain in place with the added functionality of actually validating the deposits and the items associated therewith on a real-time basis. The deposit information can then be sent to the financial institutions associated with the POS 209 terminal station on a real time basis such that the retailer depositor can get immediate posting to their deposit account of the information associated with the deposit using the invention at the POS. In this embodiment, the deposit is marked as having been posted on a real time basis such that when further processing of the deposit at the third processor 240 takes place, and the third processor 240 sends a posting file to the bank of first deposit 101, as further described herein, that such posting file notes to the banking systems that the deposit was posted real-time thus precluding double posting of the deposit information. Under this embodiment the items associated with the deposit may be retained by the POS 209 terminal operator for storage or research purposes.

Yet another alternate embodiment would, on a real time basis, validate the availability of the funds represented by the check being presented to the retailer against the check maker's account at the maker bank to determine that the funds in the amount of the check are available in the makers account. This would be done in advance of the presentment of the check image, IRD, or check data to the maker bank. Once the funds have been validated against, for example, a file of available balances provided by the maker bank, a notification could be sent to the retailer notifying such retailer that the funds in the amount of the check being presented to the retailer by the check maker are available in the check maker's account at the maker bank. In addition, such real time access of the makers account information could also be expanded to place a hold on the funds in the account and reserve them for payment of the check once it is presented for payment as either an IRD, check image or check data.

In accordance with another embodiment of the present invention, specific processing techniques may be used to further the financial instrument processing technique of the present invention. In this embodiment capture site 201 represents sites incorporating front-end processing such as, for example, lock box 212 and MICR 213 processing sites that will be enabled to capture physical items of check 303 images for the purpose of interfacing into the invention.

Those of skill in the art appreciate the functionality of lock box 212 systems and MICR 213 system. By way of example, lock box 212 systems are a collection method used to accelerate the processing of a business entity's receivables by allowing a service provider, usually a bank or other financial institution, to collect payments and process receivables on behalf of the business entity, generally by directing customers to send payments to a post office box or other address controlled by the service provider. The service provider picks-up the payments from the lock box and processes the payments and posts the payments to a lock box account. Receipts and/or copies of the checks are then forwarded back to the business entity.

MICR 213 systems are check-reading systems capable of reading routing and financial institution information that has been printed on the check 303 or other instrument using magnetic ink and in a special font. MICR 213 systems may also generate transactional data from the magnetic ink characters for processing by a financial institution.

In one embodiment of the present invention, a site captures check 303 images and data using traditional methods for capturing monetary items such as lock box 212 processing sites or MICR 213 capture sites. The methods at these sites 201 either autonomously, or under operator/depositor control initially remotely "processes" a check 303 into electronic check 303 data both in the form of image data and informational data which can be further processed and approved at subsequent portions of the overall process. In essence, the capture site processor 200 provides a processing front-end that electronically interacts with and transfers check 303 item data and check 303 item images to second processor 220 (or alternately a third processor 240 as further described herein). Such check 303 item images and data is comprised of check 303 images, and/or MICR line information for review and processing by electronic means. The remote-capture site first processor 200 performs functions relating to the physical check 303 including validating the check 303 and image data and printing on the checks. The actual lock box 212 and MICR 213 capture process as described and used herein is not limiting on the present invention. However, once the check 303 images and data are captured and sent to the second processor 220 or the third processor 240 (either on an item by item basis or as a batch of items or as an entire file of items), the flow of items, processes and functionality are the same as for any item captured by the inventive process. This embodiment is merely a substitute means of getting check 303 images and data into the second processor 220. It is understood by those skilled in the art of data transfer using computers that the actual control and commands to transfer data can be done in either a push or pull mode. Push meaning that a command is given for example from first processor 200 (which is either within or external to the system) to send the first processor 200 data to the second 220 processor or third processor 240, and pull meaning that a command is given from the second processor 220 or third processor 240 to have the first processor 200 send data to the second processor 220 or third processor 240. Either push or pull methodology can be used in the inventive process without limiting the functionality of the invention. Such push/pull methodology can be used for transferring data and information between a non-inventive processor and an inventive processor such as a second 220 or third processor 240. It can also be used to transfer data between inventive processors of the invention including such data as check 303 images and check 303 data, report data, system parameters, table entries, accounting data and all other data transferred into, out of, and within the invention by the invention processes.

It can be understood by one skilled in the art of banking that because of present banking processes, the first processor 200 site used for lockbox 212 and MICR capture of check 303 images and data should still be associated with a financial institution that is authorized to accept the checks 303 from the first processor 200 site and process them through normal check clearing paths. The first processor 200 site may be a branch extension of the financial institution or may be a person, or other entity with or without a legal relationship to the financial institution that provides the access services to the financial institution. Such an affiliated financial institution is still known as the bank of first deposit 101. The present embodiment does not propose eliminating the bank of first deposit 101, only replacing the method used to capture deposits. However, the use of the present embodiment does not change and remains fully functional in case the rules and regulations governing needing a bank of first deposit 101 change An alternate embodiment of the present invention can allow the first processor 200 (such as a teller station 210, POS 209 location or other first processor 200 location) to either enter a physical deposit slip(s) or create an electronic deposit slip(s) using the inventive software functionality. The deposit can then be forwarded through the invention along with the check 303 images of the items that are associated with the deposit slip. As yet another embodiment, the checks 303 can be identified as first processor 200 captured checks 303 with sufficient information associated with the check 303 images and check 303 data that they can be forwarded through the invention without the use of a deposit slip(s). Such sufficient information would include information required to identify the person or entity operating the first processor 200 and tying that information to a deposit account of such a person or entity at that person's or entity's bank of first deposit 101, summed dollar amount of the amount of item images, summed item count of the check images, and other such informative and tracking information. Such deposit information could be generated at a lock box 212 or MICR 213 capture site and included with the check images and check data captured at such a site and forwarded to a second processor 220.

Using yet further functionality of the present invention, authorized operators can research and review all items, deposits batches and any and all data associated with a deposit, customer, bank of first deposit 101, maker bank 108, and the like, and make any corrections required once the data is captured by or entered into the invention. Any changes to the check images or check image data are handled as adjustments to the retailers deposit by the bank of first deposit 101. This functionality is made available to any and all accessors of the system through the administrative component of the invention. Such administrative component is made available on a case-by-case basis to those who are authorized to use such a component and enabled to access the system in such a manner by being given the proper authority, access and security clearance and access (such as a password). The access to the administrative component generally is done using the look and functionality of a Graphical User Interface (GUI) and can be done over the Internet, through direct connectivity with the inventive processors and the network connecting the inventive processors, or any other method or connectivity enabling authorized individuals access to deposit data in the data bases maintained by the inventive processors.

Using an alternate embodiment of the present invention, authorized operators can review the check 303 items images, check 303 item data, deposits, and any other information associated with the check 303 images that is stored on the processor databases, and make any corrections required once the check 303 item and deposit data are forwarded to the bank of first deposit 101. Any changes to the check 303 images or check 303 image data are handled as adjustments to the retailers deposit by the bank of first deposit 101. An alternate embodiment of the present invention enables on-line review functionality either directly through system terminals or through Internet or intranet access. As an example, operators can be allowed on-line access selectively to only those POS 209 captured items that were captured by either the retailer or the bank of first deposit 101 that the operator represents. The system also has the selective functionality, driven by the on-line administrative component, to electronically send a check 303 image and check 303 data from the check 303 from the system storage back to the merchant for research and audit purposes.

The first processor 200 executes according to executable instructions such as computer-executable instructions, which are figuratively depicted in FIG. 3 as software 311. Software 311 is loaded or interfaces with the first processor 200 via a bus or other physical interface depicted as interface 314. Generally, software 311 includes executable instructions for (i) causing first processor 200 to instruct and execute the necessary steps for capturing check 303 or financial instrument and/or deposit slip both physically and electronically, (ii) performing data processing on the electronic data from the capturing step, and (iii) exchanging the captured data over interface or media 202 or 204 to either the second processor 220 or third processor 240 respectively when appropriate.

While details relating to the processing and method steps executed by first processor 200 via software 311 are described below, the first processor 200 further determines if first processor 200 processing decisional information such as comparison information (such comparison information being configurable by customer, first processor user, bank of first deposit 101 and other like entities) for making decisions on the summed number of deposits, summed dollar amount of deposits or summed dollar amount of monetary items associated with one or more deposit slips of the deposit is available on the first processor 200. If such decisional information is not available at first processor 200, then second processor 220 or third processor 240 processing may require additional steps.

The first processor 200 can also determine if the first processor 200 processing information needed to void, endorse, and itemize number each check 303 is available to the first processor 200 for processing of check 303, according to the method of the present invention. If such first processor 200 processing information is available but not current, the first processor 200 processing information may be updated by either having the updated information manually entered, for example by way of an operator 301 via a keyboard at terminal attached to first processor 200, or the updated information may be retrieved by the first processor 200, under the direction of software 311, from the second processor 220 or third processor 240 as further described herein.

In an embodiment, the updated information may be housed in a data set at second processor 220 or third processor 240 and updated by the bank of first deposit 101 or their designated representative, affiliated with first processor 200 prior to loading to first processor 200. Such updating of data can be done automatically by having the bank of first deposit 101 automatically send computer generated update information to the third processor 240 or manually by a person so designated by the bank of first deposit 101. The first processor 200, executing software 311, then determines if all of the decisions concerning voiding, endorsing, item numbering, number of deposits, number of checks, or dollar sizes of deposits or items can be made by first processor 200 by checking the first processor 200 processing information as pre-defined in first processor 200. It can be well understood by one skilled in the art that the foregoing decision criteria is offered herein in exemplary form without limiting the scope or functionality of such decision criteria.

If the decisions on endorsing, voiding, item numbering, number of deposits, number or dollar amounts of deposits, or dollar amounts of monetary items associated with one or more deposit slips, collectively the deposit, can be made by the first processor 200, then to ensure proper account processing of check 303, a depositor 301 at a terminal connected to first processor 200 is led through a series of instructions to gather deposit information required to ensure credits are made to the appropriate deposit accounts(s). In one embodiment, the deposit information is read, interpreted and entered automatically by reader/scanner/printer 309, the deposit information being data from at least one of a deposit slip and check or other instrument associated with the deposit slip. In another embodiment, the deposit information is entered manually, for example, on a terminal attached to first processor 200. Additionally, during the practice of the invention, scanner/reader/printer 309 encodes check 303 with endorsement and voiding information in order to physically "void" check 303, thereby keeping check 303 from being re-transmitted, for example over media 202, 204, or re-deposited at an actual financial institution location for an additional collection. In addition, a unique item identification number may be encoded on check 303 by first processor 200 via scanner/reader/printer 309 to aid in tracking data resulting from processing of check 303. Optionally, one or more of the above processing steps can be performed on the deposit slip(s) associated with the checks or instruments forming part of the deposit.

The exemplary process of the present invention continues when scanner/reader/printer 309 performs the functions of scanning check 303 to create electronic check data that can include image data and/or informational data resulting from MICR encoding (using either MICR, Optical Character Recognition (OCR) or other like techniques) as well as all other data required for identification and processing of the item images are hereafter referred to singly and collectively as check data. Optionally, scanner/reader/printer 309 can obtain information or other data from the deposit slip(s) associated with check 303.

Optical Character Recognition refers to the branch of computer science that involves reading graphical and text (handwritten and printed) components from paper and translating the images into a form that the computer can manipulate. All OCR systems include an optical scanner for reading text, and sophisticated software for analyzing images. Most OCR systems are capable of capturing front and back images of items and isolating either specific fields on the images or identifying whatever data is contained in specific locations of the images. The invention is capable of interfacing with such OCR systems and communicating which fields or general locations are required to be passed by the OCR system to the invention for further use and processing. Examples of such fields that can be utilized by the invention include the signature, amount fields (courtesy and legal), and payee name and address on the front of for example, checks 303 and the endorsement fields on the backs of checks 303. Once identified and accepted by the invention these fields can be stored on the first processor 200 or alternately forwarded to the second 220 and/or third processor 240 for storage and use by the invention or interfacing systems. Most OCR systems use a combination of hardware (specialized circuit boards) and software to recognize characters and graphical components, although some inexpensive systems do it entirely through software. Advanced OCR systems can read text in large variety of fonts, but they still have difficulty with handwritten text.

Check capture and imaging systems vary in their capabilities and functionality. Wherever the invention refers to front and back images being captured for processing or reference is made to images being captured before and after endorsement, it can be understood that the invention is flexible enough to work with a combination of images that have been captured for deposit processing. Banking rules and regulations govern the number of images and how and when to endorse and void physical checks and check images. It can be understood by those skilled in the art of image processing that the invention is capable of working with all combinations of multiple versus single images as well as front versus back images as required by banking rules and regulations.

Scanner/reader/printer 309 "voids" and endorses check 303 by printing voiding, endorsing and tracking data thereon. It can be appreciated by one skilled in the art that the voiding, endorsing and tracking data can be physically printed on the check 303 either before or after an image is taken of the check 303 for further processing. However, in an alternate embodiment this information may be associated (by using data keys that tie the item images and item data with the voiding, endorsing and tracking data) with the item images without actually printing such information on the physical document. This keyed voiding, endorsing and tracking data can then be processed either in conjunction with or separately from the check 303 images with the invention having the ability to tie the check 303 images and check 303 data together using the associated data keys. The electronic check data and informational data such as MICR information of the voided and endorsed check 303 is transferred over interface 310 to first processor 200 for processing which includes image integrity verification. When the image integrity is suspect, the integrity is enhanced by either rescanning check 303 or, alternatively, by manual intervention by first processor operator 301. If check 303 is rescanned, scanner/reader/printer 309 does not reprint the endorsement, voiding and item numbering information on check 303. By not reprinting said endorsement, voiding and item numbering data on the check 303 the integrity of the data as tied to the specific check 303 is maintained. In addition, a second image of endorsement, voiding and item numbering information printed directly on a first printed image may render the first printed image unreadable.

Once the electronic image data and the MICR encoding for the first check 303 is determined to be readable and accurate, the first processor 200 determines if this process should be repeated for additional monetary or non-monetary item(s) for the same deposit, or alternatively from an additional deposit slip from the deposit, and/or other deposits, i.e., other combinations of deposit slip and/or checks or other instruments. When the first processor 200 determines that processing by scanner/reader/printer 309 of individual check(s), deposit slips, or deposits, under the direction of the first processor 200 has ended and that the information is complete and ready for transmission via interface/media 202,204 first processor 200 formats the electronic image data and the MICR encoding and adds any additional control information in preparation for transmission to second processor 220 or third processor 240. The physical check 303 is stored in file 305 at the first processor 200 site or may, as allowed by banking rules and regulations, be held for a given period and then destroyed or alternatively may be destroyed immediately. In addition, the check image is stored on the first processor 200 (i.e., magnetic disk, CDROM, etc. not shown on drawing). Communications between first processor 200 and second processor 202 or third processor 204 preferably incorporates digital signature verification/certification performed by process 312 and data encryption performed by process 313 to ensure confidentiality.

Figure 4:
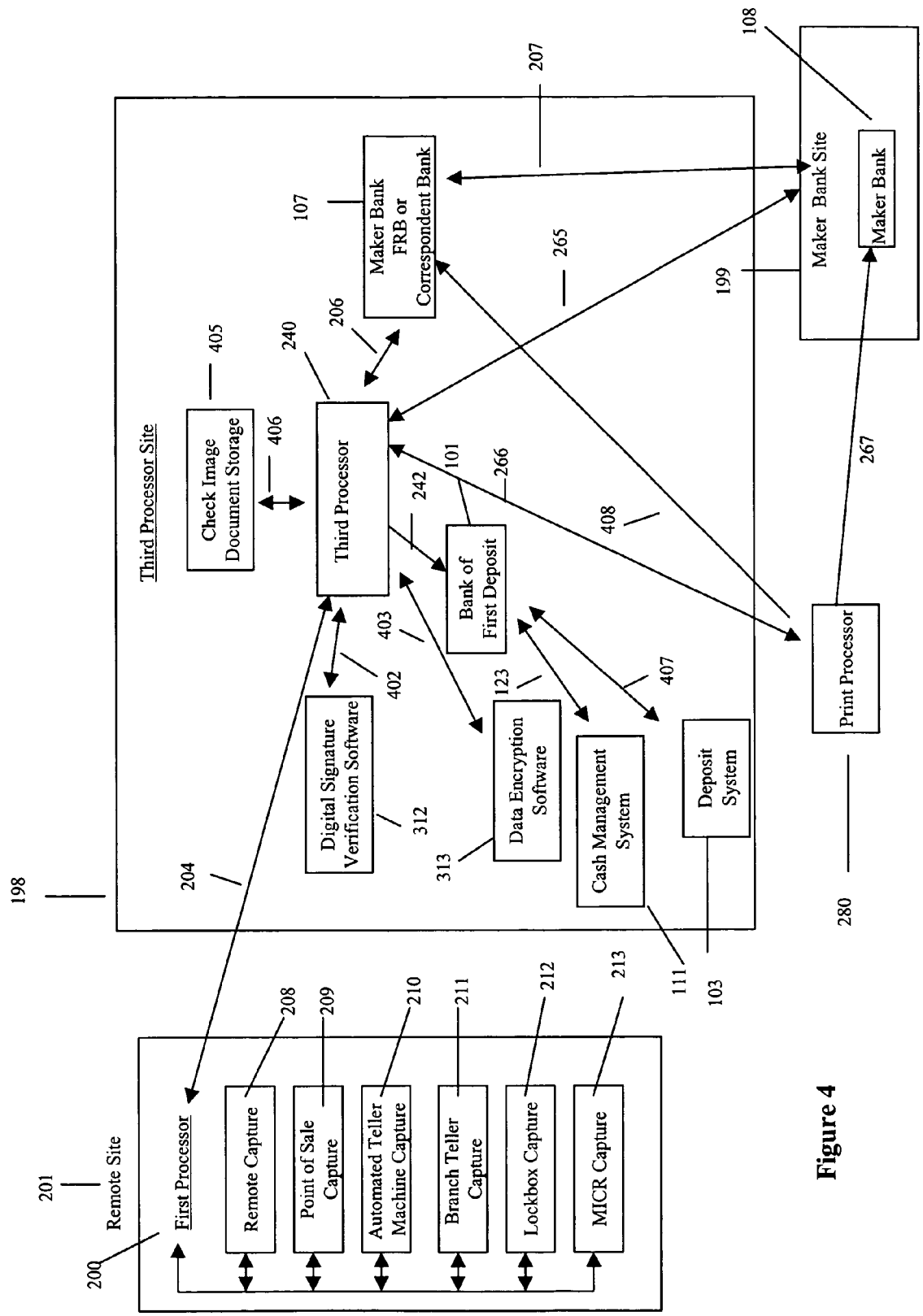
FIG. 4 illustrates second and third processor processing of image data as captured at the first processor site, in accordance with an embodiment of the present invention.

FIG. 4 depicts the third processor 240 and the various processes and interfaces associated therewith, in accordance with one embodiment of the present invention. While the accuracy of electronic check data transferred from first processor 200 through the second processor 220 to the third processor 240 will generally retain its integrity through the transmission, when electronic check data received by the second procesor 220 or the third processor 240, as evaluated and processed by computer-executable instructions or software loaded therein, is incomplete or inaccurate, or if the image data is not readable, third processor 240 communicates with first processor 200 giving detailed information to an operator 301 at terminal connected either directly or indirectly to first processor 220 concerning the need for additional information to restore image information or complete incomplete or inaccurate data associated with the deposit, whether the lack of incompleteness or inaccuracy of the data is associated with the deposit slip(s) and/or the check(s) 303 or instruments associated with the deposit slip(s). Depending upon the type of missing or otherwise incorrect information, corrected or supplemental information may be supplied by an operator 301 at terminal at first processor 200. It may even be necessary to re-scan check(s) 303 and/or deposit slips (not shown) and re-transmit at least portions of the data associated with the same, including but not limited to, image and/or MICR data to third processor 240. If check 303 is re-scanned, then endorsement, voiding and item number information are not reprinted on check 303 for purposes as previously explained herein.

It should be noted that as previously described herein much of the functionality of second processor 20 can also be done by third processor 240 and the use and functionality of second processor 220 is determined by need of efficient check 303 image, check 303 data and other informational data. Without limiting the functionality of second processor 220 as further described herein, the processes and interfaces of second processor 220 and third processor 240 will be combined for the purposes of describing third processor 240 functionality.

Once third processor 240 determines the new check data received for the deposit is accurate and complete, the third processor 240 stores the check 303 data along with any additional associated information such as time that deposit was captured, who the customer was who captured the deposit, item number, etc. as received from first processor 200 at the remote site 201. The third processor 240 confirms receipt of accurate information by sending a notification reply to first processor 200 through communications link 204 freeing-up first processor 200 for further processing of subsequent first processor 200 check deposit interactions.

Notification by the third processor 240 of the completeness of a deposit (or notifications by any other component or processor of the system for any purpose) can be done by any number of methods as understood by one skilled in the art. Whenever referred to herein these notification methods may include any one or a number of automated notices such as email, fax, electronic record transmission to the first computer, printing such message directly to a printer located at a location as directed by the person or company receiving the notification. Such notifications may also be sent directly to a display screen or sent to disk storage where it can be retrieved by a person having authority to access such information. Instructions for controlling electronic or manual notifications as described herein may be determined before such notification is required and such instructions may be stored on electronic devices accessible through the inventive software or other electronic means (such as internet access) as may convenient to the accessor. The storage and access of notification information (as well as any and all other access to information using the inventive processes) may be done from any terminal with access to the data and is controlled by the inventive software using methods that may include passwords and biometric security, such that only those who are authorized may access the information. Notification includes communications going both ways between the invention and for example, for example a first processor 200 operator 301, authorized person at bank of first deposit 101, maker bank 108, or customer or other such individual or organization.

Embodiments of the present invention can create and update notification information. The creation of this information can be done on either a batch or on-line basis using Internet, intranet, direct connect, or other such functionality designed into the invention. Examples of the use of notification information are to determine and route (via e-mail, fax, printed material, etc.) vital information about the system such as successful receipt of deposit information, error conditions, routing of reports, routing of billing information, and the like.

In alternate embodiments, all processors (first 200, second 220, third 240, and print processors 280) may store image data on an Internet-enabled check image document storage 405 thereby allowing access by the depositor/operator 301 from a terminal such as terminal connected to any of the inventive processors, their designee, the maker bank 108, or the bank of first deposit 101. It should be pointed out that because of present banking processes, the first processor 200 should still be associated with a chartered financial institution that is authorized to accept the checks from the first processor 200 and process them through normal check clearing paths. However, the financial institution does not have to actually receive the checks from the first processor 200. As an alternative, the financial institution can have an agreement with a servicer, which servicer will be responsible for accepting the checks 303, processing them, and presenting them for payment and settlement in behalf of the financial institution. When working with a check servicer the actual ownership and operations of the first 200, second 200, and third 240 processors can generally be done by either the financial institution, or the servicer as mutually agreed between the two parties. More specifically, the first processor 220 location 201 may be a branch extension of the financial institution or may be a person, or other entity with or without a legal relationship to the financial institution that provides the access services to the financial institution. Such an affiliated financial institution is still known as the bank of first deposit 101. The present embodiment does not propose eliminating the bank of first deposit 101, only replacing the method used to capture deposits.

Those skilled in the art understand that it is currently necessary for the lawful collection and settlement of checking deposits for each capture location to be associated with a bank of first deposit 101. The depositing process involves adding the summed amount of checks 303 in each of one or more deposits captured and processed by the invention and crediting such summed deposits into the depositors account at a bank of first deposit 101. It is further understood that traditional check-processing systems may be directly associated with a financial institutions to process the deposits that come from their customers or correspondent banks. However, it is common practice in the banking industry for financial institutions to use servicers (such as service bureaus and correspondent banks) to act as agents for the banks of first deposit 101 in that such service bureaus or correspondent banks capture check deposits for and in behalf of the bank of first deposit 101. When such capturing of check deposits is done for a financial institution the servicer captures the check deposits, forwards the deposit information to the bank of first deposit 101 for the bank of first deposit 101 application processing such as deposit systems 110 and cash management systems 111. The servicer is authorized by agreement with the bank of first deposit 101 to forward the checks 303 drawn on banks other than the bank of first deposit 101 to the maker bank 108 for payment and settlement. Therefore, as described herein, whenever a reference is made to the financial institution processing checks or reference is made to the financial institutions computer, it can be easily understood by those skilled in the art of check processing that this can also be understood to mean the servicer of the financial institution, which servicer is running the deposit operations and computers for the financial institution. It should also be known that the invention is fully capable of operating without a bank of first deposit 101 should future banking rules and regulations be changed such that a bank of first deposit 101 is no longer required an integral part of the check processing and clearing arena.

The third processor 240 (as well as all other data processes within the invention) maintains authentication and data integrity using digital signature verification 312 and certification, as well as via data encryption 313.

Referring back to FIG. 3, in another embodiment, if the decisions of endorsing, voiding, item numbering, number of deposits slips or checks, or dollar amounts of deposits, deposit slips, or monetary items cannot be made by first processor 200, for example, when the telecommunications line goes down and the decision information cannot be updated on the first processor 200, or when the third processor 240 is inoperable, or the specific 200 or the operator 301 at the first processor site is not authorized to make these decisions (i.e. we will determine and pass that information to the first processor 200 when the first processor 200 contacts the third processor 240 prior to accept deposit information at the first processor 200 site), then first processor 200 leads a depositor such as operator 301 through a series of instructions to gather deposit information required to ensure credits are made to the appropriate deposit account(s) 103, 104. This can be done by either using the reader/scanner/printer 309 or by operator 301 entering the necessary information on a terminal attached to first processor 200. The information can be relocated to the deposit slip(s), the check(s) on other instruments, or more generally relating to the deposit.

Then, check 303 is placed into the scanner/reader/printer 309 where the item is scanned, the MICR encoding is read preferably using either MICR or Optical Character Recognition (OCR) techniques, and an electronic image is created of check 303. The electronic image data and informational data such as MICR information is transferred from scanner/reader/printer 309 onto first processor 200 where first processor 200 edits and confirms that the electronic check data is readable. If the electronic check data is not readable or correct, the check data is corrected at the direction of first processor 200 or by the first processor operator 301 by either re-scanning check 303 or having a remote processor operator 301 manually key the information in using terminal or other interface device attached to first processor 200 at the first processor site.

Once the check data is determined to be readable and accurate, the first processor 200 then formats the scanned check data and adds additional control information in preparation for transmission to third r processor 240 and the alternate embodiment approach concludes. Such control information may include identification of the first processor 200 identification, first processor operator 301 identification for the operator 301 operating the first processor 200 and scanner equipment 309, time of day, date, and such other information that would be beneficial in understanding and tracking the capture and transmission of the check data. Similar processes can be performed for the deposit slip(s) for the deposit.

Returning to FIG. 4, after receipt of valid and accurate check data, if it is determined that the maker bank 108 or maker of the check 303 requires a physical item, the check data is printed by print processor 280 and then sent, either directly through path 267 to the maker bank 108, or indirectly through path 408, 207 to the maker bank 108 for processing by the maker bank's 108 check capture system or for other application processing by maker bank 108. If a physical item is not required, the check data is sent either directly from third processor 240 through path 265 or indirectly by the third processor 240 through paths 206, 207 to the maker bank 108 for processing by the maker bank's 108 check data capture system. In either case, the maker bank's 108 check image or check paper capture system interfaces with the maker bank's 108 deposit systems, cash management systems, and any other internal bank application system as needed for posting information. The check data and other information associated with the deposits being processed for the bank of first deposit 101 are further forwarded through path 242 to the bank of first deposit 101 for further processing by the bank of first deposit's 101 application processing systems such as deposit system 103 and cash management system 111 and such other applications processing systems as determined by bank of first deposit 101. End of FIG. 4

Figure 5:
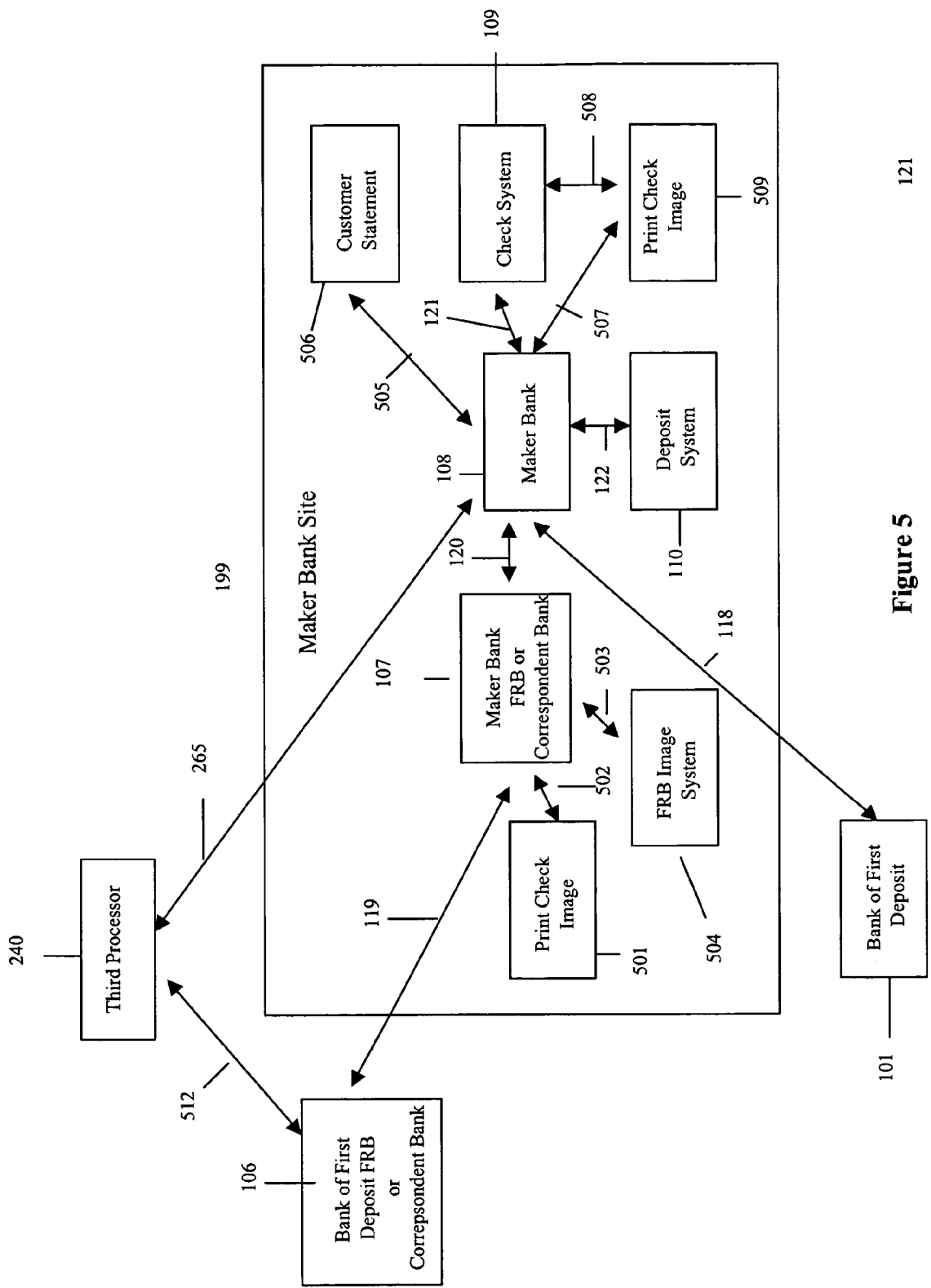
FIG. 5 illustrates processing at the maker or payor institution site, in accordance with an embodiment of the present invention.

FIG. 5 depicts the various component and processes of the maker bank site 199, in accordance with one embodiment of the present invention. As shown, the maker bank 108 receives either images or electronic data records of the original paper items 303 or printed duplicates (IRD's) of the original paper items 303 either directly from the third processor 240 through path 265 to the maker bank, or from the third processor 240 to the bank of first deposit's Federal Reserve Bank (FRB) or correspondent bank 106, through path 265 and from there through pate 119 to maker bank FRB or correspondent bank 106 which in turn forwards such check data, check images or IRD's to maker bank 108 through path 120. Alternatively the check images, check data, or IRD's can be forwarded to the Maker Bank from the Print Processor 280 either directly to the Maker Bank using path 267 or thought the FBR or Correspondent bank 107 through paths 107, 120.

Each of the entities in the check data or IRD clearing path as described herein are meant to be only representative of the clearing processes and paths required to clear and present such check data or IRD's from the inventive system using the bank of first deposit 101 agreed upon and authorized clearing relationships Such clearing entities will in turn process the check images, electronic data records, or paper items through their capture system and forward the images, electronic data records, or IRD's to the maker bank 108 through one or more of the previously described clearing entities and clearing paths. The description of such clearing paths and clearing entities is offered by way of example and does not limit the invention to any specific clearing path or entity. Such clearing paths and entities are determined by the agreements and arrangements the bank of first deposit 101 has with such other entities and the inventive process is capable of adhering to such agreements. Once received by the bank of first deposit FRB 106 or correspondent bank 106 and/or the maker bank FRB 107 or correspondent bank 107 each entity then processes the IRD's, check data or data records through their individual check capture and routing systems and then forward such check data, IRD's or data records to the next entity in the clearing process until it reaches the maker bank 108. Maker bank 108 will then process the image or paper item through their in-house application systems depicted by deposit system 110, print check image process 509, check system process, and customer statement process 506 through paths 122, 507, 508, 121, and 505.

These in house systems are not to be taken as systems that all financial institutions will have or use for this process. They are meant to represent the in house processing by maker banks to post monetary items to their accounting systems and to send the items (either image or printed duplicate of original items) to the check maker.

Figure 6:
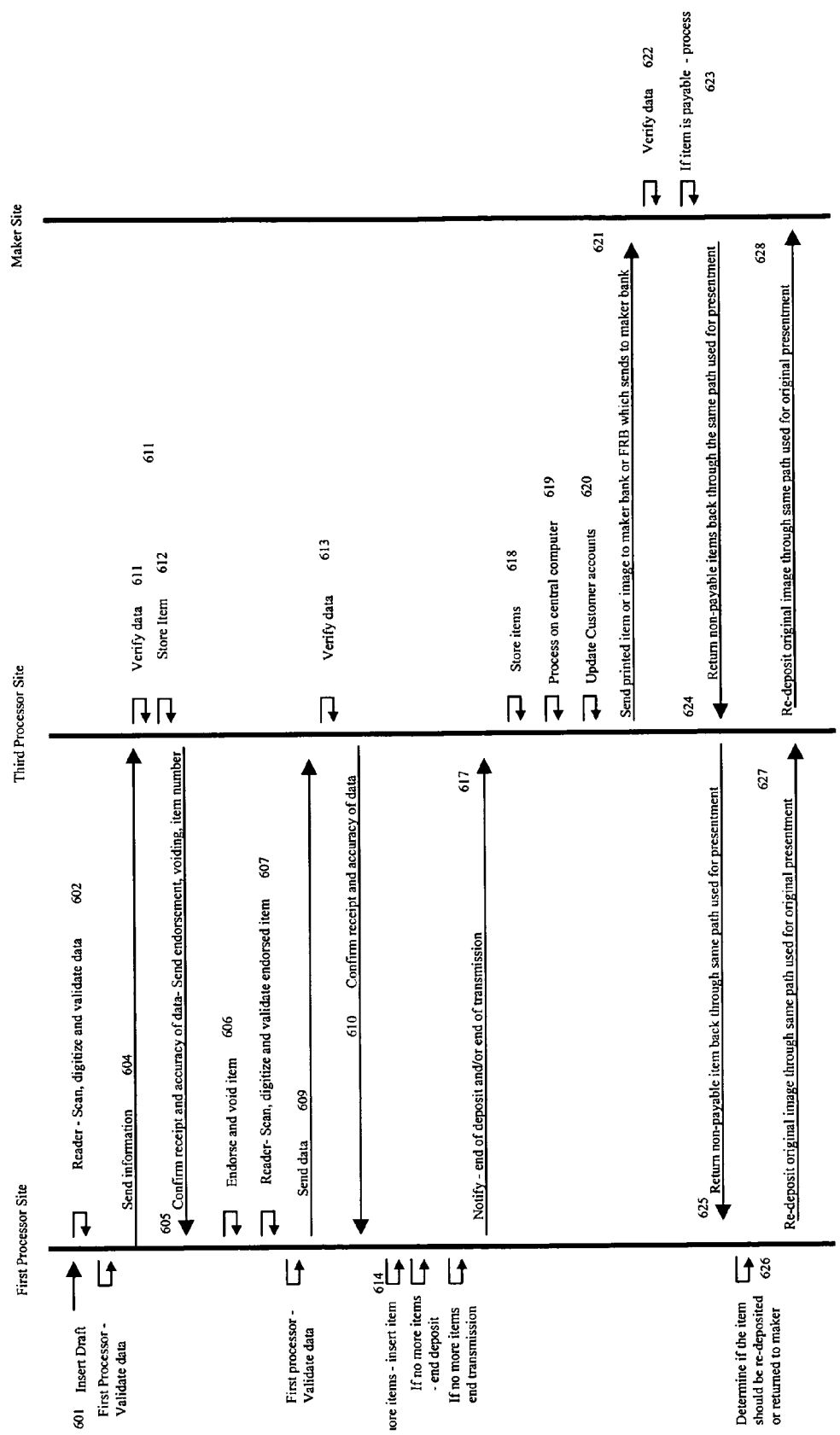
FIG. 6 illustrates a processing diagram of the interaction between entities of the present invention.
Figure 7B:
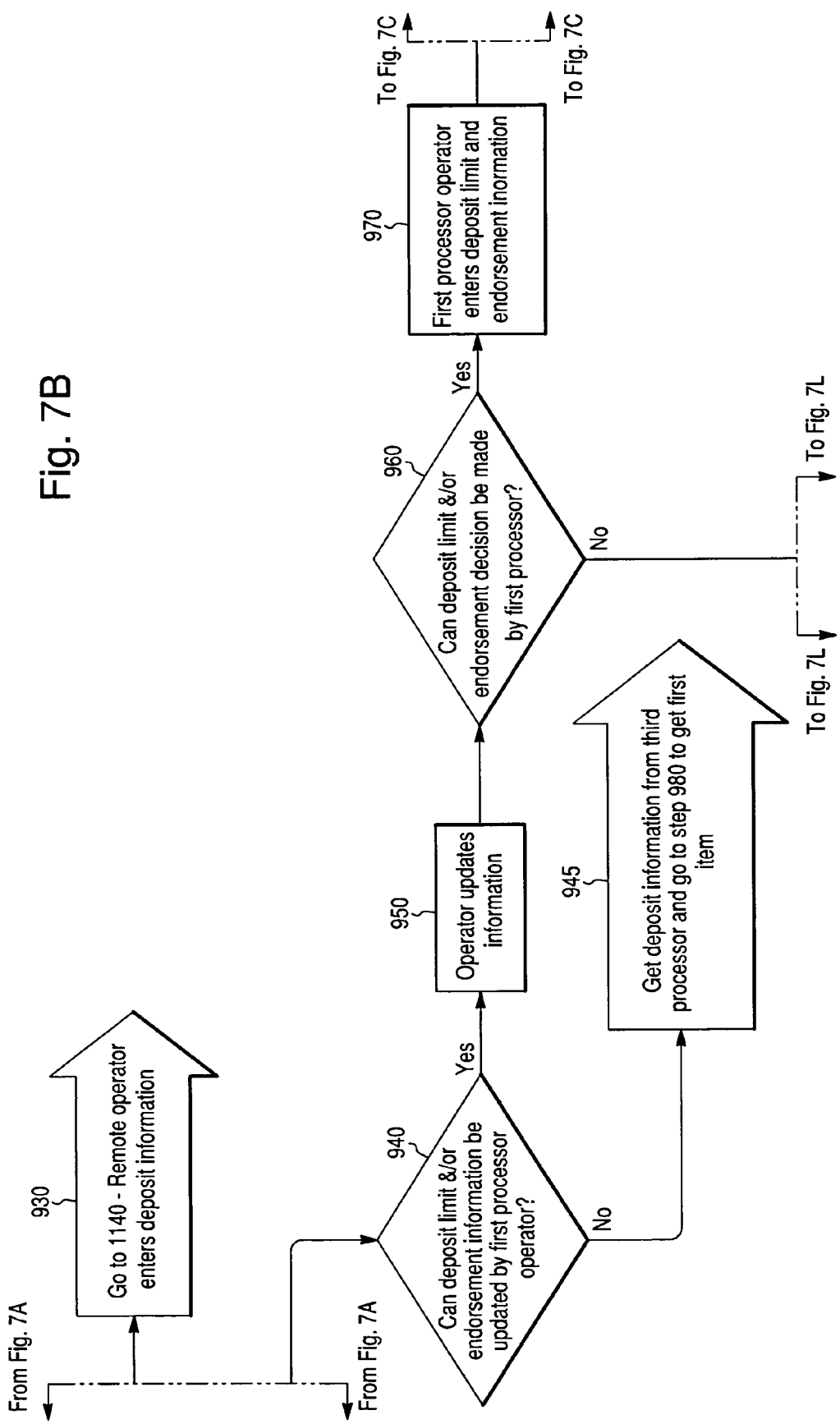
FIG. 7 is a process flowchart of check processing of the present invention.
Figure 7C:
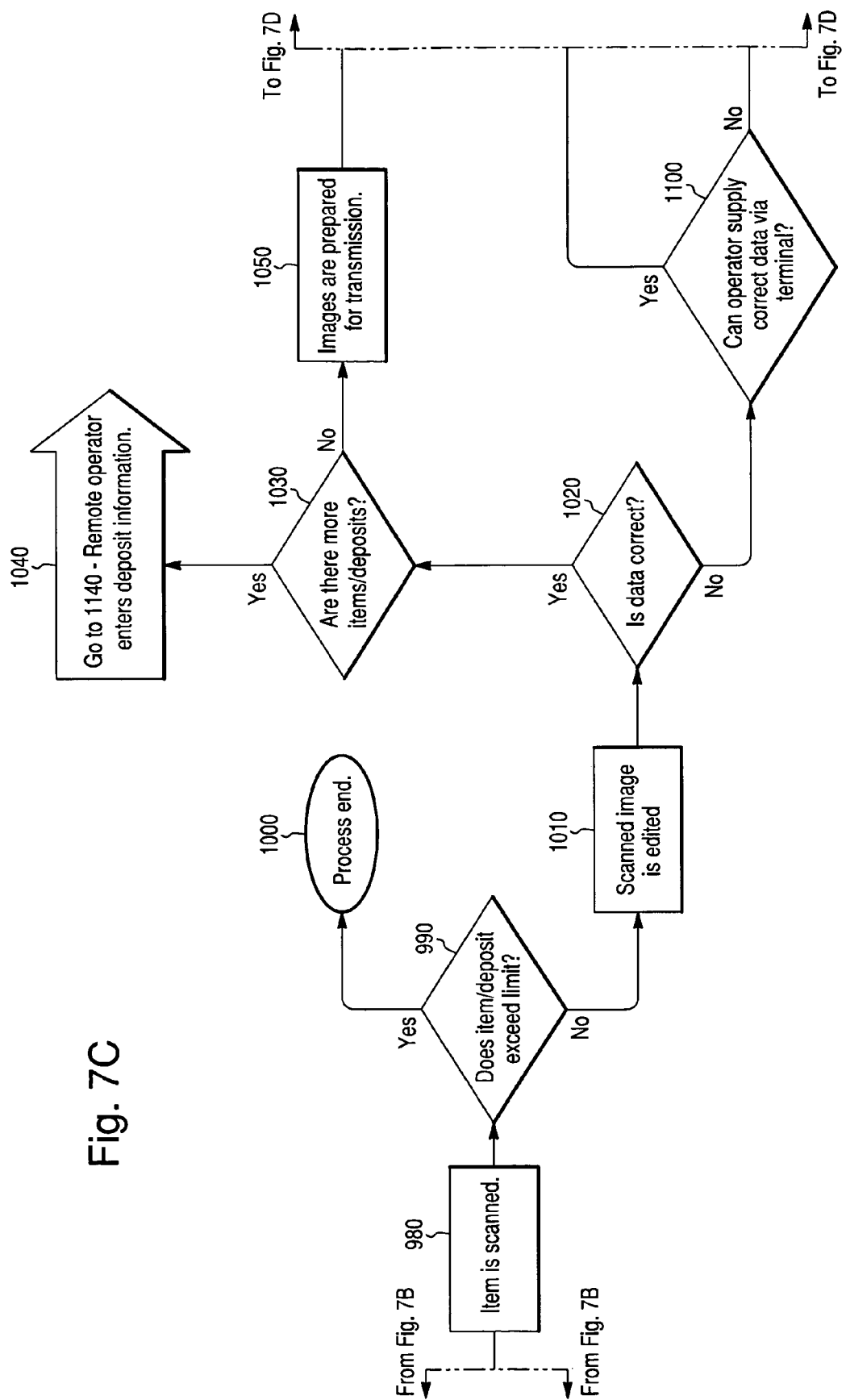
Figure 7D:
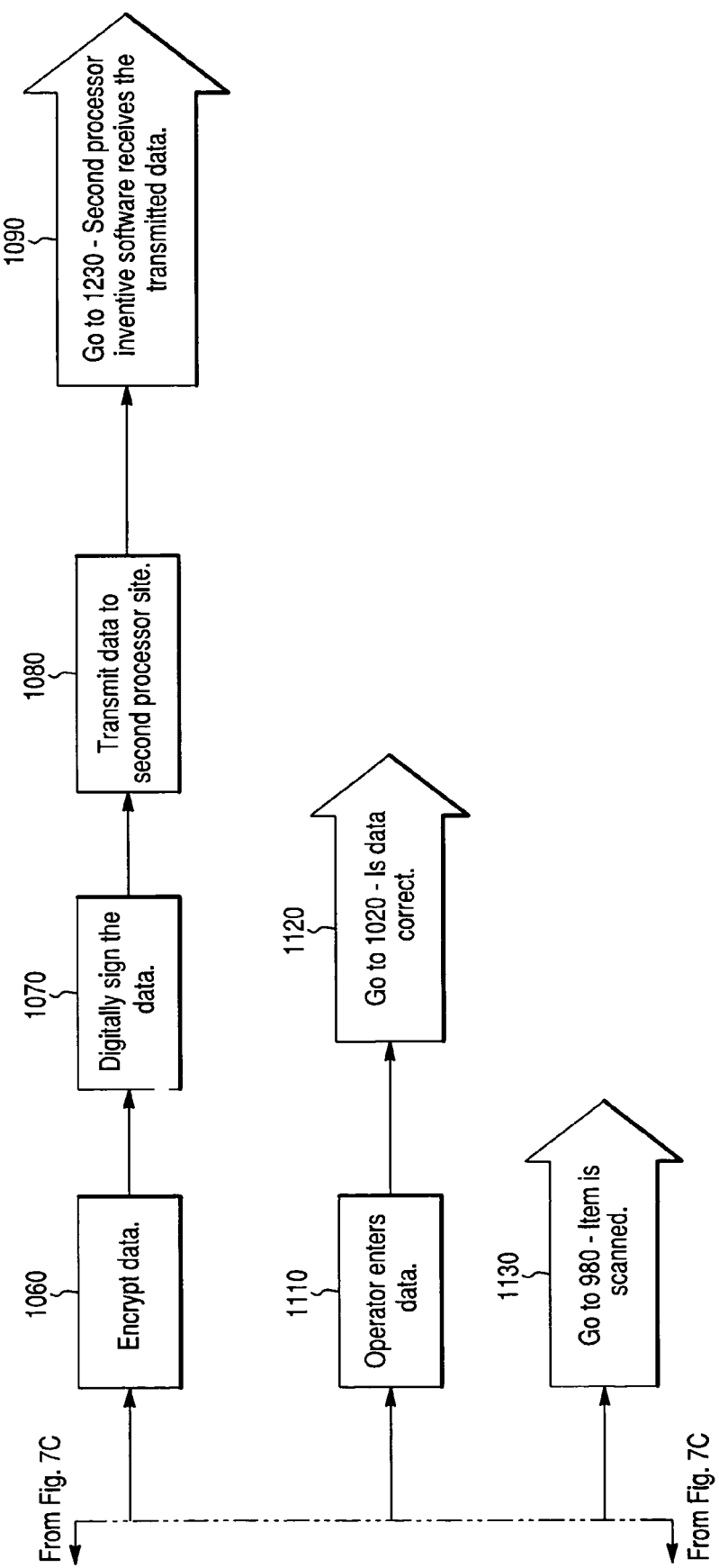
Figure 7E:
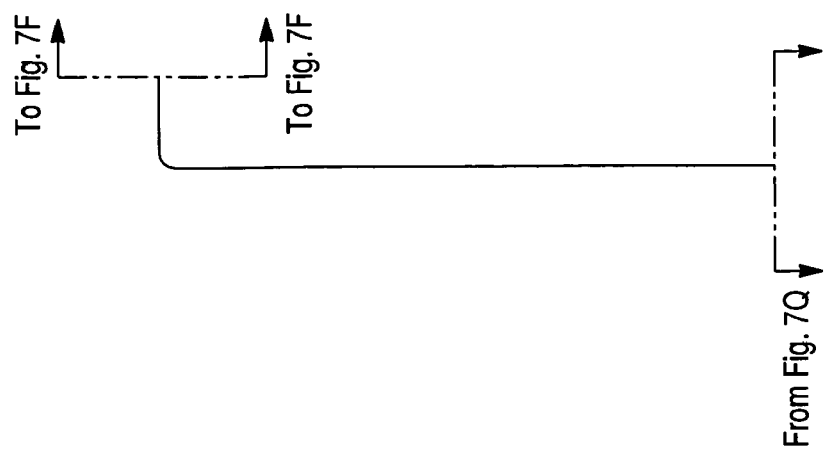
Figure 7F:
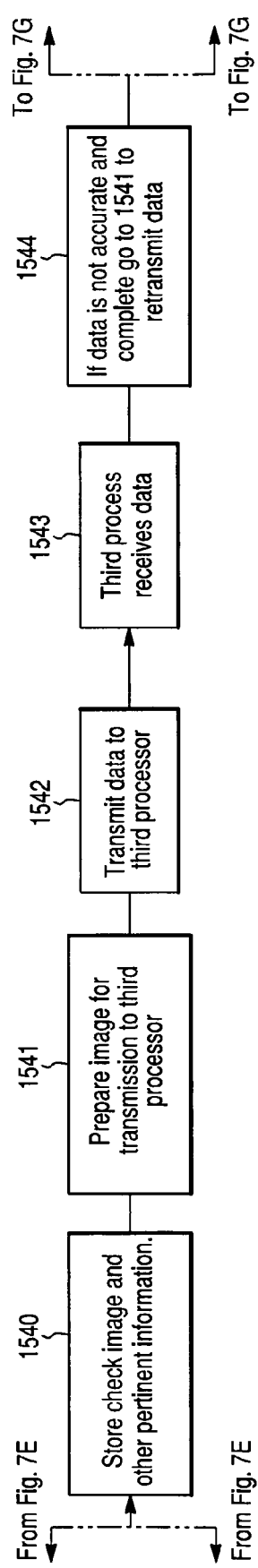
Figure 7G:
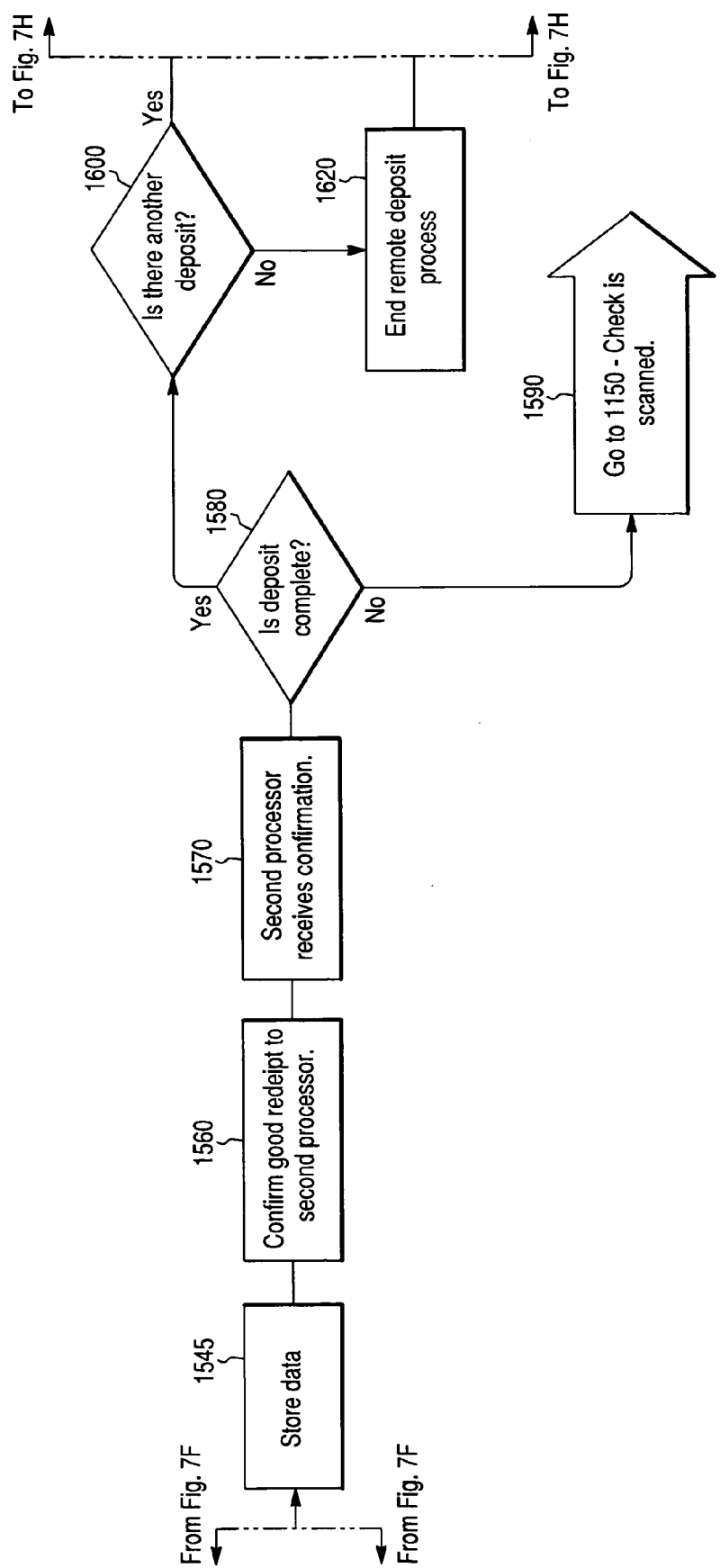
Figure 7H:
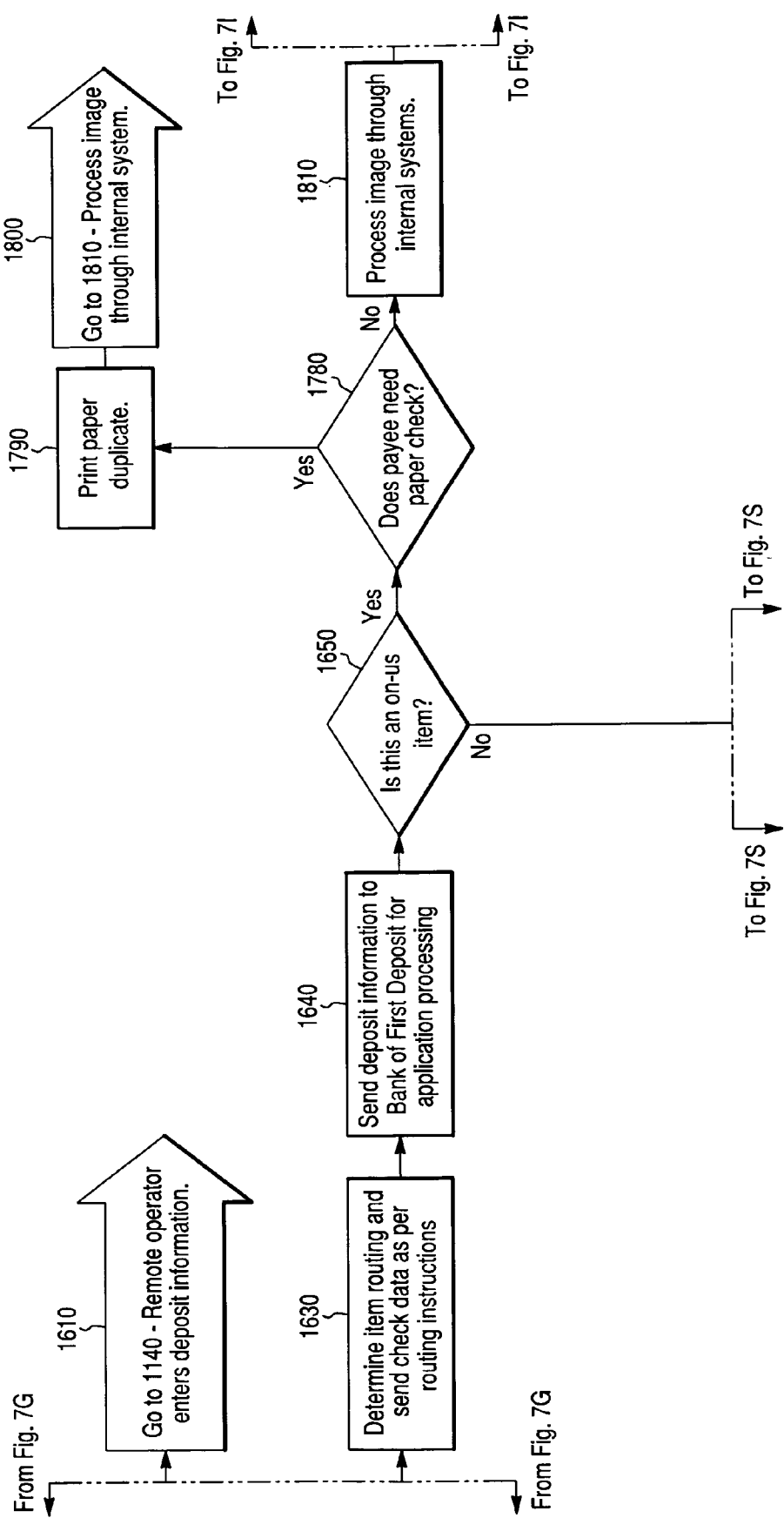
Figure 7I:
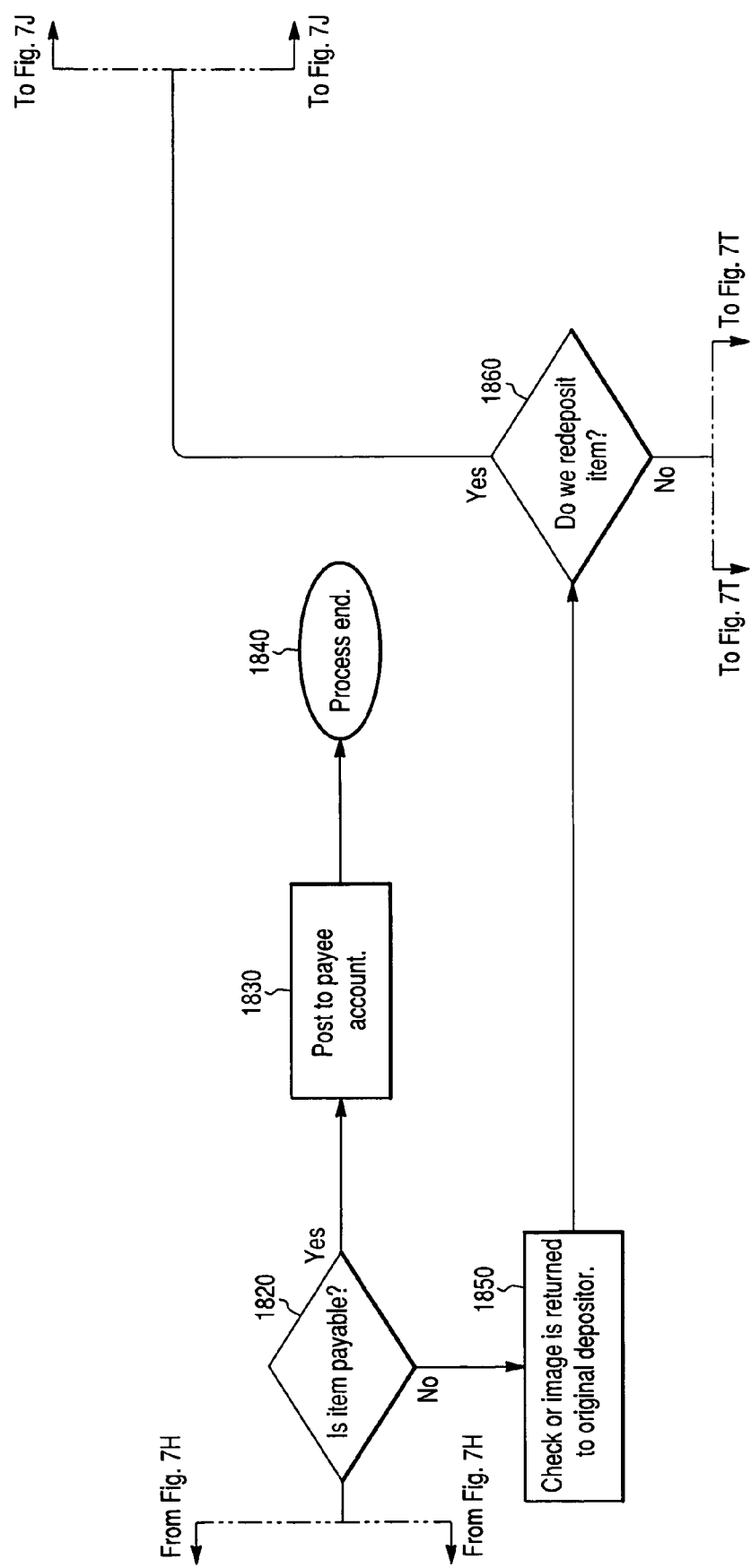
Figure 7J:
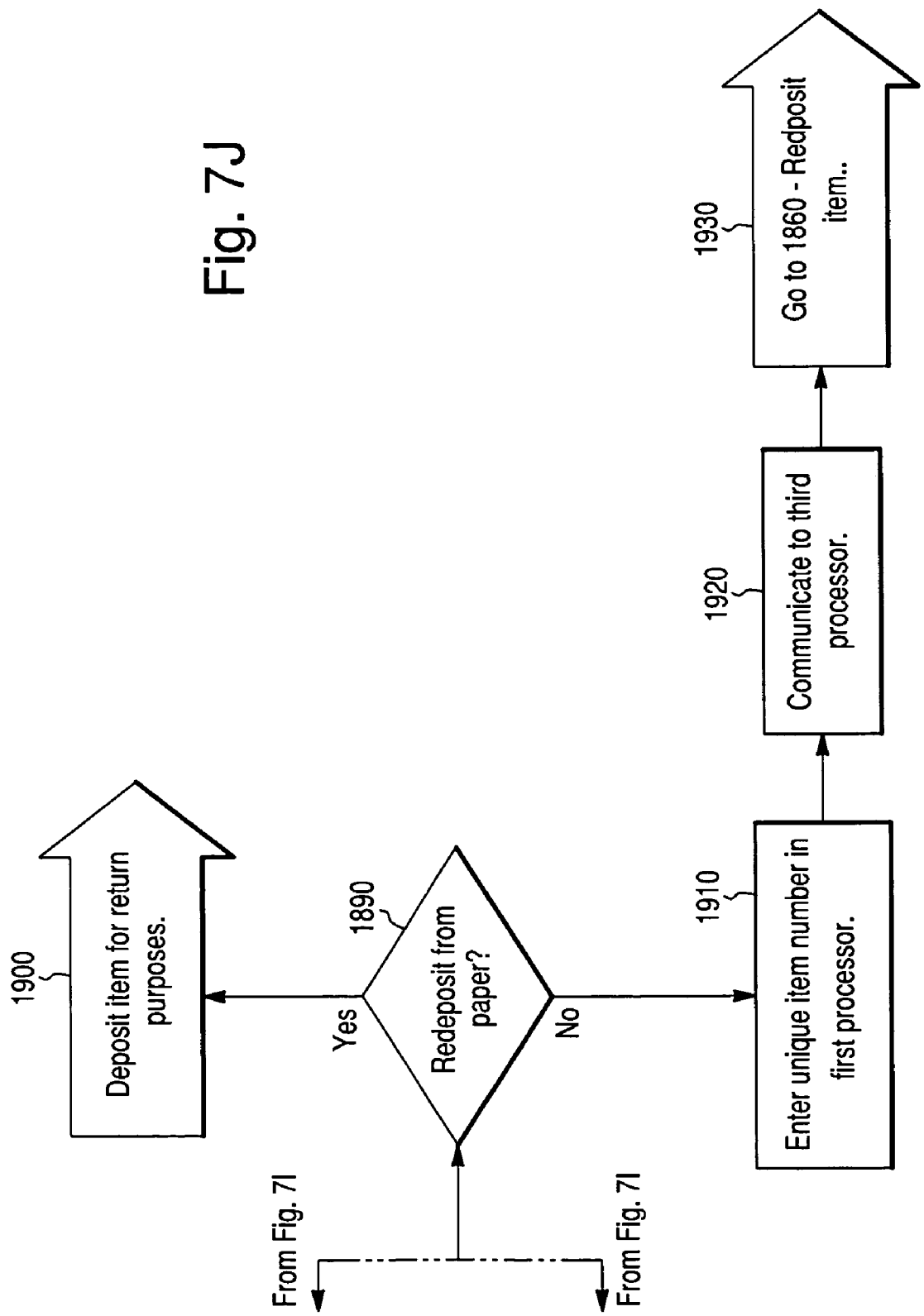
Figure 7K:
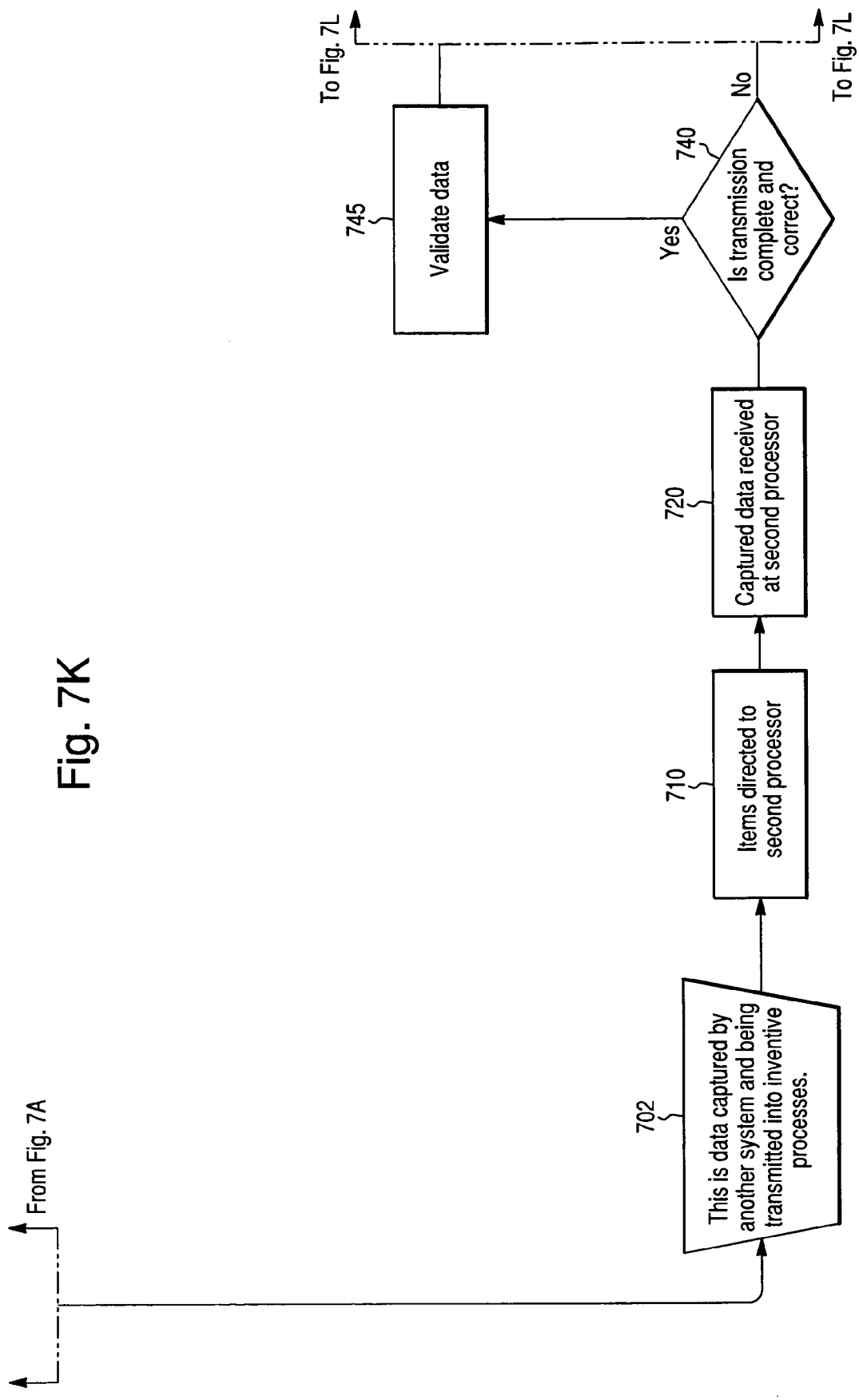
Figure 7L:
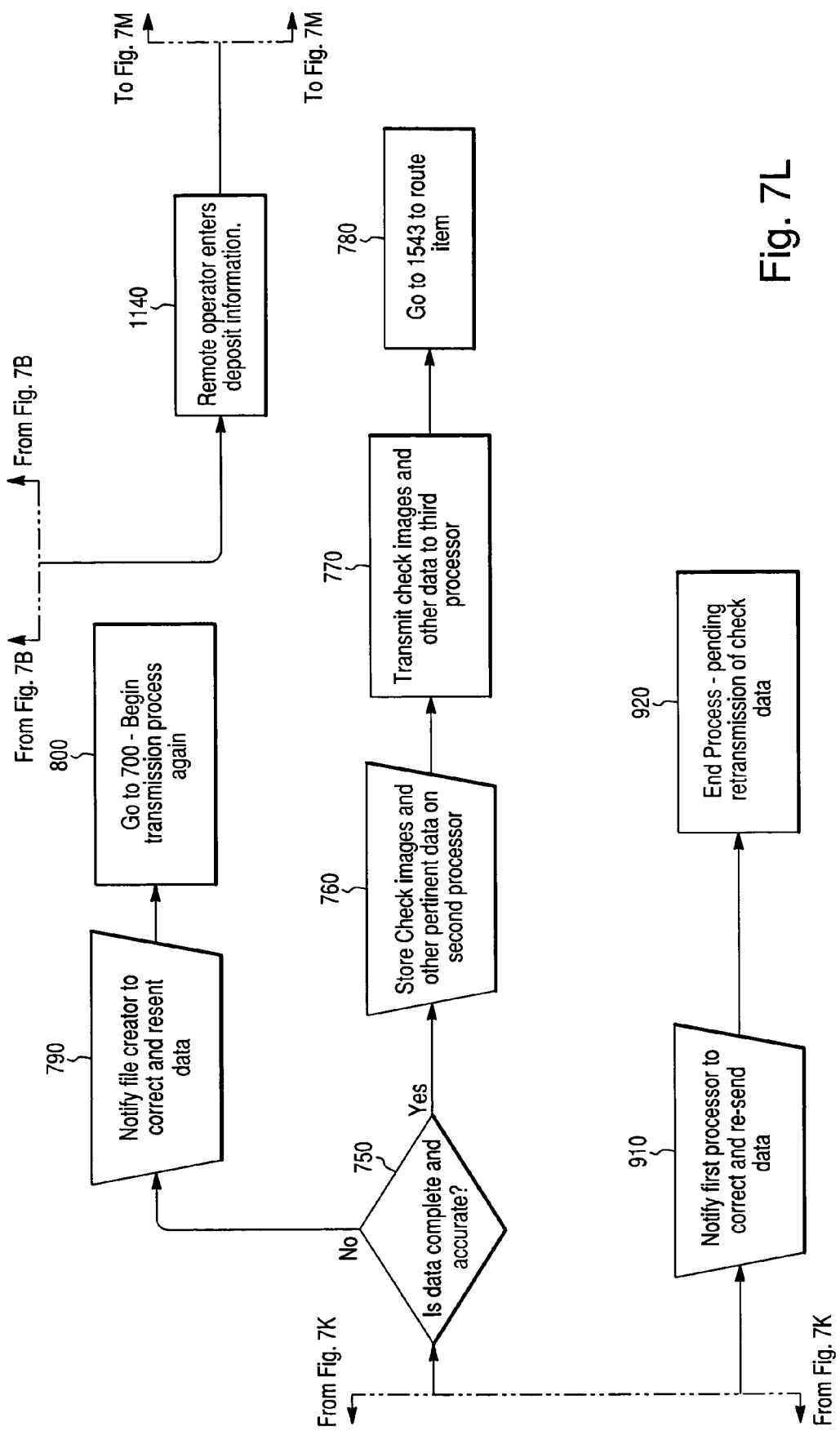
Figure 7M:
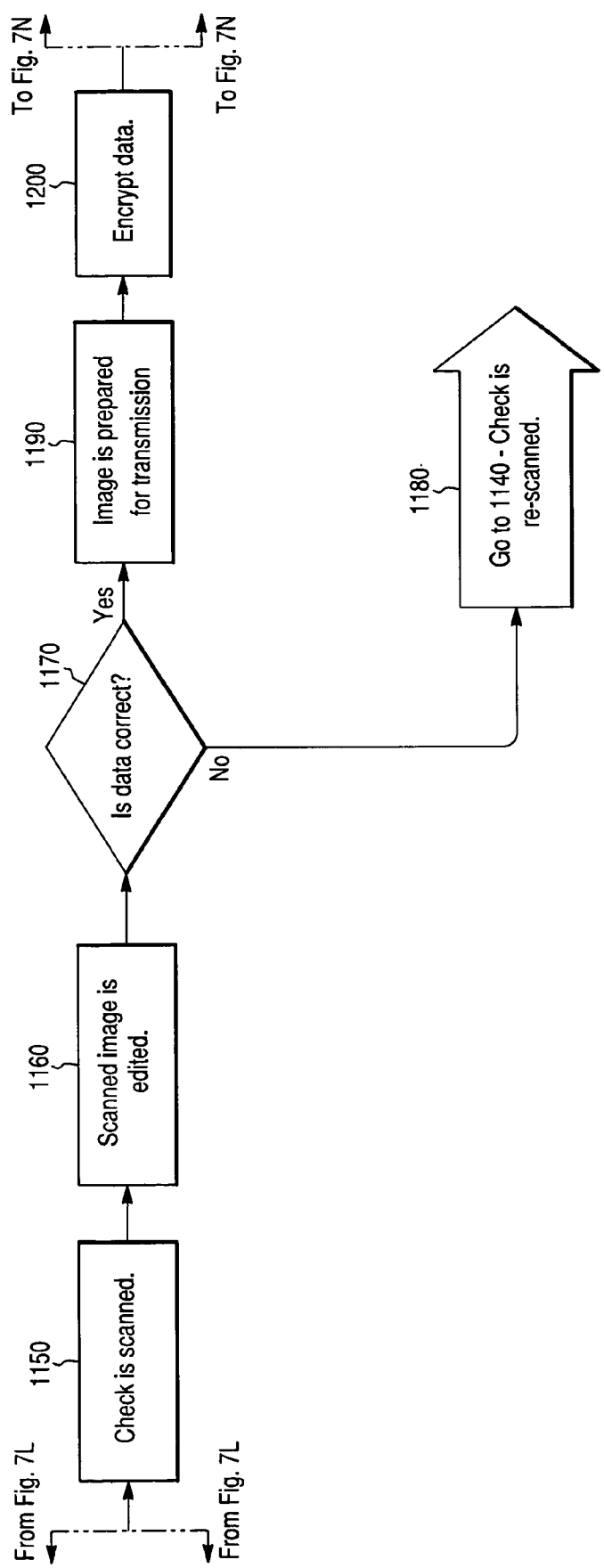
Figure 7N:
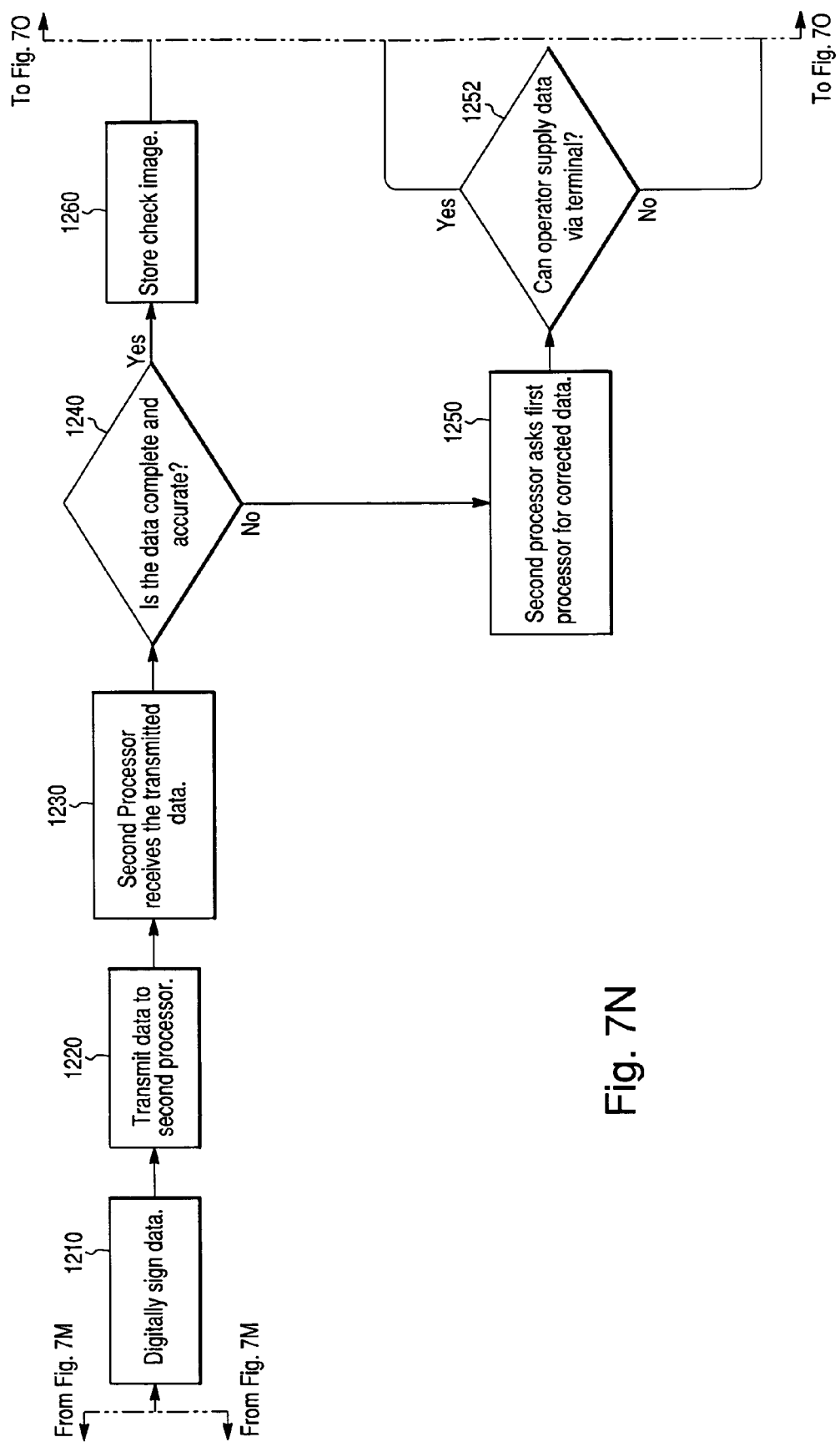
Figure 7O:
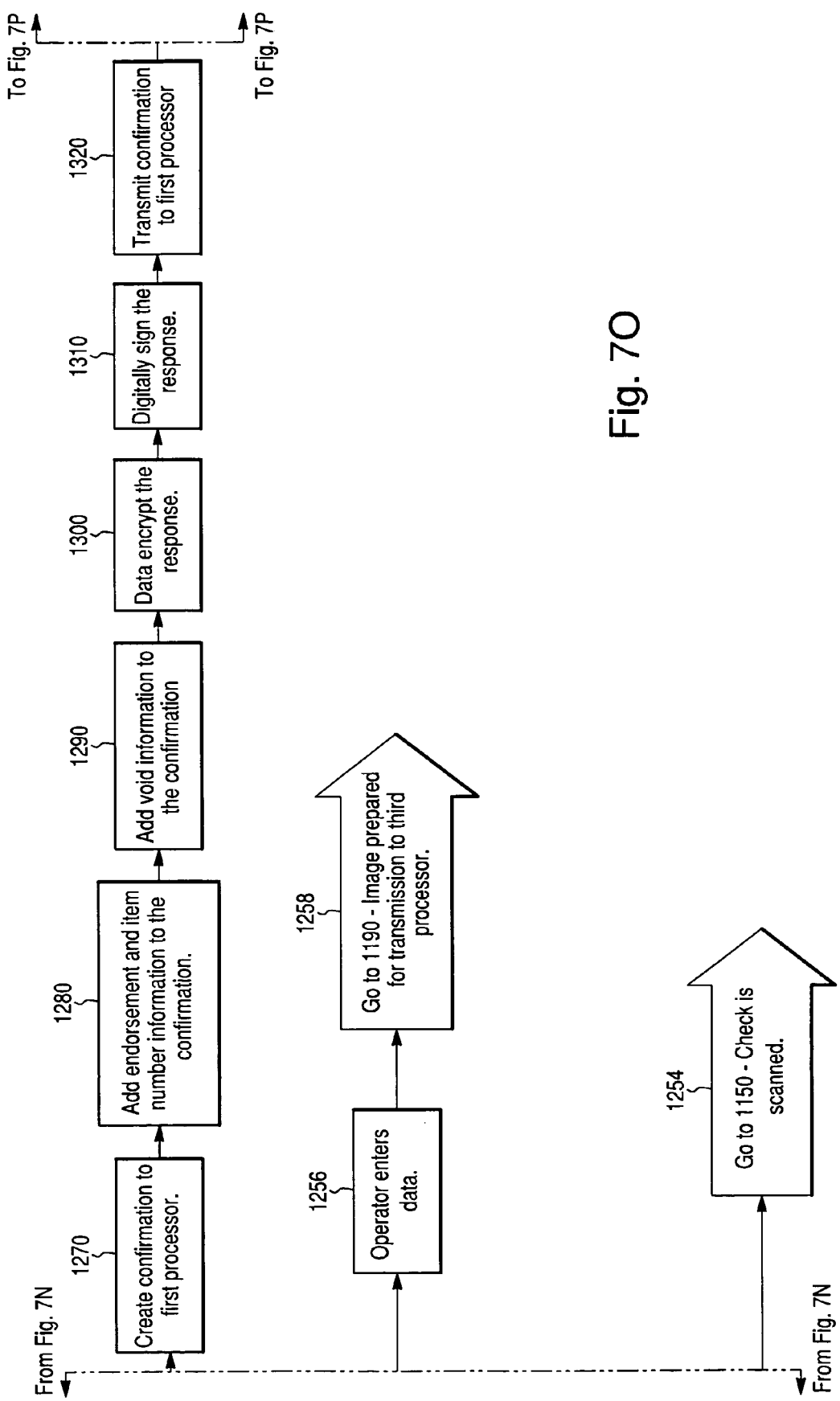
Figure 7P:
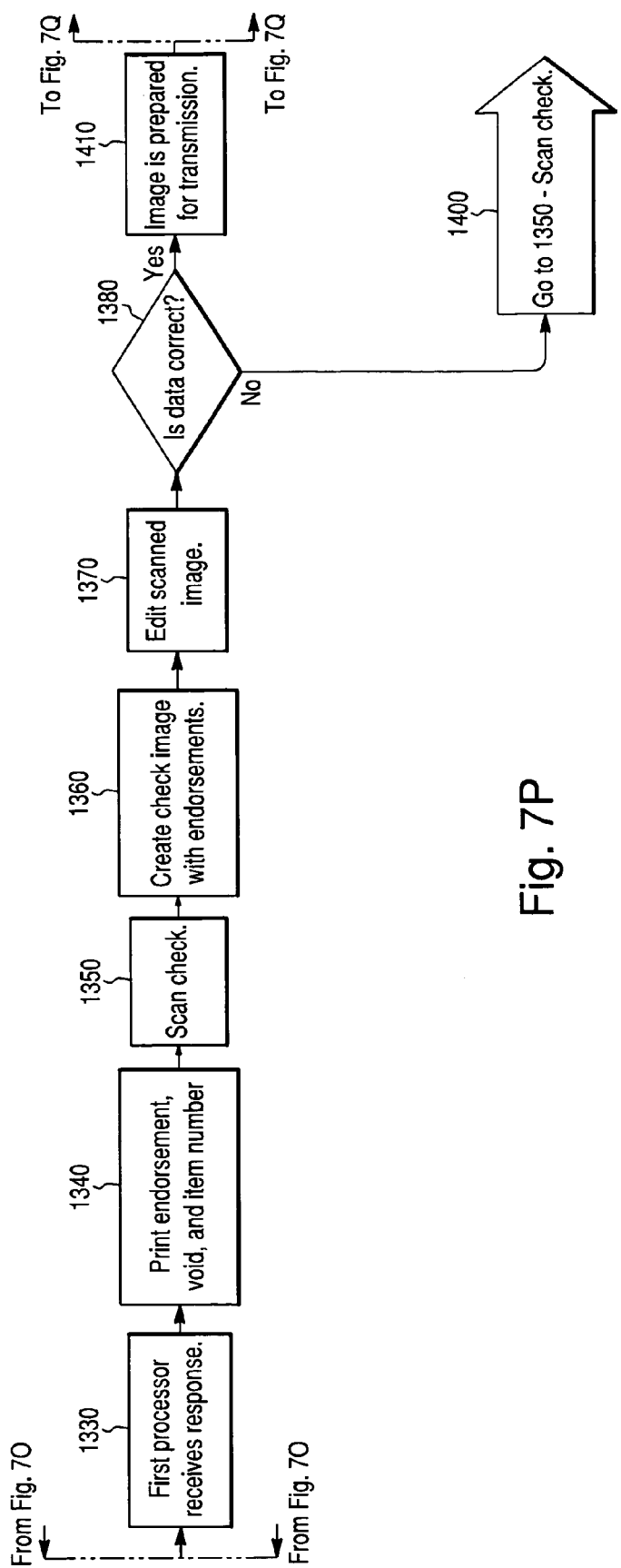
Figure 7Q:
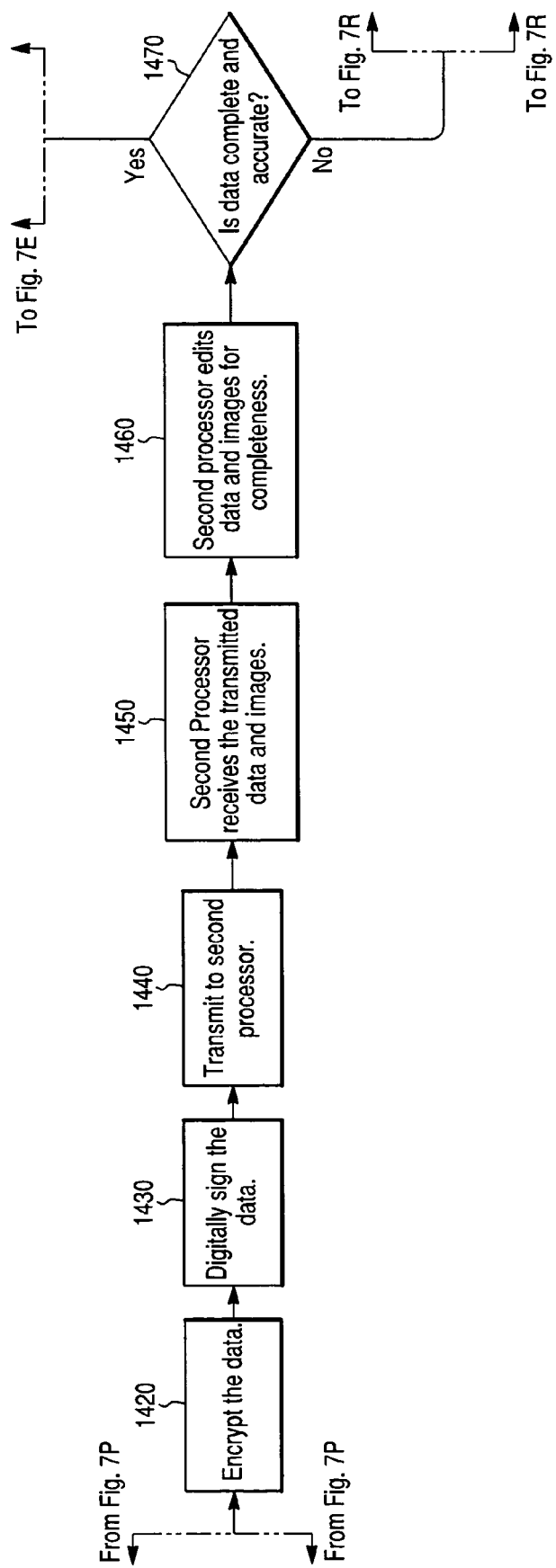
Figure 7R:
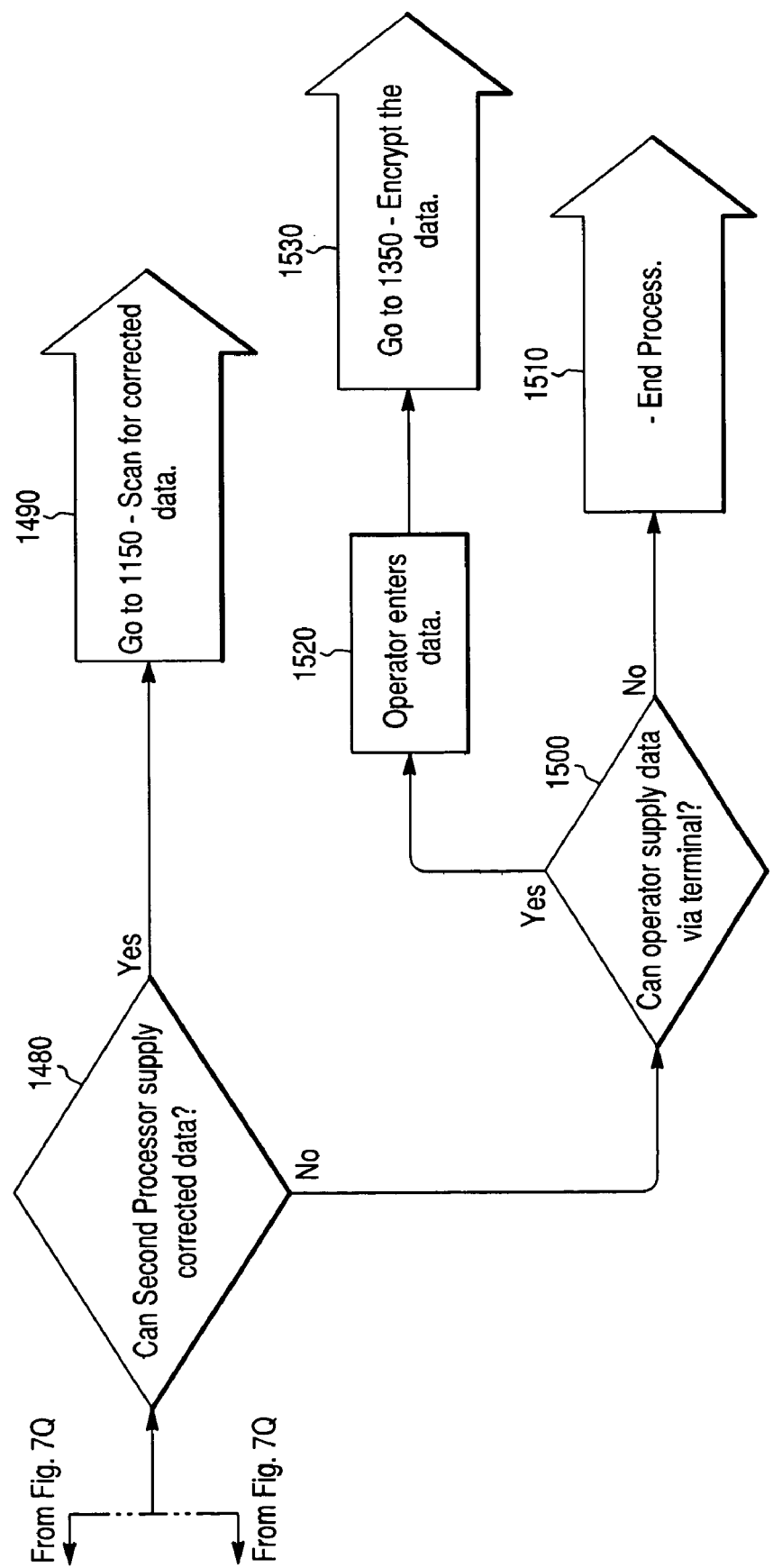
Figure 7S:
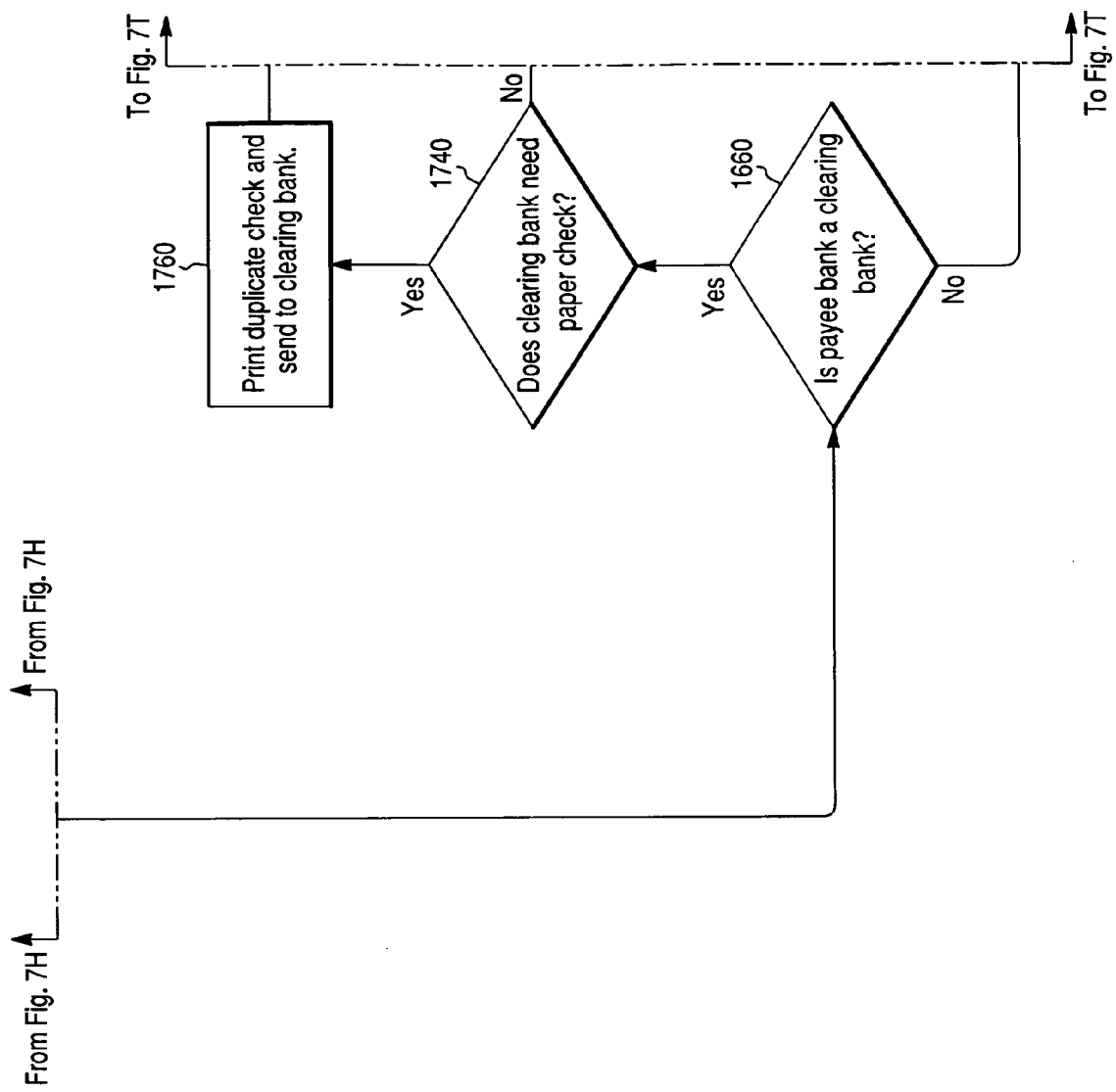

FIG. 6 is an interface diagram depicting a high level description of the interactions between the various components of the present invention, in accordance with one embodiment.

In this embodiment, the first processor operator enters deposit information, such as but not limited to information from one or more deposit clips associated with one or more check(s) 303 or instruments, into the first processor 200 then inserts a draft in a step 601 at the scanner/reader/printer 309 located at the remote site 201. The scanner/reader/printer 309 reads the item, digitizes and validates the check image information and passes it to the software on the first processor 200 in a step 602. The first processor 200 software receives the digitized data from the scanner/reader/printer 309 and validates data to ensure that the check information is readable and valid in a step 603. When the image is ready for transmission to the second processor 220 or alternatively to the third processor 240 as further described herein, the first processor 200 contacts the transmission facility and, incorporating digital signature verification and certification 312 and data encryption 313 software to ensure confidentiality, transmits in a step 604 the item image and control information to the third processor 240. The third processor 240 receives the transmitted data and edits and in a step 611 verifies the check data for completeness and content. Optionally, the one or more deposit slips are imaged and the images and/or information gleaned therefrom sent to the third processor 240 for processing with the check data.

When the third processor 240 has determined the check data and other associated data (relating to both the check image and data, and the deposit information) is complete and accurate and meets the deposit and/or item dollar limits, the third processor 240 stores in a step 612 the check data and any additional associated information received from the first processor 200, and then confirms in a step 605 receipt of good information by sending to the first processor 200 information needed to endorse the physical check 303 and to void the physical item, whether the check 303, instrument, or deposit slip, to keep it from being re-transmitted or deposited at a physical financial institution location for collection. In addition, a unique item identification number can be transmitted to the inventive software on the first processor 200 for printing on the physical check(s) 303 as a tracking and research mechanism. The invention allows for printing of the unique item number if it is determined by the bank of first deposit 101 employing the present invention that it is desirable to print the unique item number for tracking and research purposes.

After the first processor 200 receives specific information required to void, endorse, and print the unique item number, the first processor 200 and the scanner/reader/printer 309, in accordance with computer-executable instructions, will pass the check 303 again where the first processor 200 will print in a step 606 the information on the physical item at the locations required by the rules governing automated check processing. The item is also scanned in a step 607 again under the direction of the computer-executable instructions associated with the first processor 200 inventive software and the new image (containing endorsement, voiding and item number information), and associated additional information required for tracking and control purposes, is edited in a step 608 for accuracy and completeness and if correct is then transmitted in a step 609 to the third processor 240 by the first processor 200 using the transmission facility set up for this purposes.

If the data is not readable or correct, the information is corrected at the direction of the first processor 200 by either re-scanning the item or having the first processor 200 operator key the information in using the terminal attached to the first processor 200. If the item is rescanned at this point, the endorsement, voiding, and item number information may not be reprinted by the scanner/reader/printer. When the image is ready for transmission to the third processor 240, the first processor 200 contacts the transmission facility and, incorporating digital signature verification and certification 312, and data encryption 313 software to ensure confidentiality, transmits in a step 609 the check data image and control information, and/or other deposit information, including deposit slip data, images, or information, to the third processor 240.

The third processor 240 receives the transmitted updated check data and edits in a step 613 for completeness and content. If the data is incomplete or inaccurate, or if the image data is not readable, the central site communicates, with the first processor 200 and gives detailed information to the operator concerning the need for additional information to complete the inaccurate data or image information. Based on the specific need, this information can be supplied using an on-line terminal through the inventive administrative functionality or on terminal directly connected to first processor 200 or by re-scanning the physical item and re-transmitting it to the third processor 240. In either case, this information is supplied under the direction of the first processor 200. Such additional information is transmitted to the third processor 240 from the first processor 200. If the physical item and/or deposit slip is rescanned at this point, the endorsement, voiding and item number information may not be reprinted by the scanner/reader/printer.

Once the third processor 240 determines the new data received for the deposit is accurate and complete, the third processor 240 stores in a step 618 the updated image of the physical item (on the database(s) maintained for this purpose) along with any additional associated information received from the first processor 200, such as but not limited to, deposit slip images, data, or information, and then confirms receipt in a step 610 of good information by sending a notification to the first processor 200 that the process for that specific deposit is complete unless more items are present in a step 615 and allows for termination of the transmission of information or for the same process to be followed for other items in a step 614 in that deposit or for another deposit in a step 616.

In another embodiment of the invention, the first processor 200 and third processor 240 store the check image(s) on an Internet enabled documents storage system allowing access by the depositor, their designee, or the first processor 200 and/or third processor 240. The first processor 200 and third processor 240 for storing check images and associated information preferably employees incorporating digital signature verification and certification 312, and data encryption 313 to ensure confidentiality.

If the check 303 is removed from the scanner/reader/printer 309 prematurely, at any time during the process of capturing and transmitting data from the first processor 200, the transaction information associated with that check 303 would be considered invalid and not part of the deposit. The depositor will need to re-scan and re-enter data associated with that check 303.

The first processor operator will have the option at the first processor 200 site to release deposit information to the third processor 240 for processing. This can be done after either a completion of single deposit in step 615 (containing one or more checks 303) or after completion of all deposits in step 616 (each containing one or more checks 303) from the remote site.

After the deposit(s) from a specific first processor 200 site are complete, this information is passed to the third processor in step 617. The third processor 240 formats deposit information, including at least one of deposit slip information, deposit slip image(s), check or instrument information, and/or check 303 or instrument image(s) for processing in the accounting systems of the bank of first deposit 101 in a step 619, including sending the image and other appropriate information for application processing in step 620 (including deposit accounting systems 103, MICR capture 125, cash management processing 111, float processing, etc.,).

If the maker bank 108 requires a paper item for processing and charging the makers account at the maker bank 108, the print processor 280 prints an IRD, which is delivered to the maker bank 180 for processing in step 621. Alternatively, if the maker bank 108 can accept and process check data the print processor 280 sends such check data to maker bank 108 for processing by maker bank 108 also exemplified in step 621. In a step 622 the maker bank determines if the data is correct and in a step 623 if the item is payable from the account of the check maker. If the check IRD or check data is not payable by the check maker it is returned as exemplified by the following embodiment of the invention.

Check items (either IRD's or check data items) that need to be returned, are done so in steps 624 and 625 to the bank of first deposit 101 to be routed back through the same route that was used to clear the item. If a paper IRD item has been created, that item will be returned along with information showing the reason for return. Otherwise, the check data or electronic data record will be used for return item purposes until the return item check data or electronic data record is returned under the direction and authority of the bank of first deposit 101 via the third processor 240 to the first processor 200 along with the return reason. The unique item number assigned at capture time by either the third processor 240 or the first processor 200 can be included in all return check data, data records, or IRD's to enable complete and accurate tracking of all return items An alternate embodiment of the return item process of the present invention can allow a Return Items clerk at the maker bank (which is the bank returning the item) to scan the item(s) to be returned (this creating a check data item or data record of the IRD to be returned) and to enter a return reason code, and information that identifies the maker bank 108 and bank of first deposit 101 on the image record. Using this embodiment item images can be captured, either from original paper items presented by a means other than the invention or from a paper IRD created under the inventive process, on any hardware that is capable of capturing an image format that the invention is capable of handling (as described herein) and that allows the customers to enter the required information identifying the return reason, bank of first deposit 101, maker bank 108, etc. As an alternative to capturing the image of a physical item if the original presentment of the item being returned was an image sent to the maker bank, then the original image can be sent through the invention instead of capturing an image from a physical item. Once an item image and item data are created from a paper return check, the maker bank can retain the physical items used to create the return item image and store those items for research purposes. Alternatively, the maker bank can destroy the physical item and use the item image for research purposes.

Another embodiment of the return process of the present invention can create electronic batches, which include the item images and a deposit slip, deposit slip image, and sufficient information to allow the items to be charged back to the original deposit account at the bank of first deposit 101.

A further embodiment of the present invention return item process is that the item image information created by the inventive process when the item image and item data was created for presentment can be used to return the item to the depositor. Such item image information includes depositor information, item number, date the image and image data was created, processor where the item image and item data was created, customer id, storage archive key for where the item image and image data are stored, and other such data. This item image information can then be used to retrieve the item image and item data from archival storage for purposes of returning the item image and item image data through the inventive process to the original depositor.

An additional alternate embodiment of return item process of the invention for returning check data or IRD's can also use the inventive process to merely send an early notification to banks of first deposit 101 and/or original depositor to enable them to receive early image notification of return to hold funds. This notification can selectively be via e-mail, data file, image file, etc. at the bank of first deposit 101 request. The physical item can then follow the early notification if so required by the bank of first deposit 101 or original depositor. An alternative, based on the early notification of a return item(s), would be to enable the bank of first deposit 101 or original depositor to actually resubmit the item image and item data (or print another IRD) to re-present (also known as re-depositing) the check item through the clearing channels to the bank of first deposit 101.

Re-depositing of returned items (which re-depositing is resubmitting the returned check data of IRD to the maker bank 108 for payment) may be facilitated by the first processor 200 determining if the IRD or check data is to be returned in a step 626 as further described in preferred embodiments herein. The first processor 200 prompts the first processor operator 301 with instructions on how to scan and transmit the returned paper item or re-deposit the endorsed image previously captured and stored. The re-presentment of IRD's of check data is done through path 627 to the third processor 240 to the maker bank 108 using path 628. The unique item number assigned at capture time by either the third processor 240 or the first processor 200 facilitates both options. In addition, a re-deposit of an item originally captured by the first processor 200 and presented for payment of the maker bank 108 can be done by first processor 200 (under the direction of the processor operator) identifying the item tracking number of the original check data created by the first processor and retrieving such check data from the data storage or archival storage and using such image to re-deposit the returned in either check data, data record, or IRD format as further described herein.

FIG. 7 is a flowchart depicting the specific steps for carrying out the invention in accordance with an embodiment.

In a step 700, the inventive capture process begins. In Query step 701 it is determined if there is deposit data that was remotely captured by another data capture system ready for entry into the invention. This determination can be done on a manual person-to-person basis or automatically as a data file is in the process of being transmitted into one of the inventive processors such as second processor 220. Based on the data being remotely captured for entry into the invention, the data is identified as such in step 702 and forwarded in a process step 710 to a second processor 220. In step 720 the transmitted check data items are received by second processor 220. In step 740 the transmitted data is checked for accuracy and completeness. This test includes such things as complete data file transmission, summed items in file balance to the deposit slip control totals in both number and dollar amount of items and other such summed data. If the file does not pass the file and data checking in step 740 then in process step 910 the originator of the data is notified of the need for correction and retransmission as previously described herein and in process step 920 the process ends pending correction and retransmission of data.

If in returning to decision step 740 it is determined that the data is received correctly then in process step 745 the data is sent to query step 750 to determine by testing the transmitted file and check data if the check data is complete and accurate. In query step 750 the inventive software determines if all of the data is good and accurate then in process step 760 the data is stored as described herein, the data is forwarded to third processor 240 and the process is forwarded to step 1543 for additional processing as further described therein.

If in returning to decision step 750 it is determined by testing the transmitted file and check data that the check data and file are not correct, then in process step 790 the file originator is directed via message to file originator to correct and resend the data and the process ends in process step 800 with the a return to step 700 for the beginning of a transmission to the invention once the file creator has corrected that data.

If in returning to query step 701 it is determined that the data was not remotely captured then in process step 900 the inventive software is initiated or otherwise made available to the first processor 200 for execution. Those skilled in the art appreciate the various processes and steps for performing loading of software into a processor such as the first processor 200. It is also contemplated within the scope of the present invention that the software for execution on any of the processors may take the form of embedded executable instructions. Process step 900 passes control to query step 905 where it is determined if the deposit processing criteria, (e.g., deposit limit and endorsement information) are present at the first processor 200 thereby enabling the initial check deposit processing decisions to be performed locally at the first processor 200 or, alternatively, when the deposit processing criteria is not local on the first processor 200, processing passes to process step 910 to where such information is loaded to the first processor from the second processor 220 and them control passes to process step 920 for validation of the deposit limit and endorsement information.

If in returning to query step 905 it is determined that deposit-processing criteria is present at the first processor 200, a query step 920 determines if the information required to determine deposit limits and endorse the item is current on the first processor 200. If this information is present and current on the first processor 200, processing passes through path 921 to step 930 to process step 940 where the first item is scanned the first processor 200.

If in returning to query step 920 it is determined that the deposit limit information is not current on the first processor 200 then query step 940 determines if this information can be updated by the operator on the first processor 200. If authorized, the operator will update such deposit limit information using the inventive administrative functionality as further described herein. Authorization for the operator to update information is dependant on such authorization being given by the entity responsible for ensuring that the items and deposits are captures accurately and efficiently. Such entity could be the Bank of First Deposit being used for the depositing of funds associated with the particular capture of items being done at the time, the customer of the bank of first deposit that is actually doing the capture of the items and deposits, or any other entity responsible for the capture of the items. If in query step 940 the operator cannot update this information, then process step 945 allows for updating the deposit limit information and other such information from the second processor 220 or third processor 240 as further described herein and then proceeds to process step 980 where the item capture begins for the first processor 200 capture function.

If returning to query step 940 the operator can update the deposit limit or endorsement information, then in process step 950 the operator updates the deposit limit and endorsement information and the process continues to query step 960 to determine if the deposit limit or endorsement decisions can be made by the first processor 200. If the first processor 200 can make such decisions, then process step 970 allows the first processor operator to enter deposit information, such as, but not limited to, information from a deposit slip for the deposit, as well as the endorsement voiding and item numbering information before reading the first monetary item of the deposit in process step 960 and then proceeding to query step 990.

Query step 990 determines if the current item for the deposit exceeds the item dollar limit or makes the deposit exceed the deposit dollar limit for the particular depositor and/or first processor 200. If the limits are exceeded then the process of entering items for the given deposit in process end 1000, and the first processor operator has the option of beginning another deposit or ending the deposit process with the third processor. If the limits are not exceeded, then process step 1010 accounts for the scanned item being edited for accuracy and completeness at the first processor 200 prior to proceeding to query step 1020 where it is determined if the data from the scanned item is correct.

In query step 1020, if the data is correct, then query step 1030 determines if there are more items to scan for a particular deposit. If there are more items to scan, then process step 140 passes back to process step 980 to allow the first processor 200 to begin the item capture process over again using the first processor 200 functionality. If query step 1030 determines that there are no more items for a particular deposit or no more deposits to process, then process step 1050 prepares the item image data, check data, and/or deposit information for transmission prior to encrypting the data in process step 1060 and digitally signing the data in process step 1070. Process steps 1180 and 1190 transmit the data image to the second processor 220 for editing in process step 1230.

In returning to query 1020, the data is not correct, then query step 1100 determines if the operator can correct the data using a data terminal connected to the first processor 200. If the operator can correct the data, it is done in process step 1110 prior to passing through process step 1120 and going back to query step 1020 to test data image for correctness. In query step 1100, the second processor operator cannot supply correct data then the process passes through step 1130 to process step 980 where the item is scanned and begins the editing and validating steps again if the check data is not correct, process step 948 passes through to process 932 where the item is rescanned.

If in Stepping back to query step 960, endorsement and deposit limit information cannot be made by the first processor 200, then the first processor operator enters deposit information in process step 1140 before scanning the physical monetary item associated with the deposit in process step 1150 after which the item image is edited in process step 1160.

In query step 1170, if the image data is not correct, the check is returned to process step 1150 where it is rescanned and re-edited in step 1160. If query step 1170 determines the image data is correct, then the data is passed successfully through process step 1190 where the image is prepared for transmission to process step 1200 where the data is encrypted and step 1210 where the digital signature is added in preparation for transmitting the data to the second processor 220 (as further described herein) in process step 1220.

Process step 1230 receives the transmitted image data and passes it to query step 1240 where it is edited for accuracy and completeness. If the data is not accurate or complete, it is passed to process step 1250 where the data is corrected by requesting updated information from the first processor 200. If the first processor operator cannot supply correct date via the terminal attached to the first processor 200 in query step 1252, then the check 303 passes through process step 1254 to process step 1150 where it is scanned again in preparation for editing and transmitting the corrected image to the second processor 220. If the first processor operator is able and authorized to correct the data in query step 1252, the data is entered in process step 1256 and passed through path 1258 to process step 1190 where the data is encrypted in preparation for transmitting to the second third processor 220.

If in query step 1240 the check image data is complete and accurate, the data is passed to process step 1260 where the image is stored in data sets used by the financial institution for document archival and research as well as in a database and/or archival system that is Internet enabled and available for access and research purposes by the depositing customer and bank of first deposit 101. After the image is stored, a confirmation of good data receipt is created in process step 1270. This confirmation contains necessary endorsement, item numbering and voiding information, which is added to the confirmation record in process steps 1280 and 1290 prior to the confirmation being sent to the first processor 200. The confirmation record is then data encrypted in process step 1300 and a digital signature is added in process step 1310 prior to the record being transmitted to the first processor 200 in process step 1320. Upon receipt by the first processor 200 in process step 1330, the endorsement, item numbering and voiding information is printed on the physical check 303 in process step 1340 prior to it being re-scanned in process step 13560.

After a new check image is created showing the necessary endorsement and voiding information in process step 1360, the new check image is edited to ensure the scanned check data is correct. If in query step 1380, it is determined that the image data is not complete or accurate, the image is passed through process step 1400 to process step 1530 where the physical check 303 is scanned again. If the is passed through the reader again at this point, the endorsement information has already been printed and will not be printed again for purposes as previously explained herein. If in query step 1380 it is determined that the check image data is good, the data in prepared for transmission in process step 1410 prior to the data being encrypted in process step 1420 and digitally signed in process step 1430 prior to being transmitted to the second processor 220 in process step 1440 which second processor 220 forwards all of the associated data to third processor 240 as further described herein in an embodiment of the invention.

As the third processor 240 receives the transmitted image data in process step 1450, the image is edited by the third processor 240 in accordance with computer-executable instructions stored or accessible by the third processor 240 in process step 1460 to ensure completeness and accuracy of data. Query step 1470 determines quality of data and if the data is not complete or accurate, it is sent to query step 1480 where it is determined if the second processor can supply the corrected data. If in query step 1480 the second processor can supply the corrected data then process is passed to step 1150 for the item to be scanned again. If in returning to query step 1480 it is determined that the check data is not accurate or complete then in query step 1500 it is determined if the operator can supply the missing or corrupt data. If in query step 1500 operator cannot supply the correct image data then in passing through process step 1510 the process ends for that particular item as being unreadable with instructions to re-read the item using the inventive scanning processes. However, in returning to query step 1500 if the operator of the first processor 200 can supply the correct data then in process step 1520 the operator at the first processor 200 enters the data, forwards it to in step 1530 to be encrypted in process step 1420 and then follows the previously described process from that point. Once the corrected data has been received at the third processor 240 the endorsed image of the check is stored in datasets and archives used by the bank of first deposit 101, customer, service provider, etc. for document archival and research as well as in a database that is Internet enabled and available for the depositing customer, make bank, maker, bank of first deposit 101, and any other authorized entity to be able to access for research purposes.

Stepping back to query step 1470, if the data image is complete and accurate the endorsed image of the check is stored in process step 1540 in datasets used by the financial institution for document archival and research as well as in a database that is Internet enabled and available for the depositing customer and bank of first deposit 101 to be able to access for research purposes. Then, in an exemplary demonstration of the interface between the second processor 220 and third processor 240, the check data is prepared by second processor 220 in process step 1541 to be transmitted to the third processor 240 in process step 1542. If the data received by third processor 240 in process step 1543 is not accurate or complete control passes back to process step 1541 for second processor 220 to prepare check data for retransmission to third processor 240. However, if in process step the data is complete the data is stored in process step 1545 in databases, archives, and other storage facilities as further described herein.

The third processor 240 then sends confirmation of good receipt of data in process step 1560 to the second processor 220, which receives notification of such confirmation in process step 15703. At this point query step 1580 at the first processor 200 determines if the deposit currently being worked on is complete. If the deposit is not complete, then process step 1590 returns control to the previously discussed process step 1150 where the next item is scanned. If in query step 1580 the deposit is complete, query step 1600 determines if there is another deposit. If there is another deposit to be processed, process step 1610 passes through to previously discussed process step 1140 where the new deposit process is initiated. If there is not another deposit as determined in query step 1610, the first processor 200 entry process is completed in process step 1620 and the captured check data routed in process step 1630 by the inventive process for presentment as further discussed in preferred embodiments of the invention. Then in process step 1640 the third processor 240 forwards the appropriate posting information and data to the bank of first deposit 101 for application processing by the bank of first deposit's 101 including posting the deposit to the deposit account of the person or company making the deposit and all other such application processing systems of the bank of first deposit 101 as further explained herein.

In the course of processing a deposit, it is important to the decision-making to understand which banks the deposited items are drawn (i.e. who is the maker bank) and what the processing capabilities are of the banks involved in clearing any particular item. For example are the clearing banks capable of handling, processing, and presenting only paper items, or can they handle and present check data, or even electronic data records (such as ACH). In providing further example of this decision making for form of presentment by the clearing banks a query step 1650 determines if the monetary items in the deposit are "on us" items (i.e. items drawn on the bank of first deposit 101). If the items are "on us," the system determines, in query step 1780, if the check maker 108 requires a paper check. If they do, then a duplicate of the original check is printed by the inventive processes as further described herein as embodiments of the invention in process step 1790 and the paper item is sent to the maker of the check by the clearing bank. In addition, if the clearing bank is image enabled, the image of the item is sent in process step 1800 to process step 1810 (discussed below) for processing on internal computer accounting systems. If the clearing bank is not image enabled an alternative for presentment to the clearing bank is to an electronic data record (such as an ACH record) to the clearing bank for processing on internal computer accounting systems. In query step 1780, if the maker of the check 303 does not require a paper duplicate of the original item, process step 1810 passes the checks image or electronic data records through the internal accounting systems to query step 1820 where it is determined if the item is payable (i.e., does the check maker have sufficient funds in their account to cover the check, is the maker account still open, etc.).

If query step 1820 determines the item is payable, the check data is posted to the maker's account and the process ends for that check 303 item in step 1840. If query step 1820 determines the item is not payable, then process step 1850 returns either the printed duplicate of the check 303 or the check image to the first processor 200. In query step 1860, a first processor 200 function determines to re-deposit the item or return it to the original depositor. If first processor 200 determines in query step 1860 to return the item, this is done in process step 1870 by returning the item or image to the original depositor and process 1880 ends the return process. At this point the original depositor (company or person) may make the choice to either return the check 303 to the person/company that gave the depositor the check 303 or present it back through the inventive deposit process for presentment to the check maker's account at the maker bank. If query step 1860 determines that the item should be re-deposited for collection, query step 1890 determines if this is to be done using the duplicate paper item or the original check image.

If the return from query step 1890 is to be done using the duplicate paper item, then this is done in process step 1900 where control is sent back to previously discussed processes where the item is deposited using the scanner/reader/printer and deposit processes further described herein as preferred embodiments of the invention. If the check return from query step 1890 is to be done using the original captured check image or electronic data record for the item, process step 1910 allows for the first processor 200 to initiate this process by entering or retrieving from data storage the unique number assigned to the original check 303 at capture time. This information is sent to the third processor 240 via the second processor 220 and in process step 1930 control is to process step 1860 where the item is re-deposited using the original check data.

Stepping back to query step 1650 where it is determined if the item is an on us item, if query step 774 determines that the item in not an "on us" item then query step 1660 determines if the maker bank is a clearing bank or a correspondent bank. If the maker bank is a clearing bank or a correspondent bank, then query step 1740 determines if the maker bank requires a paper copy of the original check 303 item. If they require a paper duplicate, then a paper duplicate of the original item is printed in process step 1760 and sent to the maker bank. Maker bank receives the paper duplicate in process step 1765 and control passes through process step 1765 to process step 1770 discussed below. If query step 1740 determines that the maker bank 108 does not require a printed duplicate check, the image of the original item drawn on the maker bank is sent to the maker bank in process step 1770 and the maker bank 108 sends the item through process 1780 to previously discussed process step 1820 to determine if the item is payable at the maker bank.

Stepping back to query step 1660, if the payee bank is not a clearing bank or correspondent bank, process step 1670 sends the check data in process step 1670 to the appropriate receiving entity. This may be the FRB, correspondent or directly to the maker bank depending on the clearing arrangement the bank of first deposit 101 has for clearing checks drawn on the maker bank In query step 1680 it is determined by the invention if the maker bank 108 requires a paper duplicate of the original paper check. If the maker bank requires a paper item, the paper item is printed, as further described in preferred embodiments included herein, in process step 1710, the printed duplicate paper item is then incorporated in the processing systems as depicted in process step 1720813 where the item is sent to process step 1730 where the maker bank receives the paper item. If in query step 1660 the maker bank does not require a paper check, the check data is sent to the maker bank 108 that receives the image in process step 1690 and passes, process step 1700 to previously discussed query step 1820 where the maker bank determines if the item is payable by the maker.

Following are illustrative features and functions of alternative embodiments for the above-described exemplary embodiments of the present invention. These additional embodiments include computer hardware, computer software, apparatus, and methodology that further enable individuals, businesses, and all types of organizations (both for profit and non-profit) to capture and securely transmit check images (including, but not limited to, personal checks, business checks, travelers checks, money orders, merchant coupons, food coupons, line of credit checks, etc.), images of deposit slips, deposit information associated with the deposit slips and/or check images, processing of internal company monetary and non-monetary items, and other information from first processor 200 locations (i.e., locations that could include the financial institution's first processor 200 locations, other financial institution's locations, businesses, private residences, etc.), for the purpose of having checks and other items credited to the depositing individual's or organization's bank account(s) and having the check images (and/or physical checks) entered into the bank check clearing channels for ultimate delivery to the maker bank for payment out of the maker's account. More specifically these embodiments generally apply to all of the inventive components as well as the general overall purpose and functionality of the invention.

In one exemplary embodiment of the invention data is maintained (either by batch updates or via on-line administration) through terminals having access on a security basis to stored data, such as file and table entries. Such security access is to ensure that item images, item data and all other information sent to or maintained with the invention are received only from appropriate, pre-authorized sources (individuals, companies, banks of first deposit and the like).

Yet another embodiment of the invention is designed such that it has file checking to ensure each file and item (image and/or data) is only received once for each deposit and for processing. For example, each file received by each processor is balanced by such things as item count, dollar amount, etc, prior being to being accepted by each specific processor and forwarded for deposit into customer account and further check data/IRD processing. Such file checking information is done at either the first processor 200, second processor 220, or third processor 240 level and all such checking information is stored in data files selectively on first second processor 200, second processor 220 or third processors 240 for future use by the inventive processors to and used as each new item, batch, file and the like are entered into the inventive process to compare the new file data against the stored item file data to ensure each item and or file is only received by the invention once for processing. This file checking is enabled at each processor level to ensure complete coverage of such checking throughout the inventive process.

Yet another embodiment of the invention allows for multiple customers to capture item images and item data on any given first processor 200. This embodiment further enables more than one first processor 200 to interface with each second processor 220 or alternatively for each first processor 200 to interface with multiple second processors 220. In like fashion, a single second processor 220 can interface with and send item check data and images to either a single or multiple third processors 240 as well as multiple second processors 220 sending item images and data to a single or multiple third processors 240. And yet further, each third processor 240 can interface with and send data to either a single or multiple print processors 280 as well as to other third processors 240 which in turn send data to either other third processors 240 or to a single or multiple print processors 280. And print processors are such that they can send data to single or multiple printers, or to other print processors 280 which in turn can send data to other print processors 280 as well as to either a single or multiple printers. The invention is designed such for efficiency in processing and printing data, eliminating data bottlenecks associated with significant data transfer being done through a single processor and telecommunications line (i.e. for load balancing as further described herein), and for the purposes of combining reports, check data, item images and item data at the most efficient processor and printer location for presenting items, IRD's, electronic data records, cash letters, printed reports and the like. This feature and functionality enables multiple items and item images from each customer to be routed and presented/printed by customer or combined with other customer, bank of first 101 deposit, etc. data for presentment and printing. The inventive design is such then when routing through the various processors the invention is fully capable of tracking specific data received from each customer and/or for each different bank of first deposit 101 and making sure that all reporting and settlement reflects which customer or bank, etc. that data is received from.

The invention interfaces with third parties for review of items presented for processing through the invention. This review is designed to enable checks that are fraudulent or are not payable to be identified as early in the capture and presentment process as possible. A file is presented to the third party for review for questionable items, fraud control, funds availability checking, etc. and a report is returned by the third party of items for manual or automated review. The returned report can either be in paper or electronic format. If received in electronic format the system is designed to allow on-line review of the reports selectively by authorized persons or alternatively allow for automated review and comparison of data by the inventive software to identify items that need further review and handling which review and handling may be done by the inventive software or presented to an operator through the inventive administration functionality for on-line real-time decisioning. As an alternative to the returned report the invention can access the third party debit review process directly in an on line real-time manner as items are captured by the invention or entered into the invention (as is the case with Lock box and MICR capture and entry into the invention) to provide real time, interactive decisioning from either the first processor 200, second processor 220 or third processors 240 as items are received and processed by each of these processors.

Another embodiment of the invention enables maintaining, controlling, reporting and charging for product licenses. Using the first processor 200, second processor 220, third processor 240, and print processors 280, as locations for establishing and maintaining license information, the invention can efficiently establish licensing criteria and usage information that is used in subsequent Tracking, reporting and billing activities of the invention. For example, licensing can be configured in the invention is either an active or passive mode. The passive mode tracks and reports on license usage (license usage as used herein includes both use of a license or licenses as well as transaction volumes entered by a given customer, bank of first deposit 101, and the like) with no overt action taken by the invention to control the license usage, such as disabling the ability of a licensee to use a given licensed module for non payment of license fees. The active model is more aggressive with the option of automatically disabling the use of any given license by a licensee for non-payment of license fees and such. The determination of type of license model to be used by each licensee is by agreement at the time of sale and is entered into the license controlling parameters of the invention by an operator authorized to enter and maintain such information. This entering and updating of such information can be done using the administrative ability of the invention from any computer terminal able to access the administrative functionality as further described herein. As an alternate embodiment of the licensing information, such information set up can be done automatically by the invention when a new license is detected by the invention during the normal course of business and usage of such licenses by a new user to process items through the invention. New licensing information may for example be detected by any of the first processor 200, second processor 220, third processor 240, or print processors 280 and logged/recorded by the invention for ongoing tracking, billing, reporting and the like. Tracking and logging of licensing and billing information and data is done by the invention as further described herein for all other logging, tracking, and reporting functionality. Information that can be entered for licensing can include such information customer identification information, billing rates, billing cycles, billing method (such as fax, e-mail, mail, etc.) and the like. The invention is pre-configured with defaults of all such licensing and license billing information but all such defaults can be changed as needed based on the specific license agreement. The inventive billing system can accumulate all information from all processors at the appropriate time for billing and can generate such billing information and required reports. Such billing can be done from the processor where each billing activity is conducted or an exemplary embodiment, all billing information can be polled or delivered to the third processing for combination of all billing information into a single bill. The billing method will be determined by what is acceptable to each individual licensee (including but not limited to fax billing, e-mail billing, printed billing, and the like.). Licensing and billing criteria can include such things as a per month license fee for each processor licensed, numbers and amounts of items processed by each of the licensed servers, numbers and amounts of items processed by all servers, numbers and or amounts of items sent to each or all clearing endpoints, and such other information as may be needed to charge the licensee for the usage of the invention. Further, the licensing ability of the invention includes being able to track and bill for usages as described herein on a licensee, end-user, bank of first deposit 101, service bureau, clearing end-point, etc. basis. The above embodiments of licensing are offered only as examples and should not be viewed in limiting the scope or potential of the invention as far as licensing is concerned.

Embodiments of the present invention include a transaction billing function that can use a transaction date for transactions, files and other such data processed through the invention to generate billing information and invoices to the bank of first deposit 101, the customer, the service provider, the customer, etc. Exemplary demonstration of this billing functionality can include automatically generating billing information such as transaction counts, customer information, etc. and making it available on line or via e-mail to the customer. The invention can also generate an invoice to be forwarded by mail, fax, etc. to the bank of first deposit 101 or alternatively send an entry to the bank of first deposit's 101 account through the Automated Clearing House (ACH), direct entry if the bank of first deposit 101 has an account with the bank that is running the system, etc. The system can also format the billing information into a file that can be sent to another external billing system for invoicing the customer. This information is available on a per transaction basis or alternatively by summing transaction data processed through the invention.

In an exemplary embodiment of the invention, the check images and associated check data (as well as any and all data, reports, settlement entries, etc., generated by or loaded into the invention) are sent to or interfaces with storage/archive systems for transfer of data to and from these systems. Storage archive systems are designed primarily for the storage and retrieval/reporting of data. Without limiting the scope of the invention such loading of check images and check data can alternatively be loaded to such storage archive systems from either the first, second or third or print processors 200, 220, 240, and 280 respectively and is presumed loaded from the appropriate processor for the purposes of the invention whenever data is stored in document storage or archival storage. When the check images and check data is loaded to a storage archive system the check image data is electronically updated with a storage archive key to show that the data has been sent to a storage archive system and to which storage archive system it was sent. This functionality will enable subsequent research of such data (either by the inventive system using the administration function thereof as described herein, or by other means or systems using the storage archive key created by the invention and passed to such other means or systems) by accessing the original check image, check data, or printed IRD and locating the storage archive key and using such key to identify and access the check image and data from the archive in which it was stored. Storage parameters such as what to store, when to store it, how long to store it, as well al others required by each storage of data are determined by system administrators and are entered into the system either by batch file or on-line entry options.

Embodiments of the present invention include a system efficiency feature that provides a deposit review window that displays a list of standard item, batch, etc. reject reasons with the ability to enter comments selectively by reject, and simplifies operator recognition of rejected items by color-coding items displayed on a screen to reflect the reason a flagged item is rejected.

Embodiments of the present invention are adapted to fully utilize automated fail-over, contingency, redundancy and restart recovery features that ensure maximum system uptime and recoverability. These recovery features include all system and application components. As an example automated fail over is a backup operation that can automatically switch to a standby database, server or network if the primary system fails or is temporarily shut down for servicing. Fail over is well known in the computer industry as an important fault tolerance function of mission-critical systems that rely on constant accessibility. Automated fail-over automatically, and transparently to the user, redirects requests from the failed or down system to the backup system that mimics the operations of the primary system. In like manner automatic contingency, redundancy and restart recovery can automatically detect various errors in processing and equipment operation and resolve those errors without manual intervention. As an alternative, or in addition to automated system recovery functionality, notifications can be sent to authorized system operators and manual correction of error conditions can be done. Recovery in a failover scenario is such that a restart can be done automatically by the invention at an item level thus reducing the time and effort required by the system to accomplish the recovery and to minimize potential for lost data. Automated failover can be tracked and monitored by any terminal having access to the systems as previously discussed herein. While automated failover is a normal functionality of computer systems the inventive processes additionally keeps track or abend conditions and following recovery through automated failover, can restart and/or resume any inventive application processes that were in processes when the failover occurred. Such restart or resuming of inventive processes takes place at the point that the automated failover and restart took place.

Embodiments of the present invention allow for automated monitoring of hardware and applications programs with automated error correction. An exemplary demonstration of this embodiment is when the system has been configured to automatically track all hardware and software functionality and automatically correct whatever problems occur during the processing cycle of the system. An alternative demonstration is that the system can be configured to report on error conditions and possible resolutions instead of automatically fixing problems as they occur. All such automated error detection and correction is inherent in the inventive software that resides on the first processor 200, the second processor 220, the third processor 240, and the print processor 280.

Embodiments of the present invention allow items captured by the inventive software to be reviewed, adjusted, changed, etc. as required by an operator having the authority to access the items on-line from any location having access through the administrative functionality of the invention and therefore using the administrative features and functionality of the invention as further described herein, to ensure all of the data on all of the items is correct and ready for further processing and presentment to the appropriate bank of first deposit 101, application for processing, etc. as well as for forwarding for presentment as further described herein. This review can be done on any of the files or databases that are created and maintained by the invention or otherwise associated with the system. Exemplary demonstration of this functionality are as follows: If items, deposit, batches, etc are changed the system can automatically create offset items at the appropriate time to ensure that all deposits, batches and transmissions are kept in balance at all times. The system can also verify file and batch totals before processing the items and can send error messages (via fax, e-mail, etc.) when errors are found. Once entered the entire file must be corrected, balanced, etc. or it is rejected by the system and the customer is directed by the system to fix and resubmit the file. More specifically, the balancing functionality of the invention follows general accounting and banking accounting principles in that all of the monetary data entering the inventive processes must balance at all times such that all monetary debits must be accompanied with offsetting credits and vise versa. An example of such functionality of the invention is whenever check images are entered into the invention they must be accompanied with an offset (such as a deposit slip to the depositors checking account at the bank of first deposit 101) equal in amount to the total of the checks being entered. Another such example is in the settlement processes when an entry for the total amount of checks presented to for example, a maker bank to withdraw funds from such maker bank must be accompanied by an offsetting entry to deposit an equal amount of money into the account of the bank presenting the checks to the maker bank for payment. Generally check processing systems are run on a day to day basis such that all of the work entered into the system on a given day is also sent to the maker bank of the same day enabling the dollars in and our of the check processing system are balanced at the end of the day with a new beginning of work to account for beginning on the next day. However, all the invention is similar to other check processing systems in that it allows for holding of work over until the next business day. Such holding of work over consists of keeping monetary item images and data within the inventive system until the next business day (without presenting to the appropriate maker bank or bank of first deposit 101) if such monetary work is entered into the invention to late to be presented to for example, the maker bank on the current business day. For accounting purposes this hold over work is identified as such and accounted for in the balancing of work entered for the current day as well as also being accounted for in the work for the following day.

Embodiments of the present invention include the ability of an operator to selectively zoom in on the image of check 303 (both front and back images) to allow better view for such operator to make corrections and do research. Such image review and zoom capability are provided through the administrative access capability of the invention as previously described herein. Examples of the zoom functionality is that the system can enlarge the full image of the check 303 (front and back) as well as manipulate the image on the screen for a better view of specific areas of the check image. The full capabilities of the image feature include but are not limited to image zoom, image rotation, focusing on specific portion of image, enlarging specific areas of the image, etc. The image zoom and manipulation feature is available to any operator with authorization to access captured and stored images from any location that can access they system using telecommunications lines and terminals either through the Internet, and internet, direct connect, or from terminals having access through any of the inventive processors.

Illustrative features and functions of the inventive administrative ability of the present invention make use of system wide accessibility in that it can access any and all data and functionality for all processors, databases, files and provides views, intervention, maintenance, etc. of items, reports, logs, etc. on-line, real-time during processing. The administration functionality accommodates research on a real time basis and on a post processing day basis, and may be interfaced with the storage/archive system(s) to ensure access to data sent to such system(s).

Without limiting the functionality of the inventive administrative on-line view and change capability, the following capabilities are offered herein as exemplary of the features of this function: Provides view into and intervention for: file activity, maintenance of system listings, system application activities, network activities, system hardware components, expected files per customer, processing day acceptance, list of files processed on business day for each customer, balancing activities, processing day research, load balancing activities, data base management activities including purge functionality for erroneous data, system management information such as thresholds, and capacities, throughput management activities, electronic exception processing down to individual items, and settlement cross reference information for processing day. The inventive administration functionality accommodates exception research real time and post processing day and is interfaced with the storage/archive system to ensure availability of all current and historic inventive system data.

An embodiment of the present invention utilizes biometric authentication ("Biometrics) (Biometrics refers to authentication techniques that rely on measurable physical characteristics that can be automatically checked. Examples include computer analysis of fingerprints, facial characteristics, speech characteristics, etc.) for logging onto or accessing any component or data of the invention and/or exchanging data with any other component of the system. Biometric authentication is used to validate that only authorized individuals are allowed to log onto the system to perform any of the functions available through the administrative functions of the invention. Biometric authentication is also used, optionally at the discretion of the individual or entity controlling or owning access to any component of the system, to interactively validate the identity of the system operator before exchanging data between any components of the system. Setting individuals up on biometric authentication is an administrative responsibility controlled as a function of any of the inventive processors, or alternatively this administrative responsibility may be a function controlled centrally for example, as a third processor administrative functionality. The invention has been designed to accommodate use of any of the commonly accepted biometric authentication processes including fingerprints, iris, facial, voice, etc. Storing of Biometrics may be done on the processor for which the specific Biometric was taken to control access. As an alternative, all Biometrics for access to all processors may be stored in a central location, for example, at the third processor, and accessed from any processor within the invention.

Embodiments of the present invention may include the ability to print and reprint IRD's, cash letters, or any and all other printed reports as further described in the invention. Reprinting may be required when original printed items or reports have been lost, destroyed, are unreadable, etc. The printing and reprinting of items can be done at any inventive print processor site and transported to the appropriate clearing end point or any other location requiring the reprinted report or IRD's. Without limiting the scope of the invention, printing and reprinting of items may be controlled by authorized persons from any inventive processor or from any other location having access to the inventive software such as over the internet, over a local area network, through direct attachment to the invention, etc. Only individuals who have been authorized to print or reprint IRD's or reports may access this administrative function. The invention selectively identifies persons who have the administrative authority to authorize printing or reprinting of data from the invention based on those persons being set up on the invention to do so. One having authority can log into the invention and mark IRD's or other reports for printing or reprint. That same individual can then selectively, determine which print location items may be printed at, or reprint items so marked, or give other pre-authorized persons the ability to reprint items so marked. This control function ensures security control for example to preclude IRD's from being reprinted and re-presented for payment once the original IRD has already been presented for payment. It can be understood by one skilled in the art of system security that administrative access can be provided for any individual who has been granted authority to such ability. It can be further understood that this access is not tied to the physical location of the inventive processors or the physical location of the individual controlling the print or reprint functionality. This print or reprint authority may be controlled and accessed by using password and/or Biometric authentication functionality, or any other commonly accepted security access method. The print or reprint function includes the ability to selectively mark for reprint individual items, bundles of items and cash letter listings (cash letter listings are listings of monetary included in bundles of items with pertinent associated with each item in the bundle as well as summary information such as total items and dollar value of the items in the bundle), summaries of items and cash letters, and any and all other inventive printed data.

A further embodiment of the present invention can enable or facilitate printing items and cash letters at multiple, remotely dispersed print centers. In this manner, the item images, whether monetary items, deposit slips, cash letters, combination thereof, or other information, data, or images can be automatically sent to remotely dispersed print centers based on decision tables containing routing transit number and clearing end point information as further discussed herein. The item images are primarily sent to that print center(s) that is closest to the clearing end point to accommodate rapid and timely presentation of the reprinted items to the appropriate Federal Reserve Bank, correspondent bank, or directly to the maker bank.

Embodiments of the present invention can ensure non-duplicate print/re-print of items, bundles, and cash letters. The non-duplicate functionality is controlled by the invention maintaining logs of all print functions down to the specific print details on items, cash letters, and bundles already printed. When a reprint of any number of items or reports under the invention is undertaken the inventive software checks the print logs to ensure the print has not already been done. If it has been done then the printing can still be done on an override basis by one with authority to do so through the inventive administrative functionality as previously discussed herein. Also, serial numbered paper and printed watermarks are used to visually identify both original printed items as well as reprinted items. Serial numbers are entered and tracked within the system to provide complete tracking and security associated with using serial numbered paper to print items on.

Embodiments of the present invention meet industry standards and requirements for transmission format and content, digital image format and content, and printed image format and content.

Embodiments of the present invention can ensure the creation of audit logs to track monetary items and associated transactions through the system. The inventive software can produce audit logs at the first processor 200, Second processor 220, third processor 240 and print processor 280 site(s), to record and totally track and enable reporting on all events for the entire capture, routing, storage, printing, and reprinting processes. These logs are used to ensure system integrity and track all monetary transaction events with the inventive software. The log can selectively be maintained at each of the processor sites or alternatively sent to a centrally located processor, such as a third processor 240, for storage and access. Those skilled in the art will understand the economies in transmission time by storing data (such as logs) at the location where it is created, and accessing it from other locations only when needed for research or reporting. It is also understood by those skilled in the art, the practice of waiting until a time when the load on the individual processors or transmission lines is less, usually during off business time hours, to transmit data to a centrally located processor.

Embodiments of the present invention can ensure the creation of event logs at the first processor 200, second processor 220, third processor 240, and print processors 240. These logs are for physical events with the equipment, network, applications programs, etc. to enable the inventive software to do the real-time or delayed, interactive monitoring, tracking, reporting, and correction (if needed) of the events. The processes of storing and transmitting the data in event logs is the same as those previously described for auditing logs. In addition, the data associated with the logs produced by the inventive software is accessed through the on-line administrative function of the invention and the security associated with transferring and access information in all system logs is controlled by passwords and/or biometrics as further described herein.

A further embodiment of the present invention can generate reports in XML, CSV, and HTML output formats that can selectively be printed or e-mailed to any person requesting such after that person's e-mail address has been set up on an e-mail database. The reports can also be viewed on-line over system, Internet or intranet connections by users authorized access to selective reports. This access is controlled by system administrators who have been authorized to access to the reports and have the authority to allow others to access reports, using password or biometric control as furthered described herein. System administrators are individuals identified by the company using the invention as being responsible for controlling the entry of data and distribution of data including, but not limited to, reports, item data, and item images. The reports can be viewed on a delayed as well as real time basis at all levels of reporting. Based primarily on data contained in the audit logs and item/image data base information, reports include all information required to run, balance, and monitor all system and application events at the first processor sites, second processor 220, third processors 240, and print processor 280 sites. Reports include, but are not limited to, statistic reports, detailed information reports, exception reports, balancing reports, system performance reports, detailed log reports, etc. Reporting for the system is determined by system parameters set to produce a specific set of reports at a given time as required by the depository bank, maker bank, or any other entity that has a need and authority to such reporting. Reporting can be done on a request basis as well as at certain times of the day as determined by a set of parameters maintained in the invention by a system administrator or by the authorized entity requesting the report(s). Processing day reporting facilitates balancing across the multiplicity of the systems (multiple first processors 200, second processors 220, third processor 240, and print processors 280) and produces a report for each depository bank. All reports can be produced in either electronic or paper format. If produced in electronic format authorized individuals can view the reports selectively by using the secured on-line report access feature of the invention. All audit logging and reporting functionality is designed such that such logging and reporting can be done on various levels including for example time of day, customer, depositor, bank of first deposit 101, payor, payee and other such data required for accurately logging, tracking, and reporting on data being processed through the inventive system.

Embodiments of the present invention enable the inventive system to process not only regular deposits with one or more deposit slips followed by one or monetary items (i.e. checks) but it is also designed to electronically create one or more deposit slips to precede any check(s) for a deposit. The creation of the deposit slip(s) is done from information entered by an authorized system operator at a first processor location. In addition, the invention is fully capable of processing items, capturing images of the items and forwarding/printing the item images for documents that are used by financial institutions for payment and accounting purposes such as General letter tickets, loan coupons, visa coupons, food coupons, etc. When a deposit that has multiple deposit slips is processed by the system, the system is capable of allowing the user(s) the ability to split float and dollar amounts, of the monetary items following the deposit slips. Float and deposit amounts can be spread across all of the deposit slips involved in the deposit. Splitting float and the dollar amounts of the monetary items across all deposit slips allows the depositor to determine how much of the float and the total monetary amount of the checks associated with the deposit is charged to the accounts that are listed on the deposit slips. The actual decision of how much float and total dollar amount of the deposit to assign to each of the deposit slips involved in a given deposit can be made by an operator at the time the deposit is captured at a first processing site or can be generated by the system using a split deposit table that can be created prior to running the deposit through the system, which table can reside on a first, second or third processor. Once it is determined how the float is split, this information is forwarded to the bank of first deposit 101 from the third processor 240 in the posting file for processing in that bank's application processing system responsible for float determination and float accounting.

Embodiments of the present invention can read items and capture images of those items using both Optical Character Recognition (OCR) and Magnetic Ink Character Recognition (MICR) read capabilities. The system is fully capable of working with multiple image capture devices. Many of these devices are equipped to scan items using both MICR and OCR recognition. The MICR recognition is used to read the MICR line on items and can allow editing and error resolution of the characters coded on the MICR line of documents. The system can validate/scrutinize all items read by the image capture system (including Checks, Postal Money orders, Deposit Slips, Food Coupons, Loan Payment Coupons, etc.). The system can validate and correct route and transit and account numbers, etc. by using check digit routines. The invention can also validate and correct batch level information (a batch being one or more deposit slips followed by one or more checks or other monetary items), etc. against the detailed item data contained in the batch. In addition, using OCR read capabilities the invention is capable of isolating and resolving information in a number of areas on any physical item it scans. These areas include but are not limited to the signature(s) field, check serial number, the legal and courtesy amount fields, the drawer name and address information, endorsements, etc. This can be done either during the initial image capture process or after the image has been captured and stored for further processing.

Yet another embodiment of the present invention can release batches of items (which include monetary items and deposit slips) selectively on either a manual or an automated basis—depending on system parameters (optionally set at system installation time and changed as needed), operator needs, system flags, etc. The first processor 200 capture process of the invention is designed such that the system can capture deposits and other items in an interactive mode communicating pertinent information between the first processor 200 site and the third processor 240. Another embodiment allows for the batch capture of items at the first processor 200 site with no interactive communications with the third processor 240. This is done for efficiency purposes when capturing the items at the first processor 200 site. In either case, the system is designed such that check images can be retained at the first processor 200 site until a batch or deposit is complete and then establishing a communication link with the third processor 240 for the purposes of transmitting the batches of images ready for transmission to the third processor 240 for further processing. The initiation of batch transmission of item images to the third processor 240 can be done on a manual basis by either the first processor 200 or system operator or on an automatic bases based on time of day, number of items to transmit, total batch dollar amount, etc. It is also understood by those skilled in the art that the system requirements involved in transmitting images is significant. Therefore, the invention is designed such that the images can be stored on any of the processors at any point in time. The images can be referenced on such processor or retrieved there from as required by the invention for printing of IRD's. Alternatively, the images can be sent to a centrally located processor, such as the third processor 240, during off business hours when the load and requirements on the processor where the images reside or the telecommunications lines is reduced.

A further embodiment of the present invention provides the system with the ability for abend processing during the capture or transmission of items, deposits, batches, etc. with no loss of data. An exemplary configuration keeps electronic pointers such that recovery of data can be done at the logical place in processing where the system abend occurred. Additional, abend tracking and recovery can be done at any point of transmission and processing through all components of the system beginning with the first processor 200 and including all system components, processors, communications lines, etc.

Yet another embodiment of the present invention can provide on-line real-time research capabilities. Examples of research capabilities include the ability to review data, report on, or log entries maintained by the system. An additional exemplary capability of the on-line research functionality is that research can be done by anyone authorized to do so either directly through the system facilities or remotely over the Internet or an Intranet. To facilitate the on-line real time research capability a research authorization table can be maintained that contains information on who is authorized to do research, what level or research they are authorized to do and what their access password is. This research authorization table is a distinctly different authorization than the authorization of the invention that allows an operator the ability to print or reprint items or reports, etc. One skilled in the art understands that such authorization information, while distinctively different, may reside in one or more tables or databases without limiting the scope and functionality of the invention. The determination of where such authorization information is kept is determined by system efficiencies and the need to have such information as readily available to each processor and operator as possible at all times.

Embodiments of the present invention can pass information to the internal application systems of the bank of first deposit 101 affected by the first processor 200 capture of items. As an example, the system of the invention can capture the information required to not only forward check items for presentment at maker banks but to also provide the information required for all involved application processing (such as cash management, float processing, loan processing MICR processing deposit system processing, etc.). By so doing, the system precludes the need for subsequent capture of information specifically for application processing using the physical items. The forwarding of information under this embodiment to the bank of first deposit 101 can be done selectively to match a file requirement as determined by the bank of first deposit 101 or using the default file format of the invention.

Embodiments of the present invention can enable real-time posting and/or memo posting of debits (such as personal checks, business checks, postal money orders, etc.), credits (such as deposit slips), and other account information on bank application systems. An exemplary demonstration of this is done by the system of the invention passing the information required for memo updating application systems to those systems as required by bank requests to do so as soon as the information is captured and verified correctly by the invention. This information can be passed to the applications systems as the information is captured at the first processor site or as the information is passed to either the second processor 220 or third processors 240. Yet another embodiment allows for interfacing of the third processor 240 of the system of the invention through teller systems at a branch location to enable automatic memo posting to be done through the teller system, ATM's, Point of Sale Terminals and the like as previously described herein. This is accomplished by software and hardware modules and components of the invention being integrated into the teller system, ATM systems and Point of Sale systems processes and software. Each of these embodiments allow for actual posting to occur from the images and/or data captured in the system or memo posting from the images and/or data with actual posting done at a later time as the physical items are sent on a follow-up basis to the bank of first deposit 101.

Embodiments of the present invention were designed with a real-time, on-line, conversational/interactive mode between any or all of the processors associated with the invention for the purpose of processing checking stop payments on monetary items and/or reviewing items, images, or any other data captured or maintained by the invention for any other purpose. An exemplary demonstration of this functionality is enabled by information required for identifying questionable items being created at the bank of first deposit 101 or maker bank 108 host site and being made available for real-time use in the first processor 200 capture process to identify and mark a particular item being captured by the invention as an item that there are not sufficient funds in the check makers account to pay. As an alternate embodiment, the stop payment information can be generated at the bank of first deposit 101 or maker bank 108 site and a batch file can be transmitted to the first processor 200 where the edit checking for stops or reviews is incorporated in the process of capturing and qualifying items. The invention then uses the information passed to it and takes the action indicated by the type of review that is being done (such as not capturing for deposit any item that will create an overdraft situation in the depositor's account, etc.). In further embodiments of the invention the item review described herein can take also place at the second processor 220 or third processor 240.

Embodiments of the present invention can allow additional information to be created and/or stored, and or maintained by the invention that can be used on a batch or interactive basis by any or all of the processors associated with the invention. Examples of such additional information can include but is not limited to: How long has an account has been opened, what the average deposit size is by account, what the customer value is to the bank, what the number of check returns is by customer, what the number of NSF's is by customer, what the account status is by customer, etc. This information can be used in the capture and processing of deposit to determine if a customer is within their normal limits as determined by a history of their previous deposit activity.

Embodiments of the present invention have been designed such that it can retain the information required from previous item images, batches and files processed through the system. Such information can be retained based on item capture date, first processor 200 identification, customer identification, second processor 220 information, third processor 240 information, and/or bank of first deposit 101 information and other such qualification information. This information can then be used to compare stored information against each new item, batch or file to ensure that the new data has not been processed through the system before. Examples of such comparison information used for this review process is dollar amounts of items, batches, and files, item serial numbers, item routing transit numbers, item serial numbers, etc This information can be stored and such comparison done at any of the first, second, or third processor locations to ensure that duplicate deposit information is identified as early in the inventive capture and processing process as possible. The system further can maintain information regarding scheduled expected files per day from each customer to monitor and provide a proactive method of resolving transmission or no submission problems with customers. This feature also enables the bank of first deposit 101 to ensure it has received all expected files before the bank of first deposit 101 begins its application processing for any given day.

Embodiments of the present invention allow customers to add descriptions on each item captured by the system as well as to the account information maintained by the system of the invention. An exemplary demonstration of the functionality of this feature is that the description information can be entered as well as updated on-line from any system, Internet, or Intranet terminal that has or can be given access to the inventive software. Such information is maintained by the invention and passed along with the check data and images as requested or required by the bank of first deposit 101 or maker bank.

Embodiments of the present invention provide the ability to interface information from the check capture and validation processes of the invention directly into financial records systems, or other information tracking systems. Examples of such financial record systems are Quicken, Microsoft Money, and Customer Information Systems etc. Exemplary operation of interfacing information into said financial record systems would be the transfer of accounting data directly from the inventive system to these financial systems which would avoid the need to re-enter data manually into such financial systems. The information that can be so interfaced can include any and all data that is scanned on a document using either MICR and/or OCR read information from the front and back of the items being read by the invention.

Embodiments of the present invention include a real-time, interactive customer scoring system to assist system operators in making decisions on customers deposits based on customer deposit history. The customer scoring system is based on previous customer history of deposits and other customer business (such as loan payment performance, etc.) automatically adjusts the customer's score as new deposits are processed by the invention. Examples of customer deposit information used to adjust the customer's score are deposit dollar size, deposit item count, number of transit vs. on-us items, frequency of deposits, etc. The customer scoring functionality of the invention can rely on customer historical data retained by the invention as well as accept such historical information from systems outside the invention.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

The invention claimed is:

1. A method for deposit processing at a central system a plurality of checks for deposit, comprising:

the central system receiving deposit information for a plurality of different deposit transactions, with the deposit information including for each of the different deposit transactions a deposit account designation in a bank of first deposit, electronic check data and check image data for at least one check to be deposited, wherein the central system is separate from MICR capture, deposit accounting, cash management, and float processing systems for a bank of first deposit and wherein the plurality of different deposit transactions relate to a plurality of different maker banks;

the central system identifying a clearing end point for the at least one check for presentment thereof;

the central system selecting based on or derived from information including the clearing end point identified, at least one of an IRD replacement document for the check, the check image data, and ACH data for provision to the clearing end point;

the central system providing based on the selection, at least one of the check image data, ACH data, and the IRD replacement document, directly or indirectly to the clearing end point, or providing the check image data, directly or indirectly to a printing system for printing and delivery of the IRD replacement document to the clearing end point.

2. The method as defined in claim 1, further comprising:

the central system accumulating until a settlement criterion is met respective check amounts to be paid by a given maker bank to or on behalf of a bank of first deposit identified in the deposit information and determining a summary therefor; and transmitting a cash letter based on the summary.

3. The method as defined in claim 2, wherein the settlement criterion is one of that a predetermined time period has elapsed, a predetermined number of items from checks or cash letters has been processed for the clearing end point, and a predetermined number of bundles of checks or cash letters has been processed for the clearing end point.

4. The method as defined in claim 1, wherein the clearing end point is one of a maker bank, a Federal Reserve Bank associated with the maker bank, and a correspondent bank for the maker bank.

5. The method as defined in claim 1, wherein the providing is via the bank of first deposit.

6. The method as defined in claim 1, wherein the providing comprises transmitting to the maker bank.

7. The method as defined in claim 1, wherein the providing comprises transmitting to a Federal Reserve Bank.

8. The method as defined in claim 1, further comprising the central system receiving from an aggregating system deposit information for a plurality of the deposit transactions, wherein the aggregating system has obtained the deposit transactions from a plurality of remote deposit systems.

9. The method as defined in claim 1, further comprising the central system electronically adding information about the clearing end point identified to the data to be provided directly or indirectly to the clearing end point.

10. The method as defined in claim 1, further comprising the central system electronically adding information about an alternate clearing end point to the data to be provided directly or indirectly to the clearing end point.

11. The method as defined in claim 1, wherein if an IRD replacement document is selected in the selecting step, then determining based on at least one criterion a print system for initiating creation of the IRD replacement document.

12. The method as defined in claim 11, wherein the at least one criterion is proximity of a print system to the identified clearing end point.

13. The method as defined in claim 11, wherein the at least one criterion is system load balancing.

14. The method as defined in claim 1, further comprising receiving by the central system of customer-added information about one of the deposit transactions;

tracking presentment activities relating to the one particular deposit transaction based on the customer added information; and sending information derived from the tracking step to at least one of the bank of first deposit and the maker bank.

15. The method as defined in claim 1, further comprising the central system sending information to the maker bank to place a hold on funds in an account indicated by one of the checks at least equal to an amount of the one check to reserve those funds for payment.

16. The method as defined in claim 1, further comprising the central system receiving from a merchant a request for electronic check data and/or check image data from one of the deposit transactions; and transmitting the requested electronic check data and/or the check image data to the merchant.

17. The method as defined in claim 1, wherein the deposit information is received from a plurality of point of sale processors.

18. The method as defined in claim 1, further comprising the central system receiving from the maker bank in advance of presentment of the at least one check associated with the deposit transaction a maker bank validation notice for the at least one check; and transmitting the validation notice to a point of sale location in substantially real-time.

19. The method as defined in claim 1, wherein the identifying a clearing end point step comprises accessing at least one decision component and making a determination based on at least one end point criterion.

20. The method as defined in claim 19, wherein the at least one end point criterion is a designation by the bank of first deposit of the clearing end point for the maker bank.

21. The method as defined in claim 20, wherein the at least one decision component comprises a table that includes a plurality of maker banks and one or more associated clearing end points therefor.

22. The method as defined in claim 1, wherein the providing step comprises providing the check image data directly or indirectly to the print system; and further comprising selecting a printer based on at least one routing criterion and sending or having sent the check image data to the selected printer.

23. The method as defined in claim 22, wherein the routing criterion is that a given printer or a telecommunications link is not operational.

24. A central system for deposit processing a plurality of checks for deposit, comprising:
a storage medium; and
at least one computer operably connected to the storage medium, and including the following components therein or among them if more than one computer:
a component for receiving deposit information for a plurality of different deposit transactions, with the deposit information including for each of the different deposit transactions a deposit account designation in a bank of first deposit, electronic check data and check image data for at least one check to be deposited, wherein the central system is separate from MICR capture, deposit accounting, cash management, and float processing systems for a bank of first deposit and wherein the plurality of different deposit transactions relate to a plurality of different maker banks;
a component identifying a clearing end point for the at least one check for presentment thereof;
a component for selecting based on or derived from information including the clearing end point identified, at least one of an IRD replacement document for the check, the check image data, and ACH data for provision to the clearing end point;
a component for providing based on the selection, at least one of the check image data, ACH data, and the IRD replacement document, directly or indirectly to the clearing end point, or providing the check image data, directly or indirectly to a printing system for printing and delivery of the IRD replacement document to the clearing end point.

25. The system as defined in claim 24, further comprising:
a component for the central system accumulating until a settlement criterion is met respective check amounts to be paid by a given maker bank to or on behalf of a bank of first deposit identified in the deposit information and determining a summary therefor; and
a component for transmitting a cash letter based on the summary.

26. The system as defined in claim 24, wherein the settlement criterion is one of that a predetermined time period has elapsed, a predetermined number of items from checks or cash letters has been processed for the clearing end point, and a predetermined number of bundles of checks or cash letters has been processed for the clearing end point.

27. The system as defined in claim 24, wherein the clearing end point is one of a maker bank, a Federal Reserve Bank associated with the maker bank, and a correspondent bank for the maker bank.

28. The system as defined in claim 24, wherein the providing by the providing component is via the bank of first deposit.

29. The system as defined in claim 24, wherein the providing by the providing component comprises transmitting to the maker bank.

30. The system as defined in claim 24, wherein the providing by the providing component comprises transmitting to a Federal Reserve Bank.

31. The system as defined in claim 24, further comprising
a component for the central system receiving from an aggregating system deposit information for a plurality of the deposit transactions, wherein the aggregating system has obtained the deposit transactions from a plurality of remote deposit systems.

32. The system as defined in claim 24, further comprising a component for the central system electronically adding information about the clearing end point identified to the data to be provided directly or indirectly to the clearing end point.

33. The system as defined in claim 24, further comprising a component for the central system electronically adding information about an alternate clearing end point to the data to be provided directly or indirectly to the clearing end point.

34. The system as defined in claim 24, wherein if an IRD replacement document is selected in the selecting step, then a component for determining based on at least one criterion a print system for initiating creation of the IRD replacement document.

35. The system as defined in claim 34, wherein the at least one criterion is proximity of a print system to the identified clearing end point.

36. The system as defined in claim 34, wherein the at least one criterion is system load balancing.

37. The system as defined in claim 24, further comprising
a component for receiving by the central system of customer-added information about one of the deposit transactions;
a component for tracking presentment activities relating to the one particular deposit transaction based on the customer added information; and
a component for sending information derived from the tracking step to at least one of the bank of first deposit and the maker bank.

38. The system as defined in claim 24, further comprising a component for the central system sending information to the maker bank to place a hold on funds in an account indicated by one of the checks at least equal to an amount of the one check to reserve those funds for payment.

39. The system as defined in claim 24, further comprising
a component for the central system receiving from a merchant a request for electronic check data and/or check image data from one of the deposit transactions; and
a component for transmitting the requested electronic check data and/or the check image data to the merchant.

40. The system as defined in claim 24, further comprising a component for receiving the deposit information from a plurality of point of sale processors.

41. The system as defined in claim 24, further comprising
a component for the central system receiving from the maker bank in advance of presentment of the at least one check associated with the deposit transaction a maker bank validation notice for the at least one check; and
a component for transmitting the validation notice to a point of sale location in substantially real-time.

42. The system as defined in claim 24, wherein the component for identifying a clearing end point step accesses at least one decision component and makes a determination based on at least one end point criterion.

43. The system as defined in claim 42, wherein the at least one end point criterion is a designation by the bank of first deposit of the clearing end point for the maker bank.

44. The system as defined in claim 43, wherein the at least one decision component comprises a table that includes a plurality of maker banks and one or more associated clearing end points therefor.

45. The system as defined in claim 24, wherein the component for providing provides the check image data directly or indirectly to the print system, and further comprising a component for selecting a printer based on at least one routing criterion and sending or having sent the check image data to the selected printer.

46. The system as defined in claim 45, wherein the routing criterion is that a given printer or a telecommunications link is not operational.

47. A program product for deposit processing at a central system a plurality of checks for deposit, comprising:
- at least one computer useable medium having machine-readable program code embodied therein or among them if more than one computer useable medium, capable of causing when executed, a machine to perform the following method steps:
- the central system receiving deposit information for a plurality of different deposit transactions, with the deposit information including for each of the different deposit transactions a deposit account designation in a bank of first deposit, electronic check data and check image data for at least one check to be deposited, wherein the central system is separate from MICR capture, deposit accounting, cash management, and float processing systems for a bank of first deposit and wherein the plurality of different deposit transactions relate to a plurality of different maker banks;
- the central system identifying a clearing end point for the at least one check for presentment thereof;
- the central system selecting based on or derived from information including the clearing end point identified, at least one of an IRD replacement document for the check, the check image data, and ACH data for provision to the clearing end point;
- the central system providing based on the selection, at least one of the check image data, ACH data, and the IRD replacement document, directly or indirectly to the clearing end point, or providing the check image data, directly or indirectly to a printing system for printing and delivery of the IRD replacement document to the clearing end point.

48. The program product as defined in claim 47, further comprising:
- program code for the central system accumulating until a settlement criterion is met respective check amounts to be paid by a given maker bank to or on behalf of a bank of first deposit identified in the deposit information and determining a summary therefor; and
- program code for transmitting a cash letter based on the summary.

49. The program product as defined in claim 48, wherein the settlement criterion is one of that a predetermined time period has elapsed, a predetermined number of items from checks or cash letters has been processed for the clearing end point, and a predetermined number of bundles of checks or cash letters has been processed for the clearing end point.

50. The program product as defined in claim 47, wherein the clearing end point is one of a maker bank, a Federal Reserve Bank associated with the maker bank, and a correspondent bank for the maker bank.

51. The program product as defined in claim 47, wherein the providing is via the bank of first deposit.

52. The program product as defined in claim 47, wherein the providing comprises transmitting to the maker bank.

53. The program product as defined in claim 47, wherein the providing comprises transmitting to a Federal Reserve Bank.

54. The program product as defined in claim 47, further comprising
- program code for the central system receiving from an aggregating system deposit information for a plurality of the deposit transactions, wherein the aggregating system has obtained the deposit transactions from a plurality of remote deposit systems.

55. The program product as defined in claim 47, further comprising program code for the central system electronically adding information about the clearing end point identified to the data to be provided directly or indirectly to the clearing end point.

56. The program product as defined in claim 47, further comprising program code for the central system electronically adding information about an alternate clearing end point to the data to be provided directly or indirectly to the clearing end point.

57. The program product as defined in claim 47, program code for, if an IRD replacement document is selected in the selecting step, determining based on at least one criterion a print system for initiating creation of the IRiD replacement document.

58. The program product as defined in claim 57, wherein the at least one criterion is proximity of a print system to the identified clearing end point.

59. The program product as defined in claim 57, wherein the at least one criterion is system load balancing.

60. The program product as defined in claim 47, further comprising
- program code for receiving by the central system of customer-added information about one of the deposit transactions;
- program code for tracking presentment activities relating to the one particular deposit transaction based on the customer added information; and
- program code for sending information derived from the tracking step to at least one of the bank of first deposit and the maker bank.

61. The program product as defined in claim 47, further comprising program code for the central system sending information to the maker bank to place a hold on funds in an account indicated by one of the checks at least equal to an amount of the one check to reserve those funds for payment.

62. The program product as defined in claim 47, further comprising
- program code for the central system receiving from a merchant a request for electronic check data and/or check image data from one of the deposit transactions; and
- program code for transmitting the requested electronic check data and/or the check image data to the merchant.

63. The program product as defined in claim 47, further comprising program code for receiving the deposit information from a plurality of point of sale processors.

64. The program product as defined in claim 47, further comprising
- program code for the central system receiving from the maker bank in advance of presentment of the at least one check associated with the deposit transaction processor a maker bank validation notice for the at least one check; and
- program code for transmitting a validation notification to a point of sale location in substantially real-time.

65. The program product as defined in claim 47, wherein the program code for wherein the identifying a clearing end point makes a determination based on at least one end point criterion.

66. The program product as defined in claim 65, wherein the at least one end point criterion is a designation by the bank of first deposit of the clearing end point for the maker bank.

67. The program product as defined in claim 65, wherein the identifying comprises selecting from a table that includes a plurality of maker banks and one or more associated clearing end points therefor.

68. The program product as defined in claim 47, wherein the program code for providing causes provision of the check image data directly or indirectly to the print system, and further comprising program code for selecting a printer based on at least one routing criterion and sending or having sent the check image data to the selected printer.

69. The program product as defined in claim 68, wherein the routing criterion is that a given printer or a telecommunications link is not operational.

* * * * *